United States Patent
Ito et al.

(10) Patent No.: US 6,445,409 B1
(45) Date of Patent: Sep. 3, 2002

(54) METHOD OF DISTINGUISHING A MOVING OBJECT AND APPARATUS OF TRACKING AND MONITORING A MOVING OBJECT

(75) Inventors: Wataru Ito, Kodaira; Hirotada Ueda, Kokubunji; Hiromasa Yamada, Kodaira, all of (JP)

(73) Assignee: Hitachi Denshi Kabushiki Kaisha, Tokyo (JP)

(*) Notice: Subject to any disclaimer, the term of this patent is extended or adjusted under 35 U.S.C. 154(b) by 0 days.

(21) Appl. No.: 09/362,212

(22) Filed: Jul. 28, 1999

Related U.S. Application Data

(63) Continuation-in-part of application No. 09/078,521, filed on May 14, 1998.

(30) Foreign Application Priority Data

| May 14, 1997 | (JP) | ............................................. 9-124329 |
| Aug. 22, 1997 | (JP) | ............................................. 9-226153 |
| Jul. 28, 1998 | (JP) | ............................................. 10-212574 |

(51) Int. Cl.$^7$ ................................................. H04N 7/18
(52) U.S. Cl. ........................................ 348/155; 348/169
(58) Field of Search .............................. 348/152, 154, 348/155, 169, 172; H04N 7/18

(56) References Cited

U.S. PATENT DOCUMENTS

| 5,021,891 A | * | 6/1991 | Lee .............................. 358/432 |
| 5,134,472 A | | 7/1992 | Abe ............................. 348/700 |
| 5,164,827 A | * | 11/1992 | Paff ............................ 348/143 |
| 5,243,418 A | * | 9/1993 | Kuno et al. .................. 348/155 |
| 5,280,530 A | * | 1/1994 | Trew et al. .................. 348/169 |
| 5,384,588 A | * | 1/1995 | Martin et al. ................ 348/143 |
| 5,491,480 A | * | 2/1996 | Jan et al. ..................... 341/167 |
| 5,570,177 A | * | 10/1996 | Parker et al. ................ 348/169 |
| 5,917,553 A | * | 6/1999 | Honey et al. ............... 348/578 |
| 6,108,033 A | * | 8/2000 | Ito et al. ..................... 348/152 |

FOREIGN PATENT DOCUMENTS

| JP | 59137944 | 1/1986 | ............ H04N/7/18 |
| JP | 63277162 | 5/1990 | .......... H04N/5/232 |

* cited by examiner

Primary Examiner—Howard Britton
(74) Attorney, Agent, or Firm—Antonelli, Terry, Stout & Kraus, LLP

(57) ABSTRACT

A moving object recognition method for recognizing a specified moving object in an input image signal in distinction from other objects, and a moving object tracking and monitoring apparatus using the method. One or more moving objects in the input image signal are sequentially detected by the subtraction method, the physical quantities of the detected moving objects are sequentially stored in a memory. Based on this physical quantities, one or more loci of the detected moving objects are determined. A group of physical quantities associated with each locus are stored in a memory as correlated information series of a moving object. Based on the information series thus stored, at least one of a plurality of classification methods is applied to each moving object for determining whether the moving object belongs to the specified moving object or other than the specified moving object. Thus, a detected moving object is recognized as to whether it is a specified moving object or not. A plurality of the classification methods include a method based on the continuity of the locus of a detected moving object, a method based on the smoothness of position change of the detected moving object and a method based on the size of the detected moving object.

62 Claims, 34 Drawing Sheets

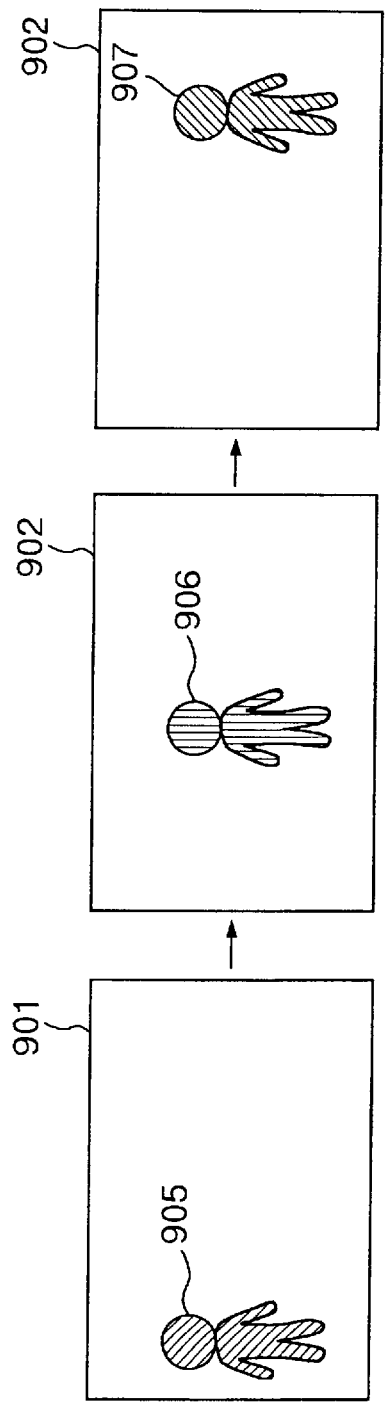
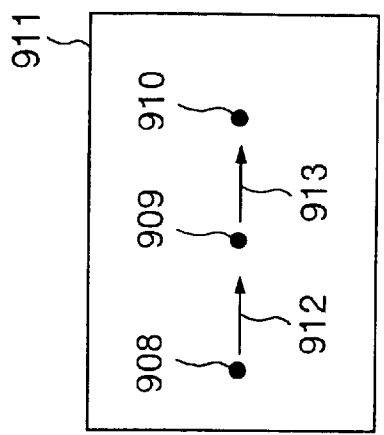
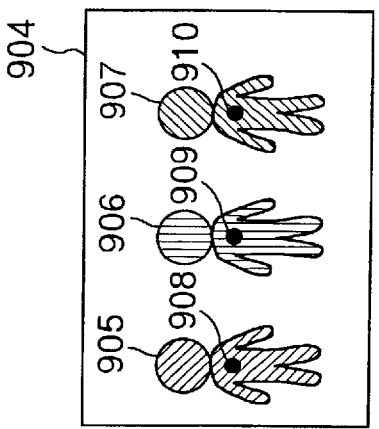
FIG.9A
FIG.9B
FIG.9C

| DETECTION TIME |
| --- |
| CENTER OF GRAVITY OF DETECTED OBJECT |
| AREA OF DETECTED OBJECT |
| CIRCUMSCRIBED RECTANGLE ABOUT DETECTED OBJECT |
| A SET OF POINTERS TO OBJECT INFORMATION STORAGE AREA |

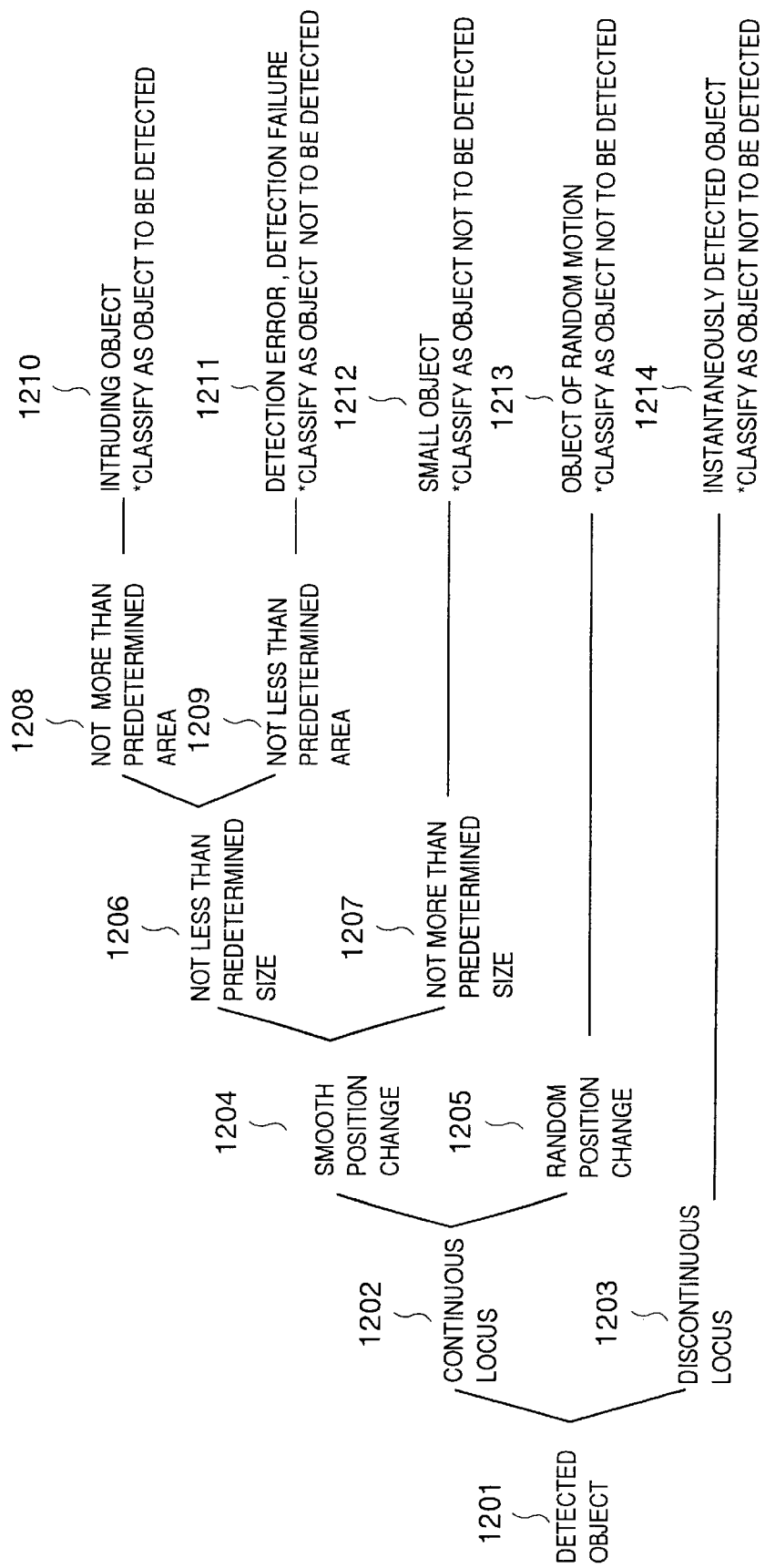

| CASE | | INDEX 1<br>ASPECT RATIO OF CIRCUMSCRIBED RECTANGLE (VERTICALLY LONG) | INDEX 2<br>DETECTED AREA/AREA OF CIRCUMSCRIBED RECTANGLE (NOT MORE THAN PREDETERMINED VALUE) | INDEX 3<br>HORIZONTAL LENGTH OF CIRCUMSCRIBED RECTANGLE (NOT MORE THAN 2.0 m) | INDEX 4<br>VERTICAL THICKNESS OF DETECTED OBJECT (HORIZONTAL LENGTH NOT MORE THAN 2.0 m) | INDEX 5<br>INCLUDING RECTANGLE AREA OF 0.5 m × 0.5 m (HORIZONTAL LENGTH NOT MORE THAN 2.0 m) |
|---|---|---|---|---|---|---|
| 1 | | ○ | × | ○ | ○ | ○ |
| 2 | THICKNESS NOT MORE THAN 0.5 m | × | × | △ | × | × |
| 3 | THICKNESS NOT LESS THAN 0.5 m | × | ○ | △ | ○ | ○ |
| 4 | THICKNESS NOT LESS THAN 0.5 m | × | ○ | △ | ○ | △ |
| 5 | THICKNESS NOT LESS THAN 0.5 m | × | × | △ | ○ | ○ |

METHOD OF DISTINGUISHING A MOVING OBJECT AND APPARATUS OF TRACKING AND MONITORING A MOVING OBJECT

CROSS-REFERENCE TO RELATED APPLICATION

This is a continuation-in-part of copending U.S. application Ser. No. 09/078521, filed May 14, 1998.

BACKGROUND OF THE INVENTION

The present invention relates to a monitoring technique using an image input device such as a camera, or more in particular to a moving object recognition method for automatically detecting a moving object that has entered the imaging view field in distinction from other various objects not to be monitored in the video signal obtained, and an apparatus for automatically tracking and monitoring a moving object detected using the method.

An object tracking and monitoring apparatus using an image input device such as a camera has been widely used. In recent years, however, a monitoring system has come to be required in which instead of a manned monitoring for detecting and tracking a moving object such as a human being, an automobile or a ship on the sea that has entered the view field of monitoring while watching the image displayed on the monitor, an intruding object can be automatically detected and tracked by an image signal input from an image input device such as a camera and a predetermined information or an alarm is given.

In a method for realizing such a system, the input image obtained from an image input device is compared with a reference background image (i.e. the image not including the object to be detected), and the difference in intensity is determined for each pixel, and an area with a large intensity difference is detected as an object. This method is called a subtraction method and has been widely used.

SUMMARY OF THE INVENTION

An application of the object tracking method using the subtraction method described above is the invention disclosed in U.S. Ser. No. 09/078,521 (EP 98108707.5) assigned to the same assignor as the assignee of the present application. The tracking method using the subtraction method poses the problems of a splitting in which a single object is observed and tracked temporarily as a plurality of objects and a coupling in which a plurality of objects are observed and tracked as a single object temporarily. These phenomena occur when detecting an object having a intensity near to that of the background image. In the invention disclosed in U.S. Ser. No. 09/078,521 (EP 98108707.5) described above, the change of connection state of a detected object between successive frames is classified into five states including appearance, single coupling, coupling, disappearance and separation, and these connection state changes are stored sequentially together with information such as the center of gravity or the detection range or the size of the object. Further, the inconveniences of the splitting or coupling are corrected based on the connection state change and information of the detected object in each frame thereby to realize an accurate tracking of an object.

As described above, the subtraction method is for detecting an object based on the difference for each pixel between the input image from an image input device such as a camera and the background image set in advance. In other words, the subtraction method is not selective in objects of selection. Another problem of the subtraction method, therefore, is that moving objects other than the object to be detected, such as trees and ocean waves in the view field (objects not required for detection) are detected undesirably.

More specifically, trembling of plants, fluttering of paper, cloth or the like and the intrusion of small living creatures or fallen leaves in the wind on the land and the motion of waves crushing against the wharf, floating trees on the water surface, the sun entering or leaving the clouds, the instantaneous intensity change of the lighthouse or the vehicle light, are not required to be detected in many cases. The conventional subtraction method poses the problem that an accurate tracking of a moving object is impossible in a scene having such an unrequired moving object.

The object of the present invention is to obviate these problems and to provide a reliable method of recognizing a moving object and a reliable apparatus for tracking and monitoring a moving object in which an object to be detected and other objects are distinguished from each other.

In order to achieve this object, according to one aspect of the invention, there is provided a moving object recognition method for recognizing a specified moving object in sequentially input image signals in distinction from other objects, comprising the steps of sequentially detecting at least one moving object in the sequentially input image signals by a subtraction method, sequentially storing, for each input image signal, in a memory at least one characteristic physical quantity which the moving object has, detecting at least one locus of the moving object based on characteristic physical quantities in the input image signals, storing in a memory characteristic physical quantities of the detected locus in such a manner that the characteristic physical quantities are associated with each other as a series of characteristic physical quantities of the moving object, previously setting a test or criterion of determining whether the moving object belongs to the specified moving object or belongs to objects other than the specified moving object, and determining or classifying from the series of characteristic physical quantities, whether or not said moving object is the specified moving object, based on the determining criterion.

According to an embodiment, the criterion or test described above includes the steps of calculating the time during which the locus of a moving object continues to exist from a series of time and positions at which the moving object is detected as included in the correlated series of characteristic physical quantities (referred to as physical quantities) stored in memory, and determining a moving object with the calculated time longer than a predetermined time as an object to be recognized while determining a moving object with the calculated time not longer than the predetermined time as an object not to be recognized.

Preferably, the locus of the detected moving object is determined using more than two input image signal frames, and the time during which the locus continues to exist is calculated using the number of continuous image signal frames at the time when the locus is detected.

According to another embodiment, the criterion or test described above includes the steps of calculating the variations of the change of the position of the moving object from a series of time and positions at which the moving object is detected as included in the correlated series of the physical quantities stored in memory, and determining a moving object with the calculated position change variation smaller than a predetermined value as an object to be recognized and a moving object with the calculated position change variation not smaller than the predetermined value as an object not to be recognized.

According to still another embodiment, the criterion or test described above includes the steps of calculating the maximum size of a detected moving object from the area thereof included in the correlated series of physical quantities stored in memory, and determining a moving object with the calculated maximum size larger than a predetermined value as an object to be recognized and a moving object with the maximum size not larger than the predetermined value as an object not to be recognized.

According to an embodiment, the area included in the series of physical quantities of each moving object is calculated from a circumscribed polygon about the area occupied by the moving object.

According to another embodiment, the area included in the information series of each moving object is calculated from the area occupied by the moving object.

According to another embodiment, the criterion or test includes the steps of calculating the minimum area of each of the moving objects from the correlated series of physical quantities stored in memory and classifying or determining a moving object with the calculated minimum area smaller than a predetermined area as an object to be recognized and a moving object with the calculated minimum area not smaller than the predetermined value as an object not to be recognized.

According to another embodiment, the criterion or test includes the steps of calculating the maximum area of each of the moving objects from the correlated series of physical quantities stored in memory, calculating the minimum area of each of the moving objects from the correlated series of physical quantities stored in memory, and determining or classifying a moving object with the maximum area larger than a first predetermined value and the minimum value smaller than a second predetermined value as an object to be recognized and determining or classifying other moving objects as objects not be recognized. Preferably, the first predetermined value is an estimated minimum area of the object to be recognized and the second predetermined value is an estimated maximum area of the object to be recognized.

According to another aspect of the invention, there is provided a method of recognizing or determining a specific moving object in sequentially input image signals in distinction from other objects, comprising the steps of sequentially detecting a plurality of moving objects in the sequentially input image signals, sequentially storing characteristic physical quantities of the detected moving objects, detecting one or more loci of the detected moving objects based on the physical quantities, storing a group of characteristic physical quantities included in each locus in association with each other as series of characteristic physical quantities of moving objects, and determining whether each moving object is said specified moving object or not based on the characteristic physical quantities including the detection time, position and area of each moving object changing each moment, wherein the determining step includes at least one of the substeps of calculating a time during which the locus of each moving object continues to exist from the detection time and position included in the series of characteristic physical quantities of the moving object and determining whether the moving object is the specified moving object or not from the time during which the locus continues to exist, calculating a position change variation of each moving object from a detection position included in the series of characteristic physical quantities of each moving object and determining whether the moving object is the specified moving object or not from the calculated variation, calculating a maximum area of each moving object from the area included in the series of characteristic physical quantities of the moving object and determining whether the moving object is the specified moving object or not from the calculated maximum area, and calculating a minimum area of each moving object from the area included in the series of characteristic physical quantities of the moving object and determining whether the moving object is the specified moving object or not from the calculated minimum area.

According to still another aspect of the invention, there is provided a moving object recognition method of sequentially detecting moving objects intruding into an imaging view field by the subtraction method and sequentially tracking and monitoring the moving object with an object tracking and monitoring apparatus, comprising the steps of sequentially storing characteristic physical quantities of a moving object detected by the object tracking and monitoring apparatus, detecting a locus of the detected moving object based on the characteristic physical quantities, storing the characteristic physical quantities as a series of characteristic physical quantities of a moving object, previously setting a test for determining whether the moving object belongs to an object to be tracked and monitored, classifying the moving object into an object to be tracked and monitored and an object not to be tracked or monitored from the stored series of characteristic physical quantities, based on the determining test, and tracking and monitoring as an intruding object the moving object classified as an object to be tracked and monitored.

According to a further aspect of the invention, there is provided an object tracking and monitoring apparatus comprising an image input device, an image memory for storing an image sequentially picked up by the image input device, a program memory for storing a program for operation of the object tracking and monitoring apparatus, a central processing unit for activating the object tracking and monitoring apparatus in accordance with the program, a work memory for analyzing the image stored in the image memory, an alarm unit activated by the central processing unit depending on the result of analysis in the work memory for issuing a signal noticeable by a person or an auxiliary animal, and a monitor unit for displaying a monitored image from the central processing unit issued in response to the analysis in the work memory, wherein the program includes code means for sequentially detecting the moving objects stored in the image memory, code means for sequentially storing characteristic physical quantities of the detected moving objects in the work memory, code means for determining one or more tracks or loci of a moving object based on the characteristic physical quantities of the detected moving object, code means for storing a group of characteristic physical quantities belonging to each locus in association with each other in the work memory as a series of characteristic physical quantitites of a moving object, code means for classifying the moving object into an object to be tracked and monitored and an object not to be tracked and monitored based on the stored series of characteristic physical quantitites, and code means for activating the object tracking and monitoring unit in such a manner as to track the moving object classified as an object to be tracked and monitored as an intruding object.

In order to achieve the object described above, according to still another aspect of the invention, the detected object is classified into a plurality of types based on at least one of the shape and the size of the detected area of the detected object.

Specifically, while monitoring the area including the place where a wave is likely to exist in the imaging view field, waves constituting objects not to be tracked and objects to be tracked are recognized in distinction from each other thereby to reduce the detection error. For this purpose, the geometric feature of the detected area for wave detection is utilized. In the case of the ocean monitoring, for example, the distance to the object is generally sufficient long as compared with the height where a camera is installed, and therefore the camera angle of elevation is small as viewed from the object. As a result, as for a wave observed as a swell of the sea surface changing violently, the wavelength is observed in an apparently large magnitude as compared the amplitude of the wave. In other words, the wave is often detected as a horizontally long object. In view of this feature, the present invention is intended to remove the wave detected area from objects to be tracked, based on at least one of the shape and size of the area detected by object detection, while at the same time removing the wave detected area from the objects to be tracked.

According to one aspect of the invention, there is provided an object tracking method comprising the steps of calculating the intensity difference for each pixel between the image obtained by an imaging device such as a camera and the reference background image where no object to be detected is imaged, determining a pixel having a large difference value as the one where an object exists thereby to detect the area of the pixel, and determining whether a detected area is the one detected by error due to a wave based on the shape information of the detected area so that in the case where the detected area is the one detected by error due to a wave, removing the detected area from the category of objects to be tracked thereby to reduce the erroneous detection of a wave.

According to an embodiment of the invention, there is provided an object tracking method comprising the steps of determining the aspect ratio of a circumscribed rectangle about a detected area and classifying the shape of the area as horizontal long or vertically long, calculating the ratio of which the pixels having an object in a detected area represents of the circumscribed rectangle thereof classified as horizontally long, and removing as a wave a detected area in which the ratio of the pixels having an object therein represents not less than a predetermined value.

According to another embodiment of the invention, there is provided an object tracking method comprising the step of removing a detected area, as determined from the shape information thereof, having a vertical size (height) smaller than the maximum size to be determined as a wave (predetermined height) from the category of objects to be tracked, thereby reducing the chance of erroneously detecting a wave of a height not higher than a predetermined value.

According to still another embodiment, there is provided an object tracking method comprising the steps of calculating the histogram of the number of pixels in vertical direction in a detected area having a vertical size larger than the predetermined height, determining the number of pixels (predetermined length) continued in horizontal direction and larger than a predetermined height from the histogram, and determining as a wave and removing from the category of objects to be tracked the detected areas with the number of continuous pixels smaller in number than the number (predetermined length) to be determined as a wave thereby to reduce the chance of detecting a wave by error.

According to a further embodiment, there is provided an object tracking method comprising the steps of determining the aspect ratio of the circumscribed rectangle about a detected area from the shape information of the detected area and classifying the detected area as a horizontally long area or a vertically long area, calculating the ratio which the pixels having an object therein represents of the circumscribed rectangle area for the detected area with the circumscribed rectangle thereof classified as a horizontally long area, removing from the objects to be tracked the detected area determined to represent not less than a predetermined ratio of the circumscribed rectangle thereof, determining as a wave and removing from the objects to be tracked the detected area determined to represent not more than a predetermined ratio of the circumscribed rectangle thereof and also determined to have a vertical size (height) smaller than the maximum size (predetermined height) to be determined as a wave, calculating a histogram of the number of pixels in vertical direction in a detected area determined to have a vertical size larger than the predetermined height value, determining from the histogram the number of pixels (predetermined length) continued in horizontal direction larger than the maximum size to be determined as a wave, and determining and removing as a wave from the category of objects to be tracked the detected area having a smaller number of continued pixels than the size determined as a wave (predetermined length value), thereby reducing the chance of detecting a wave by error.

In another approach to achieving the object of the invention, the detected area determined as a wave is set as a wave candidate, and the series of the wave candidate determination result for a detected object stored in the tracking process is analyzed retroactively, so that the objects are classified into an object to be detected and a wave, and the wave is removed.

According to a still further aspect of the invention, there is provided an object tracking method comprising the steps of calculating the difference of intensity value for each pixel between the image produced from an imaging device such as a camera and a reference background image in which no object to be detected is imaged, determining an area of the pixels having a large difference as the pixels having an object existing therein and sequentially detecting the area of the pixels, tracking the detected object based on the detection position and detection time of the detected object and the detection position and position change with time of the objects detected in the past, determining whether the detected area is the one detected by error due to a wave based on the shape information of the detected area and determining the detected object as a wave candidate in the case where the detected area is determined to have been detected by error due to a wave, sequentially storing the series of the wave candidate determination result of the detected objects, calculating the ratio of the number of detected objects determined as wave candidates retroactively, and determining as a wave and removing from the objects to be tracked any detected object determined as a wave candidate representing the ratio not less than a predetermined value.

According to still another embodiment, there is provided an object tracking method comprising the steps of determining the aspect ratio of the circumscribed rectangle about a detected area and classifying the detected object as horizontally long or vertically long, calculating the ratio which the pixels having the detected object existing therein represent of the circumscribed rectangle area determined as horizontally long, determining as a wave candidate the detected object representing not less than a predetermined ratio of the circumscribed rectangle thereof, storing the series of the wave candidate determination result of the detected object, calculating the ratio of the number of the detected objects determined as a wave candidate retroactively, and determining as a wave and removing from the objects to be tracked the detected area determined as a wave candidate representing not less than a predetermined ratio, wherein the detected area determined as a wave is removed from the category of objects to be tracked thereby to track an object to be tracked while reducing the wave recognition error.

According to a further embodiment, there is provided an object tracking method comprising the step of determining as a wave candidate a detected object having a vertical size (height) smaller than the maximum size (predetermined height) to be determined as a wave, wherein in the case where the ratio of the number of the detected objects determined as a wave candidate retroactively is not less than a predetermined value, the particular detected object is determined as a wave and removed from the objects to be tracked thereby to reduce the erroneous recognition and the chance of erroneously recognizing a wave.

According a still further embodiment, there is provided an object tracking method comprising the steps of calculating a histogram of the number of pixels existing in vertical direction in a detected object having a vertical size (height) larger than a maximum size (predetermined height value) to be determined as a wave, determining the number of pixels continued in horizontal direction larger than a maximum size (predetermined height) to be determined as a wave from the histogram, and setting as a wave candidate a detected object having the number of pixels continued in horizontal direction smaller than a maximum size (predetermined length to be determined as a wave, wherein in the case where the ratio of the number of detected objects determined as a wave candidate is not retroactively less than a predetermined ratio, the particular detected object is determined as a wave and removed from the category of objects to be tracked, thereby reducing both the erroneous wave recognition and the chance of erroneous wave recognition.

According to a still further embodiment, there is provided an object tracking method comprising the steps of determining the aspect ratio of the circumscribed rectangle about a detected object and classifying the circumscribed rectangle as horizontally long or vertically long, calculating the ratio which the pixels of the detected object with the circumscribed rectangle thereof determined horizontally long represents of the circumscribed rectangle area, determining as a wave candidate the detected object representing a ratio not less than a predetermined value with respect to the circumscribed rectangle thereof, determining as a wave candidate a detected object representing not more than a predetermined ratio of the circumscribed rectangle thereof and having a vertical size (height) smaller than a maximum size (predetermined height) to be determined as a wave, calculating a histogram of the number of pixels existing in vertical direction in a detected object determined to have a vertical height larger than a predetermined height value, determining the number of pixels continued in horizontal direction larger than a predetermined height value from the histogram, and determining as a wave candidate a detected object having the number of continued pixels smaller than an apparent horizontal preset size of an object to be detected, wherein in the case where the number of detected objects determined as a wave candidate retroactively represents not less than a predetermined ratio, the particular detected object is determined as a wave and removed from the category of objects to be tracked, thus reducing both the wave recognition error and the chance of wave recognition error.

BRIEF DESCRIPTION OF THE DRAWINGS

FIGS. 9A to 9C are diagrams useful for explaining the principle of tracking a detected object using the subtraction method.

FIG. 13 is a diagram for explaining the embodiment of the invention shown in FIG. 5 by a decision tree.

FIG. 35 is a diagram indicating the relation between detected cases and indexes.

DESCRIPTION OF THE EMBODIMENTS

Prior to entering the description of embodiments, the process according to the subtraction method will be explained with reference to FIGS. 7, 8, 9A, 9B, 9C.

Figure 7:
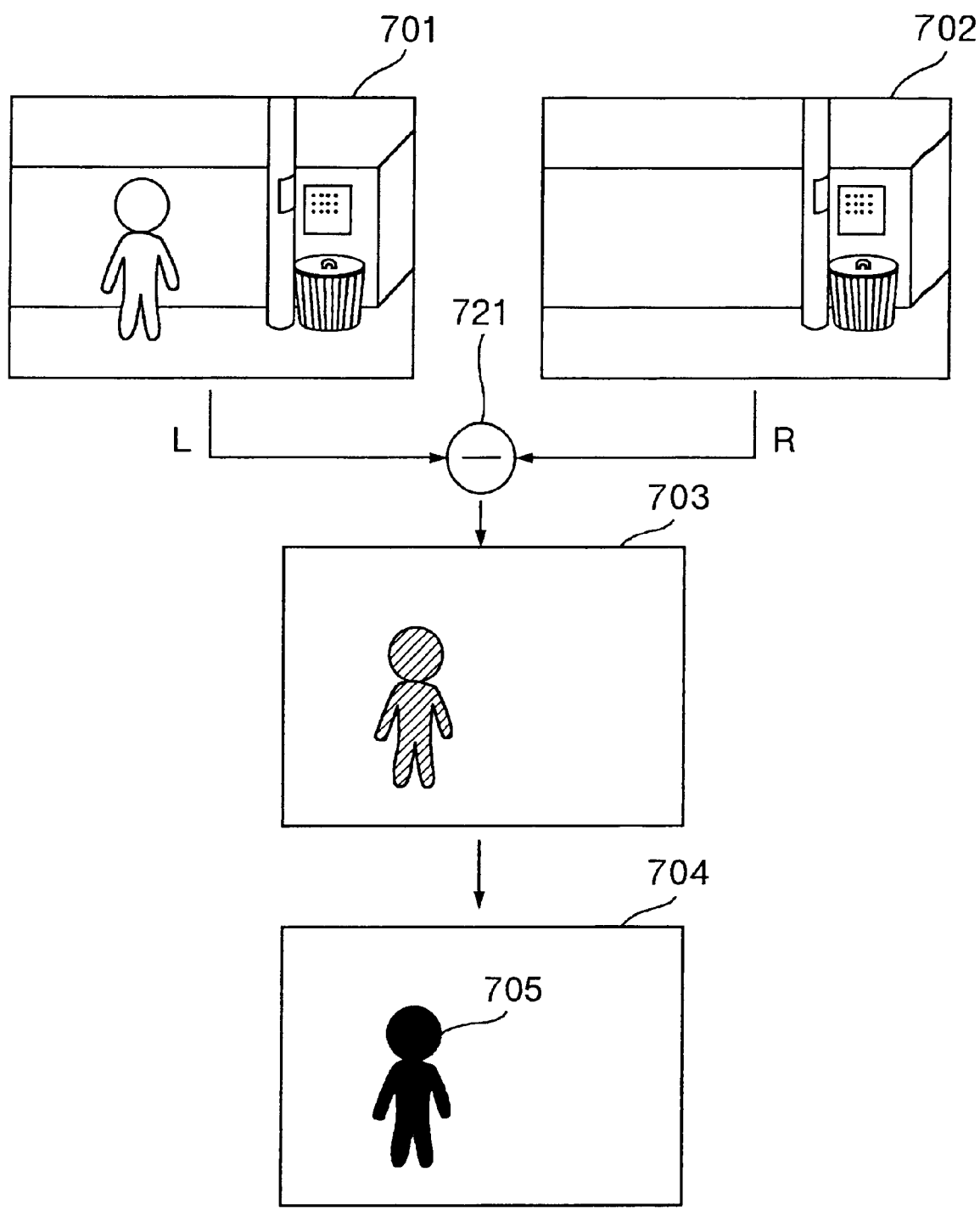
FIG. 7 is a diagram useful for explaining the principle of object detection by the subtraction method.

FIG. 7 is a diagram for explaining the principle of an object detection according to the subtraction method. Numeral 701 designates an input image L, numeral 702 a reference background image R, numeral 703 a difference image, numeral 704 a binarized image, numeral 705 a detected object image, and numeral 721 a subtractor. In FIG. 7, the subtractor 721 calculates the difference for each pixel between the input image L 701 obtained from an image input device such as a camera and the background image R 702 prepared in advance and outputs a difference image 703. Then, in the difference image 703, the pixels having a value of less than a predetermined threshold are set as "0" and the pixels having a value of not less than the threshold are set as "255" (calculated with each pixel as eight bits), thereby producing a binarized image 704. As a result, the object of a human being picked up as an input image 701 is detected as a detected object image 705 in the binarized image 704.

Figure 8:
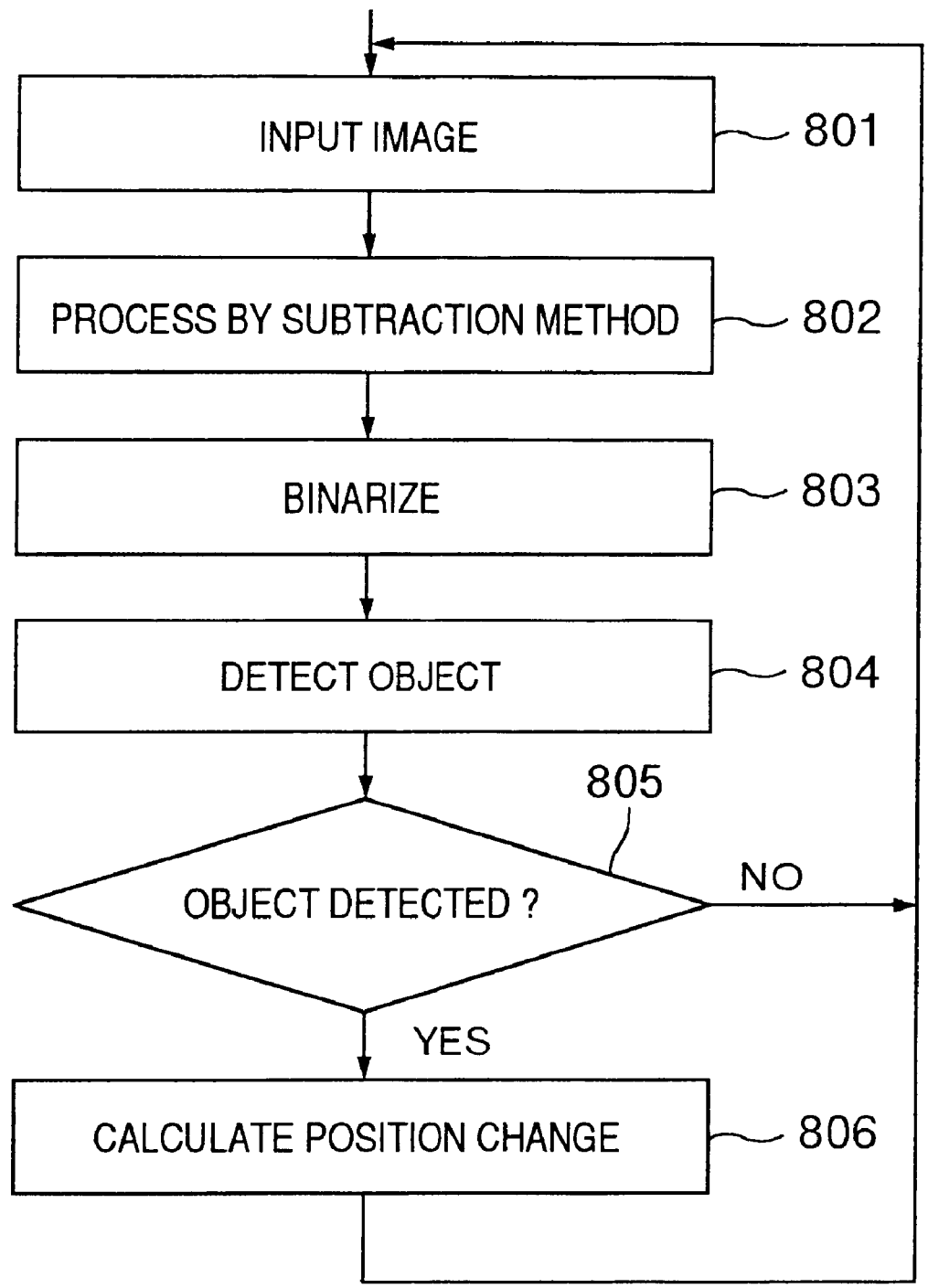
FIG. 8 is a flowchart for explaining the basic principle of tracking a detected object using the subtraction method.

The automatic tracking of a detected object is carried out by sequentially detecting the object by the subtraction method and determining the position change of the detected object on the image, e.g. the motion of the object based on the change of the center of gravity at each moment. FIG. 8 is a flowchart showing the basic process of the method of tracking a detected object according to the subtraction method, comprising an image input step 801 for producing an input image 701 from an image input device such as a camera, a subtraction processing step 802 for producing a difference image 703 from the difference for each pixel between the input image 701 and a reference background image 702 prepared in advance as an image lacking the object to be tracked, a binarization step 803 for producing a binarized image 704 by setting the pixels of the difference image 703 having a value of less than a predetermined threshold as "0" and the pixels having a value not less than a predetermined threshold as "255", an object detection step 804 for detecting an object 705 intruding into the imaging view field by applying well-known labeling process to the binarized image 704, and a position change calculation step 806 for determining the change in the position where an object to be tracked, if any, is detected in the immediately preceding frame and the position where the object to be tracked is detected in the current frame. The wording "immediately preceding frame" indicates the frame produced at time point $t_0-1$ in which $t_0$ is assumed to be present time point. The flow of each step will be explained with reference to FIGS. 9A, 9B, 9C. FIGS. 9A to 9C are diagrams for explaining the principle of tracking a detected object using the subtraction method. Numerals 901, 902, 903, 904 designate images, numerals 905, 906, 907 designate detected objects, numerals 908, 909, 910 the positions of the center of gravity, numeral 911 an image, and numerals 912, 913 displacements. First, an object within the view field is detected by the image input step 801, the difference processing step 802, the binarization step 803 and the object detection step 804 through the process shown in FIG. 8. In FIG. 9A, the image 901 represents a binarized image at time point $t_0-1$, the image 902 a binarized image at time point $t_0$, and the image 903 a binarized image at time point $t_0+1$. In FIG. 9B, the image 904 represents the detected objects 905, 906, 907 and the centers of gravity 908, 909, 910 of all the binarized images 901, 902, 903 shown at the same time.

In this example, the representative position of a detected object is assumed to be the center of gravity thereof. It may, however, be other values indicating, for example, the upper end or the lower end of the detected area, the center of a circumscribed polygon or the like factors indicating the position of the object.

The center of gravity C is given by equation (1) as $$C = (X, Y) \begin{cases} X = \dfrac{1}{[B]} \sum_{(x,y)\in [B]} x \\ Y = \dfrac{1}{[B]} \sum_{(x,y)\in [B]} y \\ B = \{(x, y) | f(x, y) = 255\} \end{cases} \quad (1)$$

where f(x,y) is assumed to be a binarized image of the difference ("0" for less than threshold, and "255" for not less than threshold), and [B] is the number of pixels associated with B. The image 911 indicates the centers of gravity 908, 909, 910 at various time points simultaneously by way of explanation. In the position change calculation step 806, the motion of the detected object obtained at time points $t_0-1$, t1 and $t_0+1$ is calculated as a displacement of the centers of gravity 908, 909, 910 in the image 911 at continuous time points. In other words, the motion between time points $t_0-1$ and $t_0$ is calculated as a displacement 912 of the centers of gravity 908, 909, and the motion between time points $t_0$ and $t_0+1$ as a displacement 913 of the centers of gravity 909, 913. Thus, the objects 905, 906, 907 detected as shown in the image 904 are determined as having moved to the centers of gravity 908, 909, 910 at time points $t_0-1$, and $t_0+1$, respectively.

Now, returning to the invention, in a method of tracking and monitoring an object according to the invention, objects to be detected and objects not to be detected are recognized by being classified into at least one category based on series of characteristic physical quantities of temporal and/or spatial physical quantities of the detected objects including the detection time, the center of gravity, the area, the size (e.g. the width and height of a circumscribed rectangular), the amount of shift (deviation, velocity, acceleration) from the previous frame, continuity (the number of frames over which the object can be continuously tracked), variations in deviation, velocity, acceleration and the like, intensity distribution (e.g. spectrum distribution), color distribution and so forth stored in the process of tracking.

Specifically, according to this invention, the difference between the input image from a camera and a reference background image not including the object to be detected is determined for each pixel, and areas associated with a large difference value are sequentially detected as objects to be detected, and the change of the detection position of the sequentially detected objects is determined retroactively to one or a plurality of the preceding frames thereby to determine the locus of the object. The characteristic physical quantities of each object included in the locus thus determined are used as an information series (series of characteristic physical quantities), so that the characteristic physical quantities including the detection time, position change and the size of the detected objects are sequentially stored. The continuity and variations of the locus are determined from the stored information series including the detection time and the position change, and the size of the detected area is detected from the stored size information series. By combining these determinations, objects to be detected and objects not to be detected are recognized in distinction from each other.

In the above explanation, the criterion or test of determining the size of the detected area differs depending upon differences between the specified moving object to be monitored and other surrounding objects and their characteristic physical quantities. Further, the surrounding objects which need to be distinguished from specified, especially, the fluttering of tree leaves or the like plants or paper, motion of ocean waves, intrusion of falling leaves, floating lumbers or small living creatures, the instantaneous intensity change of the lamps in the lighthouses or automobiles or other random motions, instantaneous occurrences, objects having a small detected area, which are derived primarily from the natural environment, are recognized as unrequired objects to be detected and, the change in sunlight entering or leaving clouds, vibrations of the camera body or earthquakes can also be recognized to thereby distinguish a specified moving object from other detected moving objects.

Figure 6:
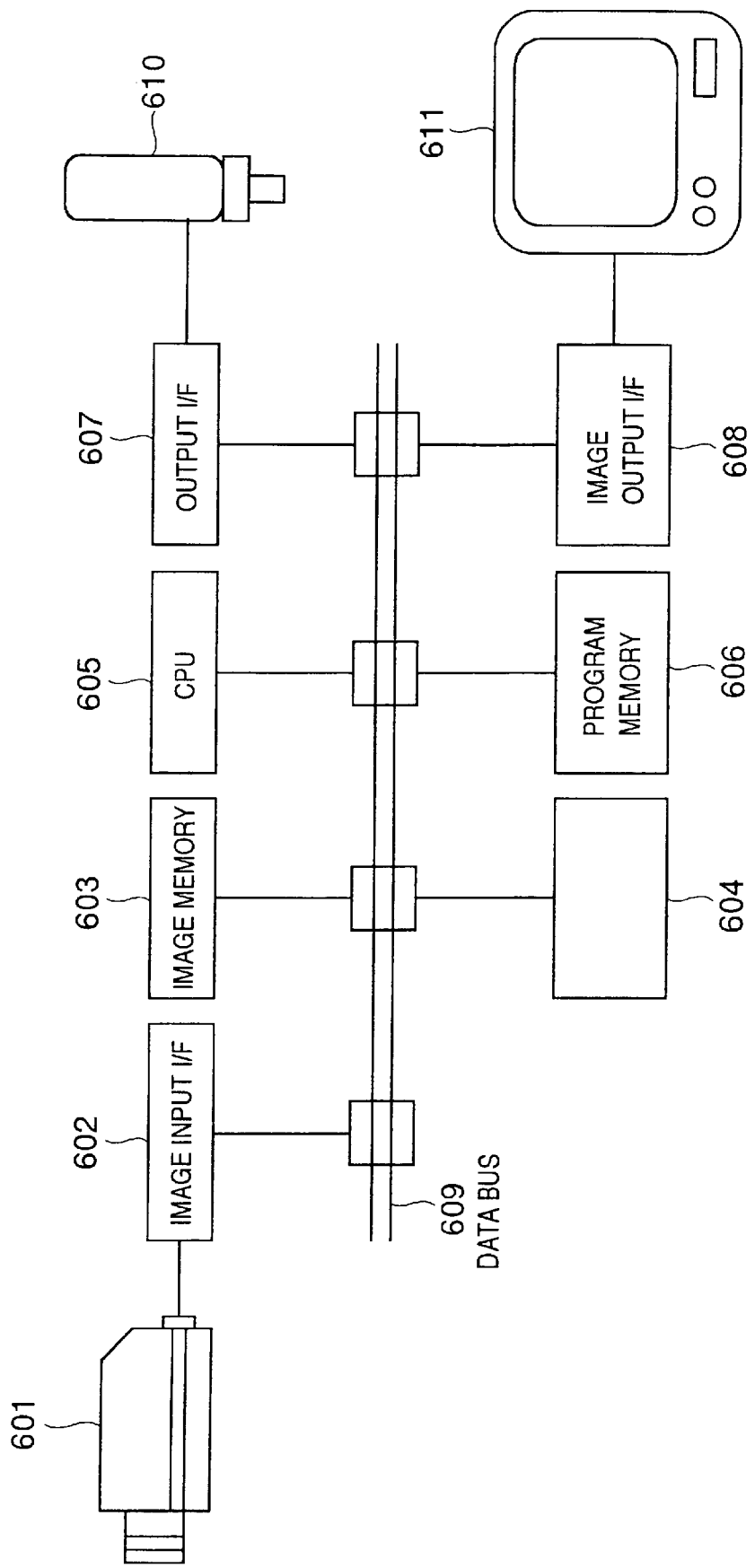
FIG. 6 is a block diagram showing a configuration of an object tracking and monitoring apparatus according to an embodiment of the invention.

FIG. 6 shows an example hardware configuration of an object tracking and monitoring apparatus shared by the embodiments of the invention.

In FIG. 6, numeral 601 designates a television camera (hereinafter referred to as the TV camera), numeral 602 an image input I/F, numeral 609 a data bus, numeral 603 an image memory, numeral 604 a work memory, numeral 605 a CPU, numeral 606 a program memory, numeral 607 an output I/F, numeral 608 an image output I/F, numeral 610 an alarm lamp and numeral 611 a monitor. The TV camera 601 is connected to the image input I/F 602, the alarm lamp 610 is connected to the output I/F 607, and the monitor 611 is connected to the image output I/F 608. The image input I/F 602, the image memory 603, the work memory 604, the CPU 605, the program memory 608, the output I/F 607 and the image output I/F 608 are connected to the data bus 609. In FIG. 6, the TV camera 601 images objects in the imaging view field including the area to be monitored. The TV camera 601 converts the image thus picked up into a video signal, which is input to the image input I/F 602. The image input I/F 602 converts the input image signal into a format handled in the object tracking device and sends it to the image memory 603 through the data bus 609. The image memory 603 accumulates the image data thus sent thereto. The CPU 605 analyzes in the work memory 604 the images accumulated in the image memory 603 in accordance with the program previously stored in the program memory 606. As a result of this analysis, information is obtained, for example, on the intrusion of an object to be detected into a predetermined area to be monitored within the view field (for example, the imaging view field includes a gate and the road in front of the gate, and the predetermined area to be monitored covers the gate and the neighborhood thereof). In accordance with the processing result, the CPU 605 turns on the alarm lamp 610 through the output I/F 607 and the data bus 609 on the one hand and displays the image of the processing result, for example, on the monitor 611 through the image output I/F 608 on the other hand. The output I/F 607 converts the signal from the CPU 605 into a format usable by the alarm lamp 610 and sends it to the alarm lamp 610. The image output I/F 608 converts the signal from the CPU 605 into a format usable by the monitor 611 and sends it to the alarm lamp 610. The monitor 611 displays the image showing the result of detecting an intruding object.

The flowcharts described below all refer to the object tracking and monitoring apparatus having the hardware configuration of FIG. 6.

Figure 1:
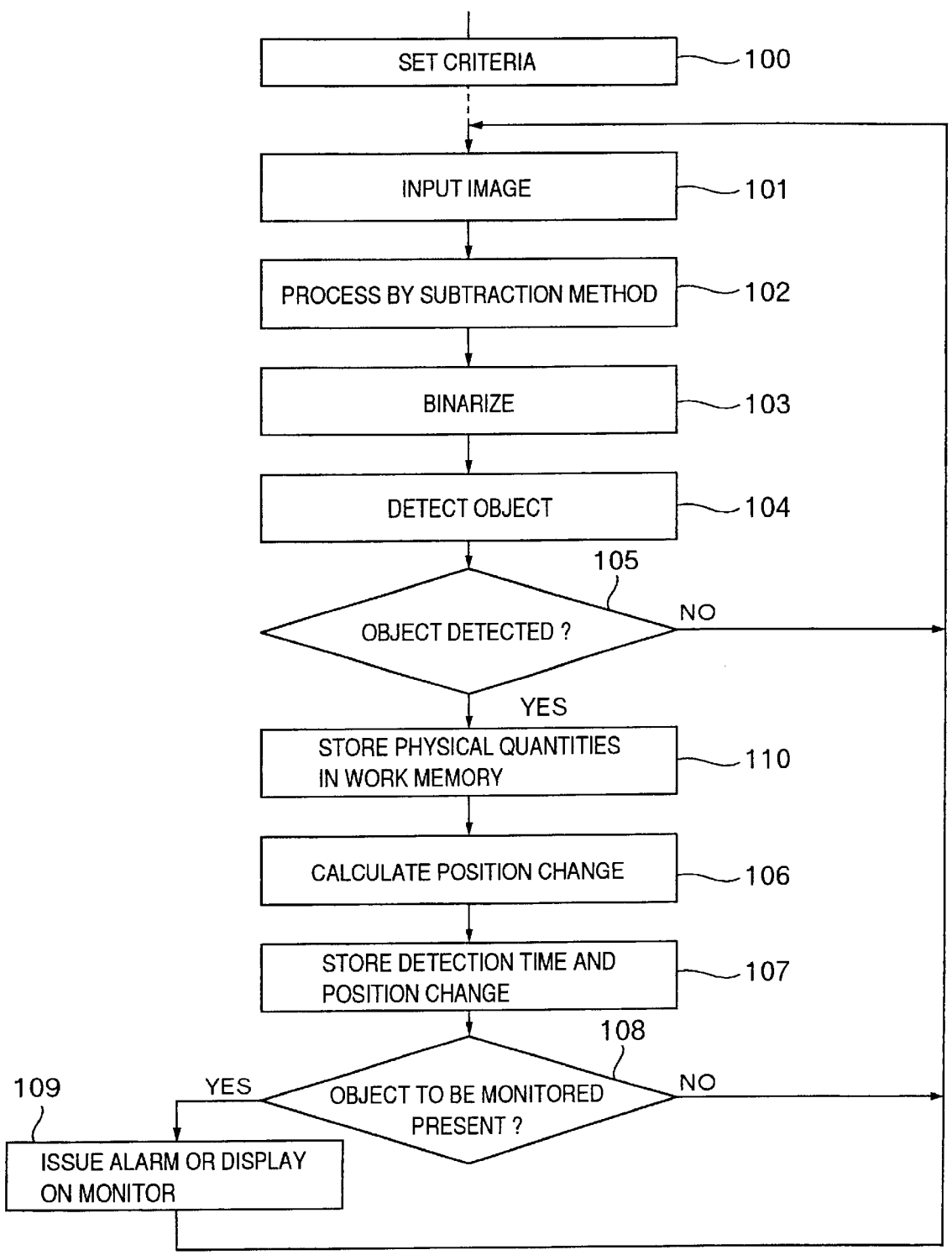
FIG. 1 is a flowchart for explaining the operation of a first embodiment of the present invention.

FIG. 1 is a flowchart for calculating the position change of an object according to a first embodiment of the invention. With reference to FIGS. 7 and 9A to 9C, the process of steps 101 to 105 in the flowchart of FIG. 1 will be explained.

In step 100, criteria or test for determining whether to track a detected object or not is set. This step occurs in the factory before the object tracking and monitoring apparatus is shipped to the user or can be set after by the shipment. This step is explained later. Note that the step 100 is not shown in the remaining Figures.

At time point t0, an input image 701 shown in FIG. 7 corresponding to the pixels in the number of 320×240, for example, is obtained from the TV camera 601 (image input step 101). Then, the difference between the input image 701 and the reference background image 702 stored in the image memory 603 is calculated for each pixel by a subtractor 721 thereby to produce a difference image 703 (difference processing step 102). The difference image 703 is processed with respect to a threshold, so that the intensity value of the pixels not less than a preset threshold level is converted into "255" as a portion containing an object to be detected, while the intensity value of the pixels less than the preset threshold level, on the other hand, is converted into "0" as a portion lacking an object to be detected, thereby producing a binarized image 704 (binarization step 103). Further, a solid area 705 associated with the intensity value of "255" is extracted by the labeling method, for example, and detected as a detected object (object detection processing step 104). In FIG. 9A, assume that the detected object extracted by the labeling method described above is an object 905 detected at time point t0. The center of gravity 908 of the detected object 905 is assumed to coincide with the position of the detected object. In the case where no object is detected in the object detection processing step 104, the process returns to the image input step 101, while when an object is detected, on the other hand, the characteristic physical quantities of the detected object are sequentially stored in the work memory 604 (step 110) followed by proceeding to the position change calculation step 106 (detected object presence/absence determination step 105).

The characteristic physical quantities of the detected object stored in the work memory 604 include the detection time of the detected object, the detection position represented by the center of gravity of the detected object and the area of the detected object. The characteristic physical quantities, however, are not limited to these factors but of course can include the other physical quantities. Examples include the displacement amount at each time point and the area change amount of the detected object at each time point, the size, intensity (spectrum), and color at each time point and may even include statistically processed data thereof.

The step 100 previously sets a criterion or test with respect to the characteristic physical quantities for determining whether or not the detected object is to be tracked and monitored. More specifically, by the step 100 of setting, optimal reference values are previously set as a criterion or test with respect to the characteristic physical quantities through conducting computations and experiments in accordance with behavioral characters or features of the objects to be tracked and monitored and objects other than the objects to be tracked and in consideration of related factors such as the environment of the monitoring area. The determining criterion or test may be changed as required by the object tracking and monitoring apparatus.

Now, the process of steps 106 and 107 in the flowchart of FIG. 1 will be explained with reference to FIGS. 14A, 14B, 15, 16, 11, 12 and 10.

Figure 14A:
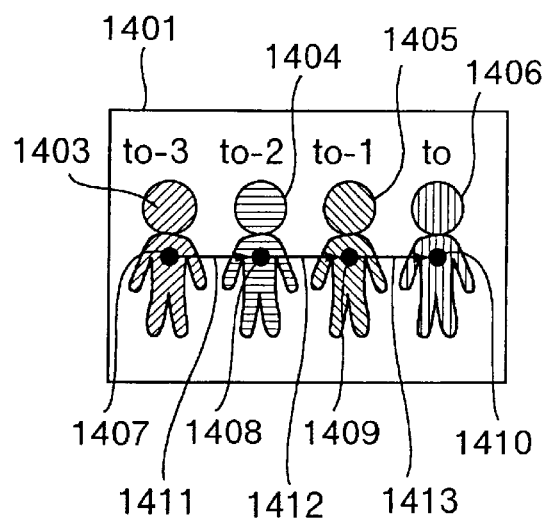
FIGS. 14A, 14B are diagrams useful for explaining the principle of an example of object tracking according to the invention.
Figure 14B:
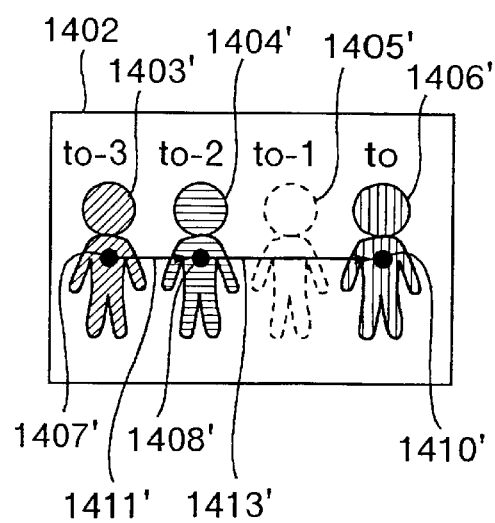
Figure 15:
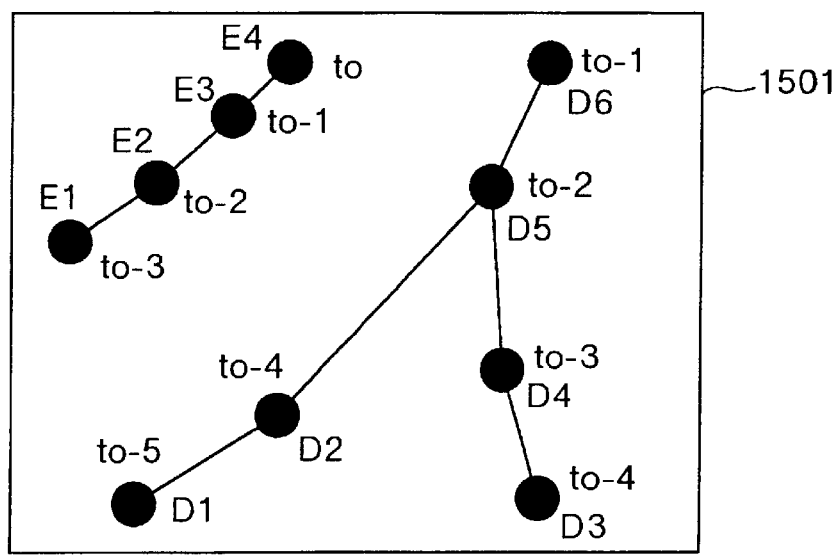
FIG. 15 is a diagram for explaining another list structure.
Figure 16:
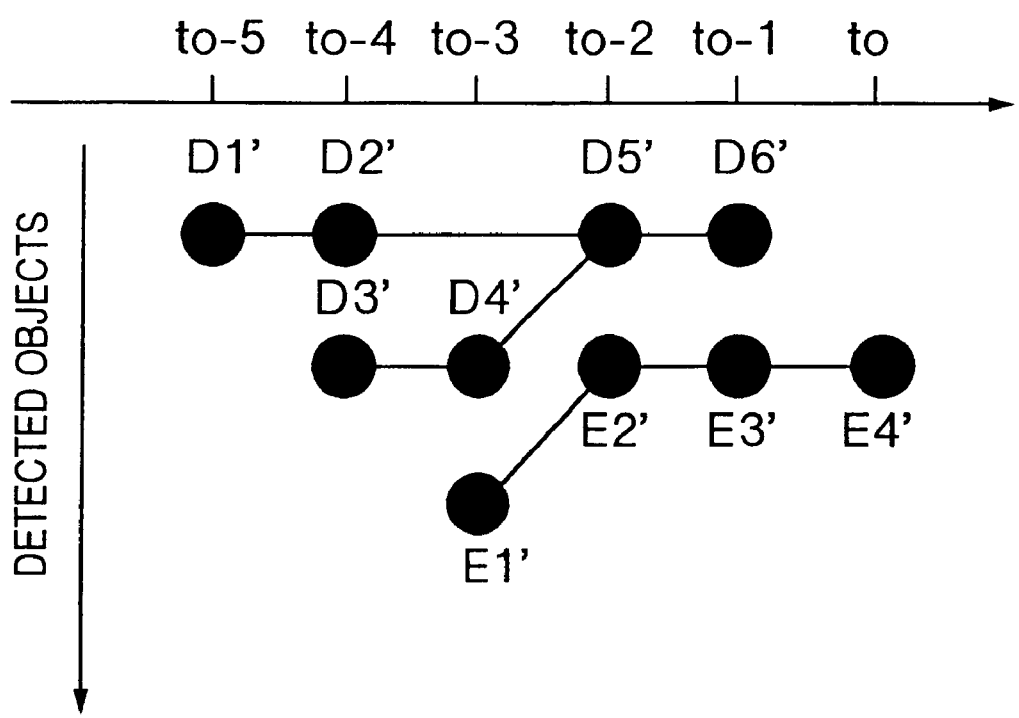
FIG. 16 is a diagram for explaining the connection structure of FIG. 15.

FIGS. 14A, 14B are diagrams for explaining an example of the method of determining a locus according to this invention. Numerals 1401, 1402 designate images, numerals 1403, 1404, 1405, 1406, 1403', 1404', 1405', 1406' detected objects, numerals 1407, 1408, 1409, 1410, 1407', 1408', 1410' the centers of gravity, and numerals 1411, 1412, 1413, 1411, 1413' the displacement. FIG. 15 is a diagram for explaining a list structure according to an embodiment of the invention. Numeral 1501 designates an image, numeral D1 an object detected in the frame at time point $t_0-5$, numerals D2, D3 objects detected at time point $t_0-4$, numerals D4, E1 objects detected at time point $t_0-3$, numerals D5, E2 objects detected at time point $t_0-2$, numerals D6, E3 objects detected at time point $t_0-1$, and numeral E4 an object detected at time point $t_0$. FIG. 16 is a diagram for explaining the connecting structure of FIG. 15. In FIG. 16, the horizontal axis represents the time and the vertical axis the state of the detected objects. Numeral D1' designates an object detected at time point $t_0-5$, numerals D2', D3' objects detected at time point $t_0-4$, numerals D4', E1' objects detected at time point $t_0-3$, numerals D5', E2' objects detected at time point $t_0-2$, numerals D6', E3' objects detected at time point $t_0-1$, and numeral E4' an object detected at time point $t_0$. Numerals D1, D2, D3, D4, D5, D6, E1, E2, E3, E4, D1', D2', D3', D4', D5', D6', E1', E2', E3', E4' designated by black circles in FIGS. 15 and 16 indicate only detected objects but not the area of the binary images detected.

The object tracking and monitoring apparatus is sequentially supplied with images from the TV camera and detects an object from the input images. The image 1401 shown in FIG. 14A is a binary image detected sequentially in step 104, and by way of explanation, simultaneously represents all the detected objects 1403, 1404, 1405, 1406 and the centers of gravity 1407, 1408, 1409, 1410 of the respective detected objects at time points $t_0-5$ to $t_0$. Also, the image 1402 of FIG. 14B refers to the case in which the object 1405' which otherwise should have been detected over the entire time zone could not be detected, unlike in the image 1401, due to the fact that the intensity difference between it and the background image is not more than a threshold level (such as when the object 1405' is hidden behind another object or in the shadow of a tree or a building). The detected objects and the centers of gravity thereof are designated by reference numerals, with a dash, corresponding to those in the image 1401. Each black circle represents a detected object.

In the conventional object tracking and monitoring method, the connection is lost before and after this detected object 1405'.

In the present embodiment, however, as described below, not only the connection with the immediately preceding frame is used for object tracking but also the connection with the preceding N frames is processed, and therefore even an object that could not be detected instantaneously or temporarily can be tracked (within the range of N−1 frames).

Specifically, in the position change calculation step 106, the distance between the centers of gravity of respective objects detected between time point $t_0-N$ and time point $t_0-1$ is calculated at time point $t_0$, and the objects detected during the period between time point $t_0-N$ and time point $t_0-1$ with the distance therebetween not more than a predetermined value are defined to be connectable objects (adjacent objects). The predetermined value is defined as the distance in which the objects detected in the continuous frames can be assumed to be the same object (connectable), and set to a value larger (about twice) than the apparent rate for the object to be monitored. The reason why this value is set large is that the representative position of the detected object used for tracking is not the center of gravity nor does it necessarily indicate a predetermined portion of the detected object. In the case where this value is large, the same object can be connected without fail between the continuous frames. Nevertheless, the portions detected by noises or the like are also undesirably connected, thereby making the subsequent tracking correction (determination or correction of the separation) and the track estimation difficult. In the case where the value is too small, on the other hand, the same object cannot be connected in the continuous frames. The actual set value, therefore, depends on the imaging conditions and the rate at which the object moves. In an experimental system, it is set to 40 pixels. In the case where an object (assumed to move at the rate of 5 km/h (1.4 m/s)) moving in horizontal direction with respect to the imaging surface 50 m ahead is monitored with an image of 320×240 pixels, 0.3 frame/s, using a TV camera having a ½-type CCD (with the element size of 6.5 mm×4.8 mm) with a focal length of 25 mm, for example, the view field in horizontal direction is 6.5 mm/25 mm×50 m=13.0 m and the apparent speed is 1.4 m/s×0.3 s/frame/13.0 m×320 pixels= 10.3 pix/frame. Thus, the distance in which connection is considered possible is about 20 pix.

The change of the detection position between the connectable object and the object detected at time point $t_0$ is defined as the displacement (change in the detection position) of the object detected at time point $t_0$.

In other words, this detection position change constitutes the locus of the detected object. In this process, N (N: natural number) is the number of frames involved of the connectable object. In the case where N=1, for example, an object connectable is detected only in the continuous frames.

Figure 11:
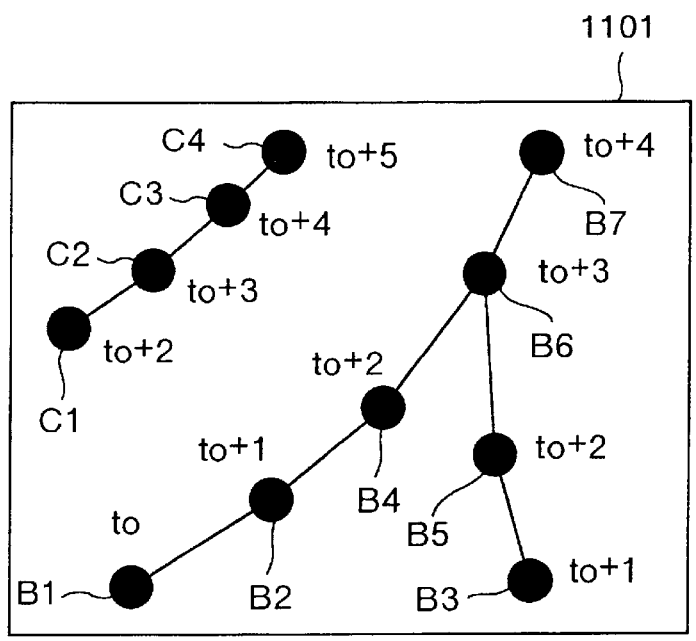
FIG. 11 is a diagram for explaining a list structure.
Figure 12:
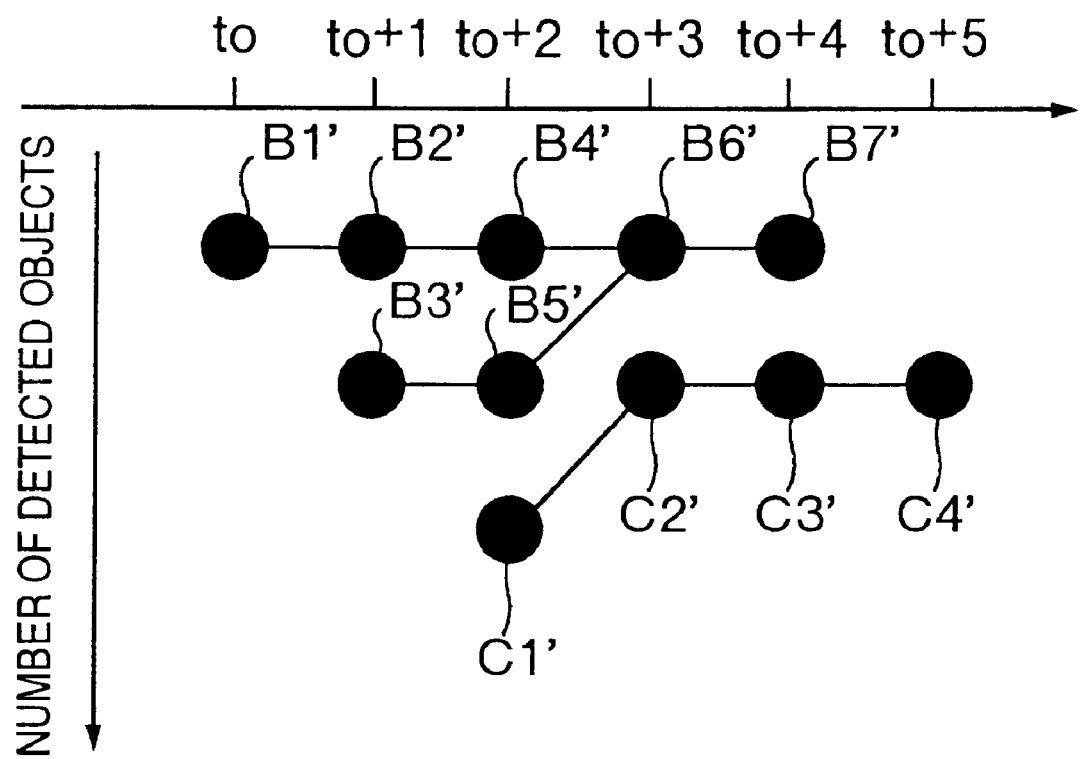
FIG. 12 is a diagram for explaining the connection structure of FIG. 11

This example will be explained with reference to FIGS. 11 and 12. FIG. 11 is a diagram for explaining a list structure, and FIG. 12 is a diagram for explaining a connection structure. Numeral 1101 designates an image, numeral B1 an object detected at time point $t_0$, numerals B2, B3 objects detected at time point $t_0+1$, numerals B4, B5, C1 objects detected at time point $t_0+2$, numerals B6, C2 objects detected at time point $t_0+3$, numerals B7, C3 objects detected at time point $t_0+4$, and numeral C4 an object detected at time point $t_0+5$. FIG. 12 is a diagram in which the horizontal axis represents time and the vertical axis the number of detected objects. Numeral B1' designates an object detected at time point $t_0$, numerals B2', B3' objects detected at time point $t_0+1$, numerals B4', B5', C1' objects detected at time point $t_0+2$, numerals B6', C2' objects detected at time point $t_0+3$, numerals B7', C3' objects detected at time point $t_0+4$ and C4' an object detected at time point $t_0+5$. In FIG. 11, the image 1101 represents objects detected during the period from time point $t_0$ to time point $t_0+5$ at the same time by way of explanation, in which each black circle corresponds to one detected object. Also, FIG. 12 indicates the list structure of the object information stored in the work memory 604, in which each black circle corresponds to one object information storage area. The detected object B1 in the image 1101 corresponds to the object information storage area B1' in FIG. 12. Also, the lines connecting the black circles in FIG. 12 indicate the pointer connection of the list structure in each object information storage area. Thus, the information series of the objects detected as in the image 1101 is stored as the list structure of FIG. 12 in the work memory 604. Numerals B1, B2, B3, B4, B5, B6, B7, C1, C2, C3, C4, B1', B2', B3', B4', B5', B6', B7', C1', C2', C3', C4' indicated by black circles as described above represent only detected objects but not the area of a binary image detected.

In the example explained with reference to FIGS. 11 and 12, a connectable object can be detected correctly even in the case where the number N of frames involving a connectable object is one (only the continuous frames). In the example shown in FIGS. 14A, 14B, 15, 16 described below, however, correct detection is difficult in the case where the number N of frames involving connectable objects is one (only the continuous frames), and therefore N is set as N>1.

FIG. 15 is a diagram for explaining another example of the position change calculation step 106. In FIG. 15, the connection of the object E4 detected at time point $t_0$ with the object E1 detected at time point $t_0-3$, the object E2 detected at time point $t_0-2$ and the object E3 detected at time point $t_0-1$ is ascertained over continuous frames, and therefore it can be ascertained that the detected objects E1 to E4 can be connected even when N=1.

In the method involving N=1, however, it can be ascertained that the connection between the object D1 detected at time point $t_0-5$ and the object D2 detected at time point $t_0-4$, the connection between the object D3 detected at time point $t_0-4$ and the object D4 detected at time point $t_0-3$ and the connection between the object D5 detected at time point $t_0-2$ and the object D6 detected at time point $t_0-1$ are possible. Since no object is detected at time point $t_0-3$, however, it cannot be ascertained that the connection is possible between the object D2 detected at time point $t_0-4$ and the object D5 detected at time point $t_0-2$.

In the embodiment of FIG. 15, N is set to 5 (corresponding to 2.5 seconds for the processing rate of 2 frames per second, for example) to give an allowance to the number of frames involved in the detection of connectable objects thereby avoiding the temporary overlooking of the tracking which occurs in detecting a object having a intensity value near to that of the reference background image. As a result, the connection between the object D2 detected at time point $t_0-4$ and the object D5 detected at time point $t_0-2$ can be ascertained. It is therefore possible to ascertain the locus, i.e. the connection of detected moving objects more accurately than in the prior art.

FIG. 16 is a diagram showing the connection of FIG. 15 along the time axis. Black circles indicating the center of gravity of detected objects corresponding to the reference numerals in FIG. 15 are indicated by "'" (dash) attached thereto, respectively.

Figure 10:
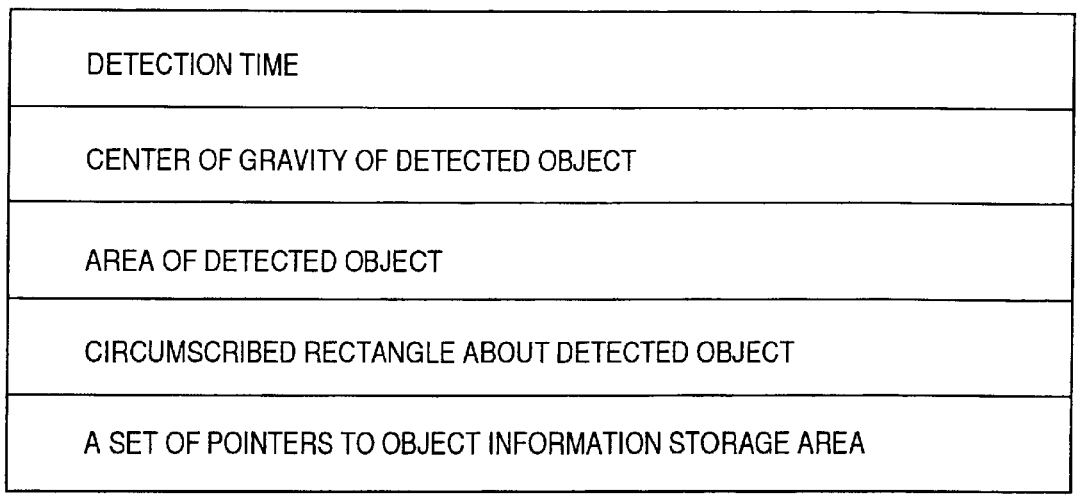
FIG. 10 is a diagram for explaining the contents of the information series stored in the object information storage area for the detected object according to the invention.

Returning to FIG. 1, in step 107, the object information storage area (not shown) for storing the detection position change and the detection time when the object is detected is secured in the work memory 604 for the objects detected during the period from time point $t_0-N$ to $t_0-1$, so that the detection position information is stored together with the object detection time and the detection position change. FIG. 10 is a diagram for explaining an example of the contents of the information (characteristic physical quantities) stored in the object information storage area described above. The information stored in this area for the objects detected at respective time points include the detection time point, the detection position, the area, the circumscribed rectangle and a mass of pointers (memory addresses in the work memory 604: the pointer has an address referencing (linking) function)) of the object information storage area of the objects detected during the period from time point $t_0-N$ to $t_0-1$ when a particular object is connectable. By expressing the information series of the objects detected at each time point with a list structure in this way, the detection position change of the objects detected at and before time point to is stored (the detection time/detection position change storage step 107). An explanation will be made later of the area and the circumscribed rectangle of objects detected at respective time points included in the information of the detected objects stored in the object information storage area described above.

In the case of a moving object detected as shown in FIGS. 15 and 16, the list structure for storing the object E4 detected at time point $t_0$ in the information storage area of FIG. 10 includes the connection structure of FIG. 15 as the information of the detected objects along the time axis. The embodiments of FIGS. 15 and 16 do not indicate any object not detected at time point $t_0-3$. It is possible however to estimate the position of the object detected at time point $t_0-3$ from the locus of the objects detected before or after time point $t_0-3$, for example, and to indicate it in FIGS. 15 and 16 or to store it in the information storage area described above.

In a method of estimating the position of the object detected at time point $t_0-3$, the position $(X_{t0-3}, Y_{t0-3})$ of an object detected at time point $t_0-3$ is given as $X_{t0-3}=(X_{t0-4}+X_{t0-2})/2$, $Y_{t0-3}=(Y_{t0-4}+Y_{t0-2})/2$, where $(X_{t0-4}, Y_{t0-4})$ is the position of the object detected at time point $t_0-4$ and $(X_{t0-3}, Y_{t0-3})$ the position of the object detected at time point $t_0-3$. Similarly, the area $S_{t0-3}$ of the object detected at time point $t_0-3$ can be estimated as $S_{t0-3}=(S_{t0-4}+S_{t0-2})/2$ from the area $S_{t0-4}$ of the object detected at time pint $t_0-4$ and the area $S_{t0-2}$ of the object detected at time point $t_0-2$. The information storage area is not necessarily located within the work memory 604 but may be located in other memories of the object tracking and monitoring apparatus or a separate storage unit may be provided. Also, the storage unit may be a MO disk storage unit, a remote file prepared through a network, or a combination of any one or ones of them. The information may be compressed wholly or partly for storage in these devices.

Now, the contents of the process of steps 108 and 109 in the flowchart of FIG. 1 will be explained.

First, in the case where the stored position where an object is detected is located within the monitor area in the imaging view field, for example, it is determined that an object to be monitored is present (object presence determination step 108). Note that whether the stored position of the detected object is within the monitoring area or not is a first determining criterion or test in the first embodiment of the present invention. This is true with respect to the rest of the embodiments, though not specifically restated later. This criterion or test is previously set in the object tracking and monitoring apparatus before it is delivered to the user. Then, an instruction is sent to the output I/F 607 and the image output I/F 608. In response, the output I/F 607 emits light indicating an alarm in an alarm lamp 610, while the image output I/F 608 displays an alarm on the monitor 611 (alarm/monitor display step 109).

After the non-object classification step 204 and the alarm/monitor display step 109, the process returns to the image input step 101 for sequentially repeating the process of the flowchart shown in FIG. 1.

The means for displaying in the alarm/monitor display step 109 is for informing a guardsman (including the person in charge of monitor or an auxiliary living creature having the function of transmitting information to the guardsman, who may be an auxiliary living creature in some cases) of the alarm about the presence or absence of an intruder. Applicable means for this purpose include those in which an alarm is transmitted from a source external to the body of the guardsman through an aural, view or tactile sensory organ for light, electromagnetic wave, static electricity, sound, vibration, pressure, etc. or one or a plurality of means for exciting the interior of the body of the guardsman including all those means for generating a signal sensible by the man or auxiliary living creatures.

As described above, according to the first embodiment of the invention, an object is tracked based on the series of the detection time and the detection position stored in memory, and in the case where an object exists in the monitor area (a pier and the neighborhood thereof in the case where the whole harbor is the imaging view field or a gate and the neighborhood thereof in the case where the gate and the road surface in front of the gate is the imaging view field), such an object can be tracked sequentially while determining it as an object to be monitored.

A second embodiment of the invention will be explained with reference to FIG. 2. The second embodiment relates to a method of calculating the tracking time of a detected object based on the information series including the detection time and the detection position among the information on the detected object stored in the object information storage area and classifying the objects into those to be monitored and other objects (those not to be detected).

Figure 2:
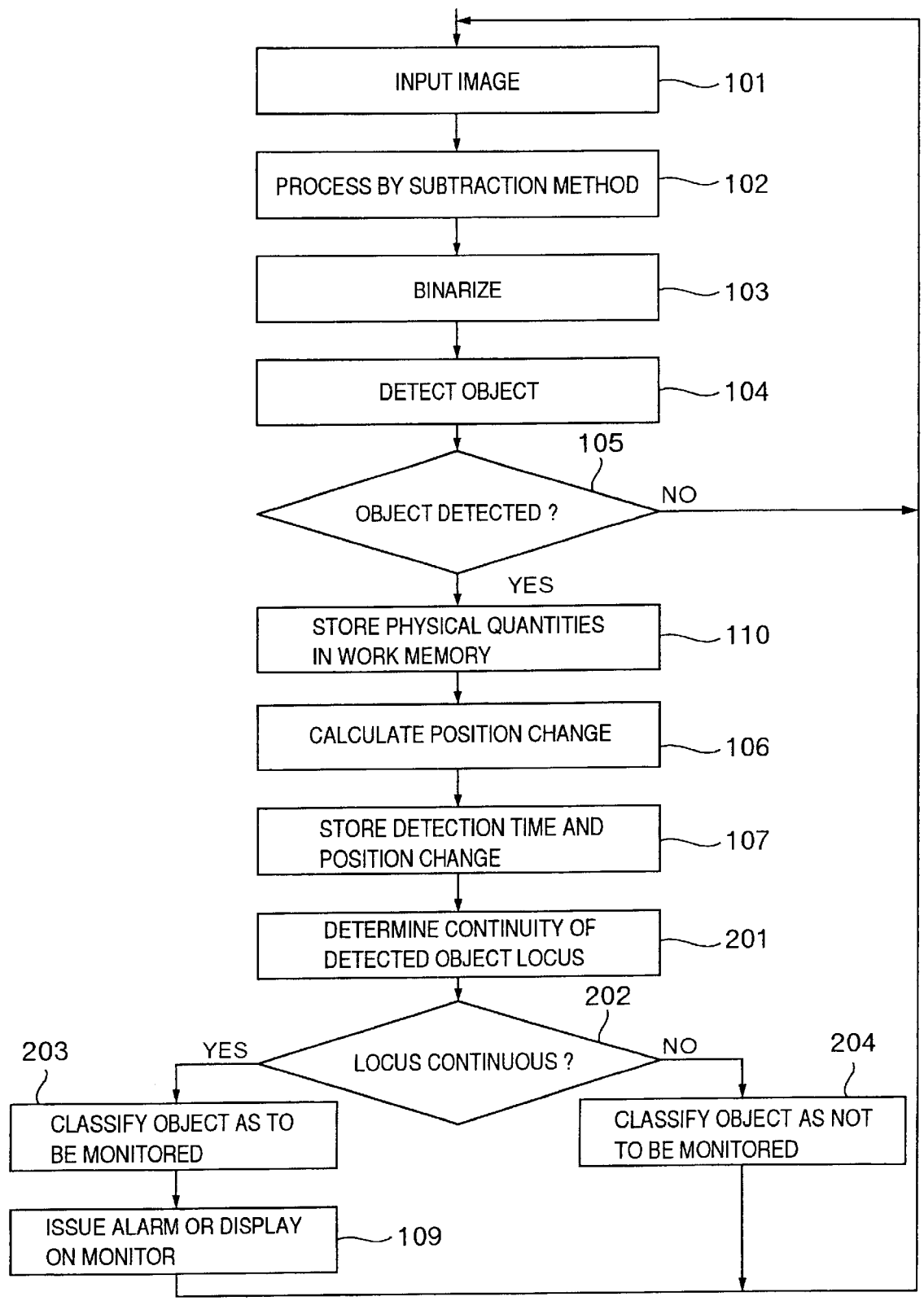
FIG. 2 is a flowchart for explaining the operation of a second embodiment of the present invention.

FIG. 2 is a flowchart for determining the continuity of the locus of an object detected and classifying detected objects into those to be monitored and those not to be monitored. The flowchart of FIG. 2, as compared with the flowchart of FIG. 1, additionally includes a continuity determination step 201 for determining the continuity of the locus of a detected object after the detection time/position change storage step 107, and a continuity branching step 202 for branching based on the result of determination in the continuity determination step 201 in place of the detected object presence/absence branching step 108. Further, the flowchart of FIG. 2 includes an object classification step 203 for classifying the objects determined to have a continuous locus as objects to be monitored and a non-object classification step 204 for classifying the objects having no continuous locus as objects not to be monitored.

In FIG. 2, when the process advances to the continuity determination step 201 after the steps similar to the corresponding ones described in FIG. 1, the continuity of the locus of a detected object is determined in the continuity determination step 201 in such a manner that objects connectable to a detected object stored in the list structure of the detected object information as of time point $t_0$ are traced retroactively from time point $t_0-1$ up to $t_0-N$ using the pointer. Specifically, in the case where the number of frames tracked continuously is larger than a predetermined value, it is determined that there is a continuity of locus, while in the case where the number of frames tracked continuously is smaller than a predetermined value, it is determined that the locus has not continuity. In the case where the number of frames tracked continuously is not less than a predetermined value (ten frames, for example, at the processing rate of two frames per second in the case where it is determined that an object that could be tracked for five seconds or longer is determined to have a continuity), for example, it is determined that the locus of the particular object is continuous. In other words, in the case where the locus of an object continues to exist for a predetermined time or longer, it is determined that the locus of the particular object has a continuity.

Once it is determined that the locus of an object detected has a continuity in the continuity determination step 201, the process proceeds to the object classification step 203. Otherwise, the process proceeds to the non-object classification step 204 (the continuity branching step 202). The objects determined to have a continuous locus in this way in step 202 are classified as objects to be monitored (object classification step 203). The objects determined to have a locus not continuous, on the other hand, are classified as objects not to be monitored (non-object classification step 204). In the case where it is determined in step 203 that there exist an object having a continuous locus, the process proceeds to the alarm/monitor display step 109. After either the non-object classification step 204 or the alarm/monitor display 109, the process returns to the image input step 101 for sequentially repeating the process of the flowchart shown in FIG. 2.

According to the second embodiment, the locus continuity of an object determined based on the series of the detection time and the detection position stored in memory is used to distinguish the particular object from objects not to be monitored which are instantaneously detected such as trembling trees, fluttering plants, paper, etc. or ocean waves moving or reflecting light. In this way, objects to be monitored can be tracked while determining other objects than those to be monitored in the imaging view field.

Figure 18:
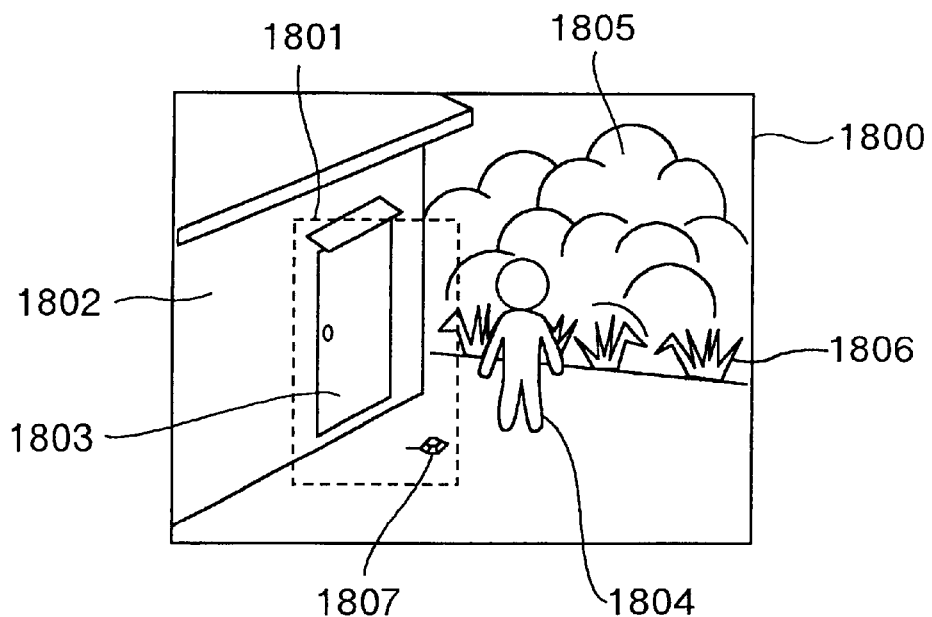
FIG. 18 is a diagram for explaining an example of an area to be monitored and an object to be monitored.
Figure 19:
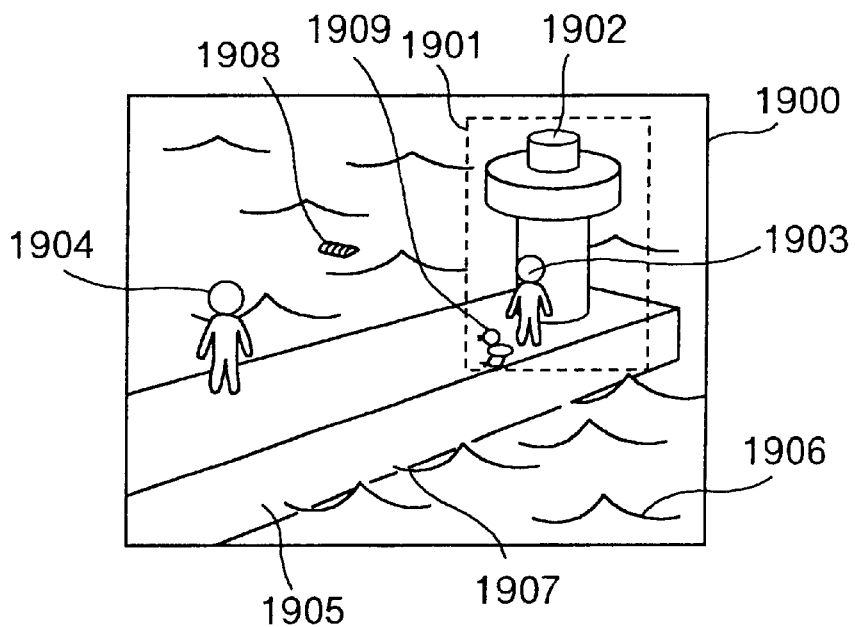
FIG. 19 is a diagram for explaining another example of an area to be monitored and an object to be monitored.

FIGS. 18 and 19 are diagrams for explaining the imaging view field and the area to be monitored. FIG. 18 is for explaining that the range of an image view field is set around a private house and human beings approaching the entrance of the house are monitored. Numeral 1800 designates an image, numeral 1801 an area to be monitored, numeral 1802 a private house, numeral 1803 an entrance, numeral 1804 a human being (simply called as person), numeral 1805 trees, numeral 1806 weeds and numeral 1807 a fallen leaf. FIG. 19 is for explaining that the wharf of a harbor is set as the range of a view field and a person approaching the lighthouse located at the end of the wharf is monitored. Numeral 1900 designates a part of the input image (imaging view field) picked up from the wharf or the neighborhood thereof, numeral 1901 an area to be monitored, numeral 1902 a light house, numerals 1903, 1904 persons, numeral 1905 a wharf, numeral 1906 waves, numeral 1907 waves crushing against the wharf, numeral 1908 a floating lumber, and numeral 1909 a bird.

In FIG. 18, the image 1800 is a part of the input image (imaging view field) picked up from the private house and the neighborhood thereof. The area to be monitored 1801 is indicated by a dashed frame, where an alarm is issued or an image is displayed on the monitor when the person 1804 intrudes into the entrance 1803 of the private house in the image 1800 (in the presence of an object to be monitored).

Objects detected in the image 1800 are the person 1804, the trees 1805, the weeds 1806 and the fallen leaf 1807. Assume that the person 1804 is walking toward the entrance 1803, the leaves of the trees 1805, the weeds 1806 and the fallen leaf 1807 are moved sometimes by the wind. In step 201 for determining the continuity of a locus, it is determined whether a locus is continuous or discontinuous thereby to determine that the leaves of the trees 1805 or the weeds 1806 are recognized as objects not to be monitored and therefore removed from the category of objects to be monitored. The person 1804 and the fallen leaf 1807, on the other hand, are recognized as objects to be monitored, and therefore when they enter the area 1801 to be monitored, an alarm is issued or displayed on the monitor. In the case of FIG. 18, the person 1804 has yet to enter the area 1801 to be monitored, and therefore no alarm is issued or displayed on the monitor. When he advances more and enters the area to be monitored 1801, however, an alarm is issued or displayed on the monitor. Also, the fallen leaf 1807 exists in the area to be monitored 1801, and therefore an alarm is issued or displayed on the monitor. In another embodiment described later, however, the fallen leaf 1807 can be removed from the category of objects to be detected.

Then, in FIG. 19, the image 1900 is a part of the input image (the imaging view field) picked up from a wharf and the neighborhood thereof. The area to be monitored 1901 in the image 1900 where an alarm is issued or displayed on the monitor when the person 1903 intrudes into the lighthouse 1902 (in the presence of an object to be detected) is indicated as a dashed frame. The objects detected in the image 1900 include the persons 1903, 1904, the waves 1906, 1907, the floating tree 1908 and the bird 1909. The person 1904 is located at a distance from the area to be monitored on the wharf 1905. The person 1903, on the other hand, is approaching the lighthouse 1902 by walking on the wharf 1905. The waves 1906 are comparatively quiet, and the waves 1907 are not crushing against the wharf so violently. The floating tree 1908 is assumed to be drifting in the sea. In the locus continuity determination step 201, it is determined whether the locus is continuous or discontinuous, so that the waves 1906, 1907 and the floating tree 1908 are determined as a discontinuous locus and recognized as objects not to be monitored. Thus they are removed from the category of objects to be monitored. The persons 1903, 1904, the bird 1909, on the other hand, are recognized as objects to be monitored, and therefore when they enter the area to be monitored 1901, an alarm is issued or displayed on the monitor. In the case of FIG. 19, the person 1904 has not entered the area to be monitored 1901, and therefore no alarm is issued or displayed on the monitor. As for the person 1903, however, who has entered the area to be monitored 1901, an alarm is issued or displayed on the monitor. The bird 1909, on the other hand, exists in the area to be monitored 1901, and therefore an alarm is issued or displayed on the monitor, but this object can be removed from the category of objects to be monitored in another embodiment described later.

A third embodiment of the invention will be explained with reference to FIG. 3. In the third embodiment, the variations of the position change of the locus of a detected object are calculated based on the series of the object detection time and the detection position in the list structure stored in an object information storage area, and it is determined whether an object is to be monitored or not based on the variations.

Figure 3:
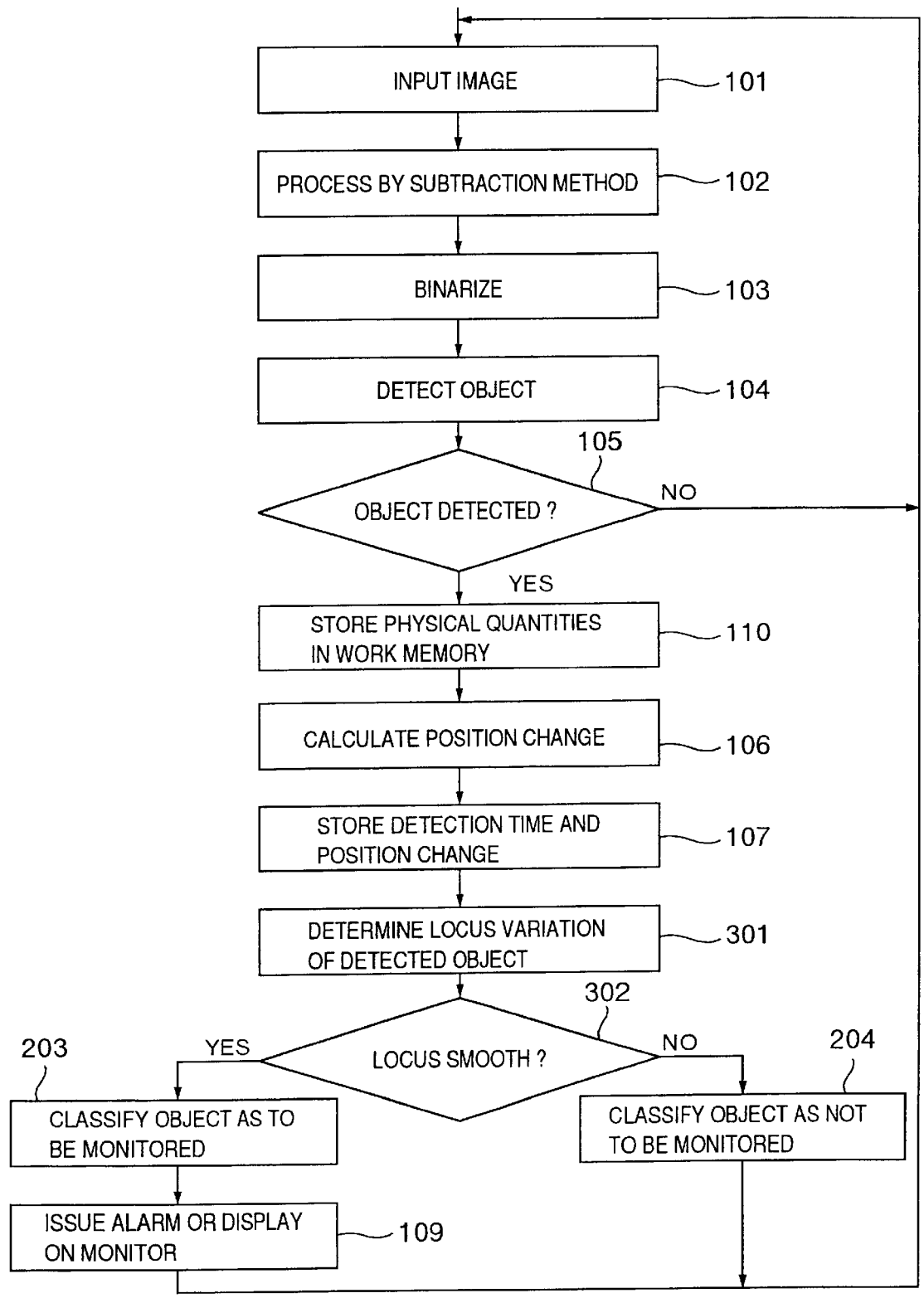
FIG. 3 is a flowchart for explaining the operation of a third embodiment of the present invention.

FIG. 3 is a flowchart for determining the variations of the position change (displacement) of an object detected and classifying it as an object to be monitored or not. The flowchart of FIG. 3, as compared with the flowchart of FIG. 1, additionally has a variation determination step 301 for determining the variations of the position change of the locus of a detected object after the detection time/position change storage step 107, and also a variation branching step 302 for selecting the route of process based on the result of determination in the variation determination step 301 in place of the detected object presence/absence branching step 108. Further, the third embodiment includes an object classification step 203 for classifying as an object to be monitored a detected object determined to have a smooth position change locus (no variations), and a non-object classification step 204 for classifying as an object not to be monitored a detected object determined to have no smooth position change locus (having variations, i.e. having a random position change locus).

In FIG. 3, assume that the process has proceeded to the variation determination step 301 through the processing steps similar to the corresponding ones described in FIG. 1. In the variation determination step 301, the presence or absence of variations (variation degree) is determined from the distribution of the position change amount, for example, included in the locus position change information of detected objects calculated by tracing, using the pointer, the objects connectable to the detected object which are stored in memory as a list structure of the object information detected at time point $t_0$. The distribution of the position change amount at time point $t_0$ can be determined from equation (2).

$$\sigma^2 = \sum_{i=0}^{N1-1} \frac{|v_{t_0-i} - v|^2}{N1} \qquad (2)$$

$$= \sum_{i=0}^{N1-1} \frac{|x_{t_0-i} - x|^2 + |y_{t_0-i} - y|^2}{N1} \quad \left( \begin{array}{l} vi = (xi, yi) \\ v = (x, y) \\ = \sum_{i=0}^{N1-1} \frac{|v_{t_0-i} - v|^2}{N1} \end{array} \right)$$

where the detection position as of time point $t_0$ is assumed to be $(x_{t_0}, y_{t_0})$, and the distribution of the position change amount of objects is calculated by retroactively tracing by N1 frames from time point $t_0$. This distribution of the position change amount is given as $\sigma^2 = 0$ in the case where a predetermined position change has occurred in the preceding N1 frames. This value increases progressively with the variations of the position change amount for each frame.

Then, in the case where the variation degree obtained in the variation determination step 301 is less than a predetermined value, it is determined that the position change of the locus of a detected object is smooth, and the process proceeds to the object classification step 203. In the case where the variation degree is not less than the predetermined value, on the other hand, it is determined that the locus is not smooth, and the process proceeds to the non-object classification step 204 (variation branching step 302). A detected object which it is determined has a smooth locus in the variation branching step 302 is classified as an object to be monitored (object classification step 203).

A detected object which it is determined in step 302 has no smooth locus (has a locus randomly changing in position) is classified as an object not to be monitored (non-object classification step 204). In the presence of a detected object having a continuous locus as determined in step 203, the process proceeds to the alarm/monitor display step 109.

After either the non-object classification step 204 or the alarm/monitor display step 109, the process returns to the image input step 101 for sequentially repeating the process of the flowchart shown in FIG. 3.

According to the third embodiment, objects detected with random position change such as the trembling of trees and fluttering of plants such as tree leaves and paper or the motion of or reflection from ocean waves are classified as objects not to be monitored based on the variations in position change of the locus of the detected objects determined in accordance with the series of the detection time and the detection position stored in memory. Thus an object can be tracked while determining moving objects other than objects to be detected in the imaging view field.

By referring again to FIGS. 18 and 19, the third embodiment will be explained.

In FIG. 18, assume that the wind is violently blowing and the leaves of the trees 1805, the weeds 1806 and the fallen leaf 1807 are in constant motion. The variation determining step 301 determines whether the locus represents a smooth position change or a random position change. Since the leaves of the trees 1805 and the weeds 1806 are determined to represent a random position change and therefore not objects to be monitored, they are removed from the category of the objects to be monitored. The fallen leaf 1807, on the other hand, exist in the monitor area 1801, and therefore an alarm is issued or displayed on a monitor. Nevertheless, it can be excluded from the category of objects to be monitored in another embodiment described later.

In FIG. 19, assume that the wind and waves are so violent that the waves 1903, 1904 and the floating lumber 1908 are kept in motion. It is determined in step 301 whether the locus represents a smooth position change or a random position change. Since the waves 1906, 1907 and the floating lumber 1908 are determined to represent a discontinuous locus and recognized as objects not to be monitored, they are removed from the category of objects to be monitored. The persons 1903, 1904 and the bird 1909, on the other hand are recognized as objects to be monitored, and therefore upon entry thereof into the monitor area 1901, an alarm is issued or display on a monitor. The bird 1909, which is present within the monitor area 1901 and therefore causes an alarm to be issued or displayed on a monitor, can be removed from the objects to be monitored according to another embodiment described later.

A fourth embodiment of the invention will be explained with reference to FIG. 4. In the fourth embodiment, the detection size of a detected object is evaluated based on the series of size of the detected objects having a list structure stored in memory, and based on the size thus detected, it is determined that the detected object is an object to be monitored and an object not to be monitored.

Figure 4:
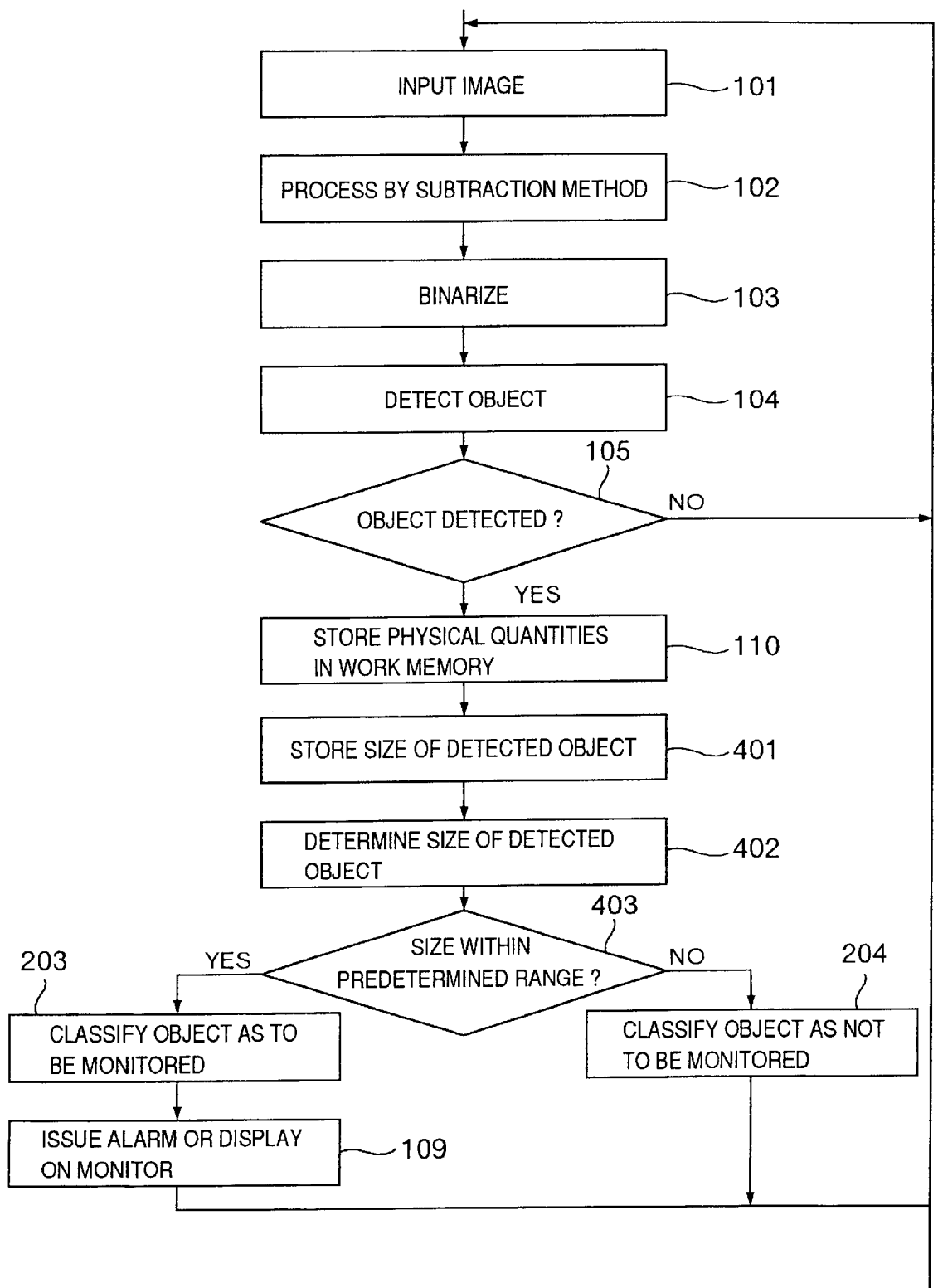
FIG. 4 is a flowchart for explaining the operation of a fourth embodiment of the present invention.

FIG. 4 is a flowchart for determining the size of a detected object and classifying the detected object whether it is to be monitored or not. In this flowchart, the detection time/detection position change storage step 107, the continuity determination step 201 and the continuity branching step 202 in FIG. 2 are replaced by a size storage step for storing the series of sizes of the detected object s, a step 402 for determining the size of a detected object and a size branching step 403 for selecting the route of process based on the size determined.

In FIG. 4, a s in FIG. 2, the process proceeds to step 105. In the case where no object is detected in the detected object processing step 104, the process returns from step 105 to the image input step 101. In the presence of a detected object, on the other hand, the process proceeds to the size storage step 401 through the physical quantities storage step 110.

The size storage step 401 is for securing an object information storage area (not shown) for storing the size of an object detected at time point $t_0$ in the work memory 604, and storing the object size information, followed by proceeding to the size determination step 402. In the size determination step 402, objects connectable to the detected object stored in the form of the list structure of the detected object information at time point $t_0$ is traced retroactively using the pointer thereby to evaluate the size of the detected object as a circumscribed rectangle about the detected area, for example, thereby to obtain the maximum and minimum values thereof. In this case, the circumscribed rectangle can be replaced with a polygon, and the size of the detected area (number of pixels) can be used instead of the circumscribed rectangle. In the case where the size is evaluated based on the vertical and horizontal widths of the detected area in a scene where the object lacking a part is detected, the object size is evaluated using a circumscribed rectangle. In the case where the size of the detected area is evaluated based on the horizontal and vertical widths thereof in a scene where an object sufficiently large in size is detected, on the other hand, the size is evaluated based on the area. In the case where the size obtained in the size determination step 402 is in a predetermined range (between an assumed maximum value and minimum value of the size of the object to be monitored, for example), the detected object is determined as an object to be monitored, and the process proceeds to the object classification step 203. In the case where the size is not included in the predetermined range, on the other hand, it is detected that the detected object is not an object to be monitored and the process proceeds to the non-object classification step 204 (the size branching step 403).

In the size determination step 402 and the size branching step 403, the size of each connectable object is evaluated by tracing, using the pointer connectable thereto, the objects connectable to the detected object stored in the form of the list structure of the object information of objects detected at time point $t_0$, and the ratio $R_N$ which the number $N_S$ of objects having the size in a predetermined range represents of the number NL of objects having a size not included in the predetermined range is determined as $R_N=N_S/(N_S+N_L)$. In the case where it is determined in the size branching step 403 that the ratio $R_N$ of the objects of which the size is not less than the predetermined range is not less than a predetermined value (say, 0.8), it may be determined that the detected object is to be monitored and the process proceeds to the object classification step 203. In the case where the ratio is within the predetermined range, on the other hand, it may be determined that the detected object is not an object to be monitored and the process may proceed to the non-object classification step 204. The predetermined ratio is an index of the degree to which a temporarily observed excessive size of a detected object is allowed.

Then, the detected object having a size determined to be within a predetermined range in the size branching step 403 is classified as an object to be monitored (object classification step 203).

The detected object having a size determined not included in the predetermined range in the size branching step 403, on the other hand, is classified as an object not to be monitored (non-object classification step 204). In the case where it is determined in the object classification step 203 that there exists a detected object the size of which is within the predetermined range, the process proceeds to the alarm/monitor display step 109. After the non-object classification step 204 or the alarm/monitor display step 109, the process returns to the image input step 101 for repeating the process of the flowchart of FIG. 4 sequentially.

According to the fourth embodiment, based on the series of the detection time and the detection position stored in memory, trembling trees, plants such as leaves and paper fluttering in the wind, ocean waves in motion or reflecting light or other objects detected as small objects are classified as objects not be monitored. Thus, an object to be monitored can be tracked while determining moving objects other than objects to be monitored within the imaging view field.

The fourth embodiment will be explained again with reference to FIGS. 18 and 19.

In FIG. 18, assume that the wind is violently blowing, the leaves of the trees 1805, the weeds 1806, and the fallen leaf 1807 are in constant motion. It is determined whether the size of an object detected in the size determination step 401 is within an assumed range or not. As a result, the leaves of the trees 1805, the weeds 1805 and the fallen leaf 1807 are determined out of the predetermined range of size and recognized as objects not to be monitored and removed from the category of objects to be monitored.

In FIG. 19, on the other hand, assume that the wind and waves are violet and the waves 1903, 1904 and the floating lumber 1908 are in constant motion. It is determined in the size determination step 301 whether the size of a detected object is within a predetermined range or not. The waves 1906, 1907, the floating lumber 1908 and the bird 1909 are determined out of the predetermined range of size, recognized as objects not to be monitored, and therefore are removed from the category of objects to be monitored. On the other hand, the persons 1903, 1904 are recognized as objects to be monitored, and therefore upon their entry of the monitor area 1901, an alarm is issued or displayed on a monitor.

A fifth embodiment of the invention will be explained with reference to FIG. 5. In the fifth embodiment, the processes of the second embodiment, the third embodiment and the fourth embodiment of the invention described above are executed at the same time to determine a detected object to be monitored or not.

This flowchart includes a detection time/position change/size storage step 501 in place of the detection time/detection position change storage step 107 of the second embodiment shown in FIG. 2. Also, a variation determination step 301, a variation branching step 302, a maximum circumscribed rectangle determination step 502, a maximum circumscribed rectangle branching step 503, a minimum area determination step 504 and a maximum area branching step 505 are inserted after the continuity branching step 202.

Figure 5:
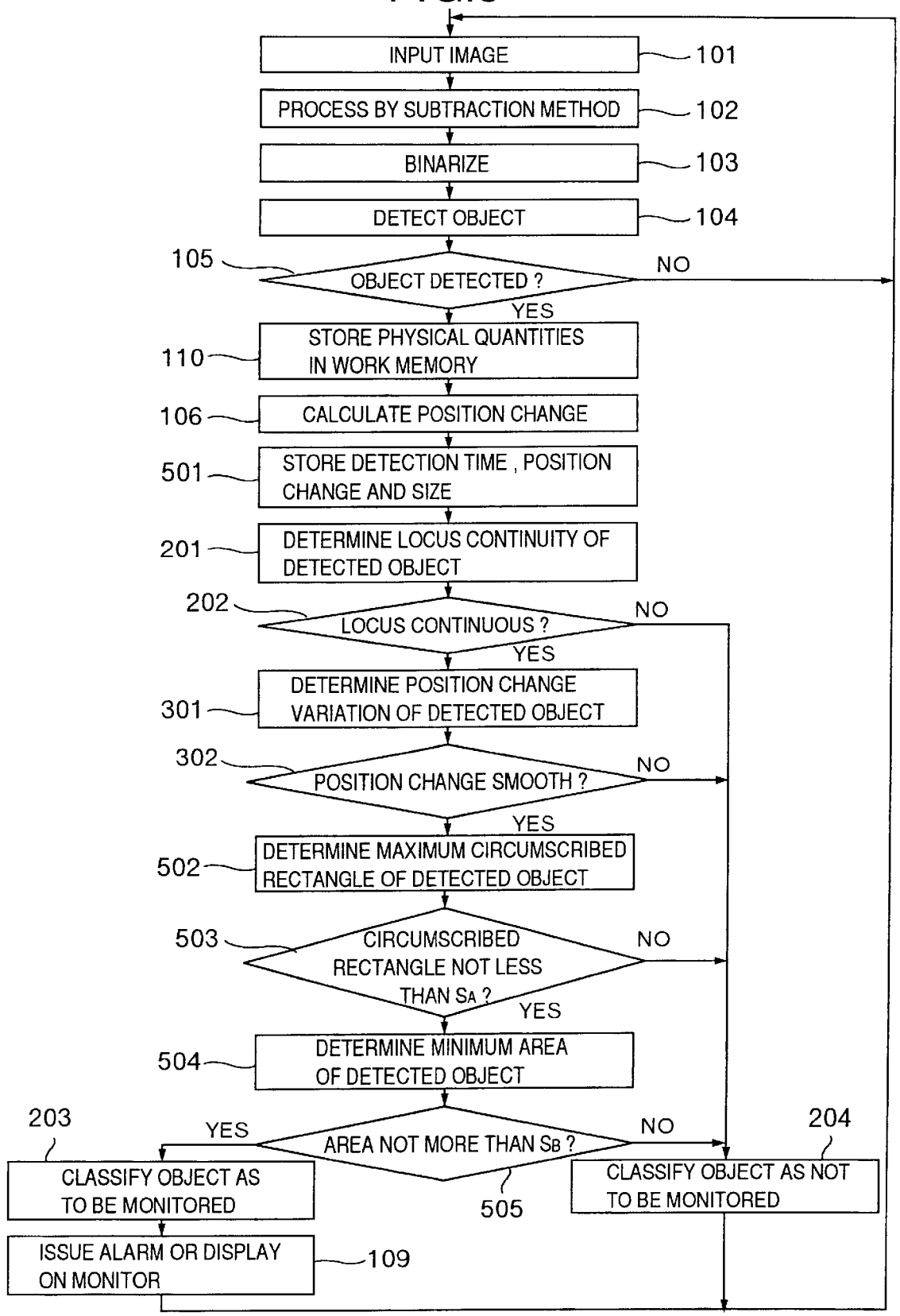
FIG. 5 is a flowchart for explaining the operation of a fifth embodiment of the present invention.

In FIG. 5, like in the case of FIG. 2, the process proceeds up to step 105. In step 105, the process proceeds to the image input step 101 in the case where no object is detected in the object detection processing step 104. In the case where there is a detected object, on the other hand, the process proceeds to the detection time/position change/size storage step 501 through the detected object physical quantities storage step 110 and the position change calculation step 106.

In the detection time/position change/size storage step 501, the object information storage area as shown in FIG. 10 is secured, and the series of the detection information required of a detected object is stored, followed by proceeding to the next step.

In the fifth embodiment, the series of the detection information required of a detected object is the detection time, the detection position, the area (size) and the circumscribed rectangle of objects detected at respective time points and a mass of pointers of the object information storage areas (the storage addresses in the work memory 604) of the objects detected for the period from time point $t_0-N$ to time point $t_0-1$ and connectable to the first detected object. As required, however, other temporal or spatial physical quantities such as the vector, speed, acceleration or the circumscribed shape as well as variations in displacement, velocity, acceleration etc., intensity distribution (e.g. spectral distribution), color distribution or the like may be used with equal effect.

The subsequent steps, of which those identical to the corresponding steps in the preceding case, are executed in the same manner as in the preceding case, as described below.

First, step 201 is executed for determining the continuity of the locus of the detected object. For the detected objects with the locus thereof determined as continuous in the next continuity branching step 202, the process proceeds to step 301 for determining the variations of the detection position of the locus. In the case where it is determined that the locus is not continuous, on the other hand, the process branches to the non-object classification step 204 for classifying the particular detected object as an object not to be monitored. An detected object having a locus not continuous can be connected to only a small number of detected objects, and therefore by determining the continuity in advance, the variations of the locus detection position can be determined using a sufficient number of position change information.

Then, in the case where it is determined in step 301 that a detected object has a sufficiently smooth locus, the process proceeds from the branching step 302 to the maximum circumscribed rectangle determination step 502. In the case where it is determined in the variation determination step 301 that the position change is random, on the other hand, the process proceeds to the non-object classification step 204 for classifying the particular detected object as not to be monitored.

For a detected object determined to have a smooth locus, the maximum circumscribed rectangle determination step 502 calculates the maximum circumscribed rectangle detected in a predetermined frame from the series of circumscribed rectangles about the detected objects stored in memory, and based on this maximum circumscribed rectangle, it is determined in the maximum circumscribed rectangle branching step 503 whether the maximum circumscribed rectangle has a predetermined size $S_A$ or more. In the case where the answer in step 503 is true, the process proceeds to step 203 for classifying the particular detected object as an object to be monitored if the object is determined to have an area less than a predetermined size $S_B$ (steps 504, 505) as described later. In the case where the detected object determined as having a smooth locus has a circumscribed rectangle having less than a predetermined size $S_A$, on the other hand, the process proceeds to the non-object classification step 204 for classifying the particular object as the one not to be monitored. In step 505, if the object has a minimum area more than $S_B$, process goes to step 204 as described later. This is by reason of the fact that the correlation between the imaging view field, the monitor area and the size of the object to be monitored is known in advance and if the largest circumscribed rectangle in the information series to which the connection of the detected object can be ascertained is smaller than the size estimated to be minimum of the objects to be monitored, i.e. smaller than the predetermined size $S_A$, the particular detected object is considered an object not to be monitored. The use of the circumscribed rectangle instead of the area (size) of the detected object can reduce the chance of overlooking the objects detected with a part thereof dropped off in the object detection by the subtraction method. The area can of course be used in a scene where no drop-off is likely to occur.

Figure 17A:
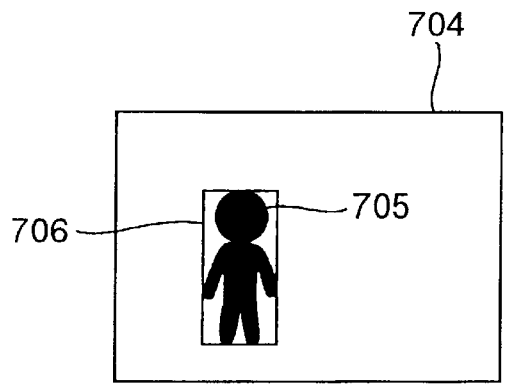
FIGS. 17A to 17F are diagrams useful for explaining an example of determining the size of an object based on a circumscribed rectangle.

FIGS. 17A to 17F are diagrams for explaining an example of determining the size of an object to be monitored based on the circumscribed rectangle. In FIG. 17A, numeral 704 designates a binary image described in FIG. 7, numeral 705 an image obtained by binarization, and numerals 706, 707, 708, 709, 710, 711 circumscribed rectangles.

In FIG. 17A, the image 705 is detected as a human shape of object from the binary image 704. This image 706 detected as a human shape of object constitutes a circumscribed rectangle 706 formed along X and Y directions.

Figure 17B:
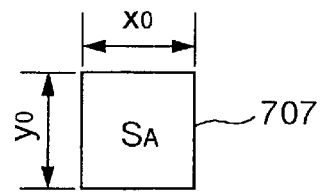
Figure 17C:
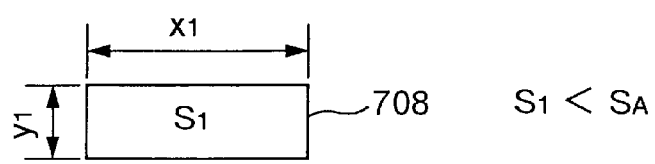
Figure 17D:
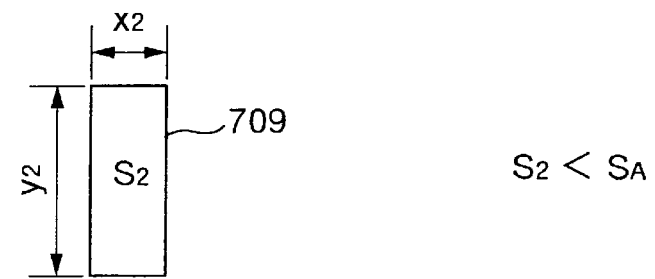
Figure 17E:
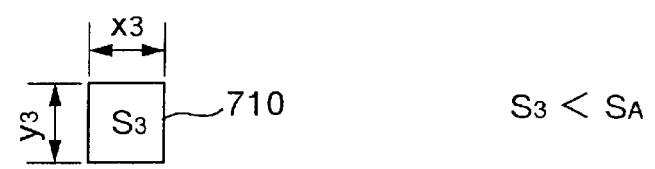
Figure 17F:
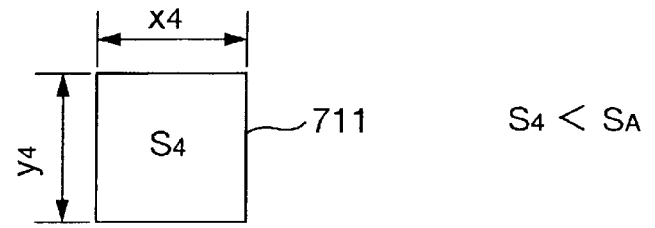

Now, assume that the circumscribed rectangle 707 has a predetermined size $S_A$ in FIG. 17B. Also assume that the length of the predetermined size $S_A$ along x direction is $x_0$ and the length thereof along Y direction is $y_0$. Assume that the circumscribed rectangle 708 in FIG. 17C has a length of $x_1$ along X direction, the length of $y_1$ along Y direction; the circumscribed rectangle 709 in FIG. 17D has a length $x_2$ along X direction and a length $y_2$ along Y direction; the circumscribed rectangle 710 in FIG. 17E has a length $x_3$ along x direction and a length $y_3$ along Y direction; and the circumscribed rectangle 711 in FIG. 17F has a length $x_4$ along X direction and a length $y_4$ along Y direction. Assume that the relation between the lengths of these circumscribed rectangles in the respective directions is given as $$x_2=x_3<x_0<x_4<x_1,\ y_1=y_3<y_0<y_4<y_2.$$

Then, the size $S_1$ of the circumscribed rectangle 708 is such that the length $x_1$ along X direction is longer than the length $x_0$ along X direction for a predetermined size $S_A$, but the length $y_1$ along Y direction is shorter than the length $y_0$ along Y direction for a predetermined size $S_A$. Therefore, the size $S_1$ of the circumscribed rectangle 708 is determined to be smaller than the predetermined size $S_A$.

Also, the size $S_2$ of the circumscribed rectangle 709 is such that the length $y_2$ along Y direction is longer than the length $y_0$ along Y direction for a predetermined size $S_A$, but the length $x_2$ along X direction is shorter than the length $x_0$ along X direction for the predetermined size $S_A$. Therefore, the size $S_2$ is determined to be smaller than the predetermined size $S_A$.

Further, the size $S_3$ of the circumscribed rectangle 710 is such that both the length $x_3$ along X direction and the length $y_3$ along Y direction are shorter than the length $x_0$ along X direction and the length $y_0$ along Y direction for predetermined size $S_A$. Therefore, the size $S_3$ is determined to be smaller than the predetermined size $S_A$.

However, the size $S_4$ of the circumscribed rectangle 711 is such that both the length $x_4$ along X direction and the length $y_4$ along Y direction are longer than the length $x_0$ along X direction and the length $y_0$ along Y direction, respectively, for a predetermined size $S_A$. Therefore, the size $S_4$ is determined to be larger than the predetermined size $S_A$.

In addition, the minimum area determination step 504 calculates the minimum area detected in a predetermined frame from the series of the stored areas of detected objects. Based on this minimum area, assume that the minimum area is less than the estimated maximum area $S_B$ Of the object to be monitored, then the process proceeds from the minimum area branching step 505 to the object classification step 203 for classifying the particular detected object as an object to be monitored. In the case where the minimum area is not less than $S_B$, on the other hand, the process proceeds to the non-object classification step 204 for classifying the particular object as not to be monitored.

This is by reason of the fact that the size relation between the imaging view field, the monitor area and the object to be monitored is known in advance, so that in the case where the object having the smallest area in the information series to which the connection of the detected object can be ascertained has a larger area than the maximum estimated area of the object to be monitored, i.e. the predetermined area $S_B$, then the particular object is considered not to be monitored.

In this fifth embodiment, the area (size) is used instead of the circumscribed rectangle about the detected object. As a result, even in the case where the vibration of the TV camera is detected and the circumscribed rectangle about it cannot be specified, for example, it is possible to distinguish between an object to monitored and an object not to be monitored. Of course, a circumscribed rectangle can be used in a scene where the circumscribed rectangle can be specified in advance.

With regard to the process according to the fifth embodiment described above, an example of the method for classifying detected objects will be explained below with reference to the branching process using a decision tree as shown in FIG. 13.

FIG. 13 is a diagram of a tree structure indicating the manner in which it is decided whether an intruding object detected is the one to be monitored or not using the classification method according to the fifth embodiment described above.

First, an object 1201 detected in the object detecting step 104 is determined for the locus continuity thereof in the continuity determination step 201 and the continuity branching step 202. The object 1203 determined as not continuous is classified as "an instantaneously or momentarily detected object" into the object 1214 not to be monitored in the non-object classification step 204. A detected object 1202 determined as having a continuous locus in the continuity determination step 201, on the other hand, has the variation of the locus position change thereof determined in the variation determination step 301 and the variation branching step 302. A detected object 1205 determined to change randomly in position is classified as "an object having a random position change" into the object 1213 not to be monitored in the non-object classification step 204. A detected object 1204 determined to have a smooth locus position change in the variation determination step 301, on the other hand, has the circumscribed rectangle thereof determined in the maximum circumscribed rectangle determination step 502 and the maximum circumscribed rectangle branching step 503. The detected object 1207 about which the circumscribed rectangle is determined not more than a predetermined size is classified as "a small object" into the object 1212 not to be monitored in the non-object classification step 204. Also, a detected object 1206 about which the maximum circumscribed rectangle is not less than the predetermined size in the maximum circumscribed rectangle determination step 502 has the area thereof determined in the minimum area determination step 504 and the minimum area branching step 505. A detected object 1209 determined to have an area not less than a predetermined size is classified as "detection error or undetectable" into the object 1211 not to be monitored in the non-object classification step 204. A detected object 1208 whose area is determined not more than a predetermined size in the minimum area determination step 504, on the other hand, is classified as an object to be monitored in the object classification step 203.

According to this embodiment, based on the series of the detection time and the detection position stored in memory, the motion of trees and trembling of leaves and other plants in the wind, the motion of and reflection from ocean waves, falling leaves and dust, insects, birds, cats or the like small animals, moving toys such as radio-controlled cars, paper airplanes, trees floating in waves, flags or clothes fluttering in the wind, the rotation or reciprocal motion of a windmill, anemometer or motor, moving objects such as a lighthouse or vehicle not to be monitored which emits the light undergoing an instantaneous intensity change, are classified as an object 1214 instantaneously detected or an object having a random motion or a small object 1212 not to be monitored, or the change in sunlight by entering or leaving clouds, a large detected object occurring due to the vibrations of the camera or an earthquake are classified as a detection error or an undetectable object 1211 into the object not to be monitored. Objects thus can be tracked while determining moving objects other than those to be monitored in the imaging view field.

As in the embodiments described above, the determination method, in addition to the one based on whether an object is larger or smaller than a predetermined value, a predetermined range of value can be used as a criterion. Also, a plurality of ranges and a plurality of classification items can be used for a single physical quantity for determination.

According to this embodiment, therefore, in the presence of a moving object other than an object to be monitored in the view field of the camera, the particular object can be removed from the category of an object to be monitored, and only objects to be monitored can be tracked accurately. Thus, the range of applicability of an object tracking and monitoring apparatus can be greatly widened.

Also, the detection error due to an earthquake, rumbling of the ground, the wind or water flow, often causing the fluctuation of the camera or the imaging view field, can be eliminated.

Further effect is explained. By setting more stringent determining criteria or test, the possibility of erroneous recognition of object to be tracked and monitored could be reduced. On the other hand, the more stringent the criteria or test is, the higher the possibility of failure to detect the object to be tracked and monitored (detection overlooking) becomes, thereby making the object tracking and monitoring apparatus useless. So, in order to reduce the overlooking in the object detection, it would be necessary to loosen the determining criteria or tests (e.g. when the size alone is the determining criterion, the area $S_A$ is enlarged), which would, however, in turn increase the rate of erroneously recognizing object that do not have to be tracked and monitored as objects to be tracked and monitored.

In view of such, in the present invention the object determination is done based not on physical quantities for a pair of frames but on physical quantities for a plurality of continuous frames or preferably more than two continuous frames, so that the rate of detection failure can be reduced even if the determining criteria are made stringent and at the same time erroneous recognition can also be reduced.

Still another effect is that it is possible to eliminate the case of losing the sight of an intruding object temporarily as it is shadowed by other objects or due to the temporary intensity change during the imaging process, thereby making it possible to provide an intruder tracking and monitoring apparatus high in reliability.

A further effect is that the physical quantities detected by the items and ranges determined can be selected or combined or the types of the detected objects can be identified by being classified. Thus an object can be recognized reliably and in more detail automatically.

An embodiment described below specifically relates to an automatic object tracking method suitable for tracking and monitoring an object intruding into an ocean facility. In conventional automatic object tracking apparatuses, an attempt to remove waves from the category of objects to be tracked has often been unsuccessful in view of the fact that the criterion for removing the waves from the objects to be tracked undergoes a change with the change in the wave state or the surrounding environment and therefore it has been difficult to set a constantly applicable criterion. In the embodiment described below, detected objects are classified into a plurality of types according to the shape and/or the size of the detected area of the detected objects.

Specifically, this embodiment utilizes the features of the shape of the detected area of detected waves. Normally, when monitoring the place (ocean surface, for example) where waves are generated, the distance to the object is sufficiently long as compared with the height of installation of an imaging device such as a camera, and the angle of elevation of the imaging device such as a camera is small as viewed from the object. The waves observed as a swell of the sea surface where the intensity changes considerably are apparently have a width larger than the height. In other words, the wave is often detected as a transversely long object.

Figure 32A:
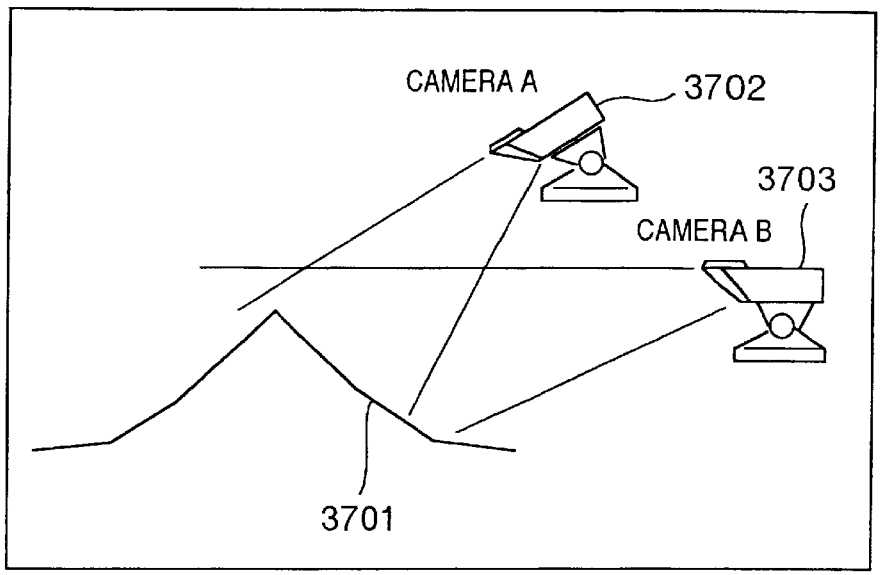
FIGS. 32A to 32C are model diagrams of a wave imaged in the case where a wave is observed at different camera angles of elevation.
Figure 32B:
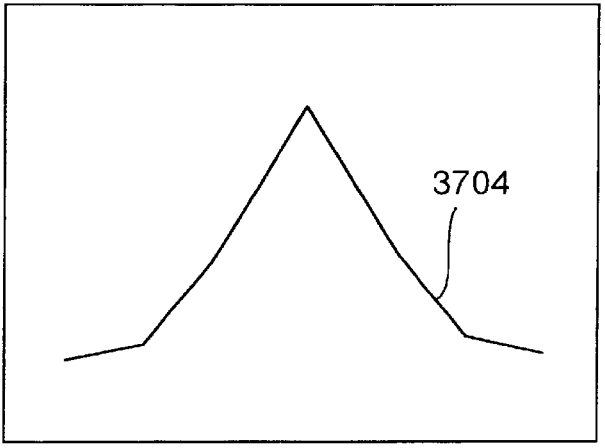
Figure 32C:
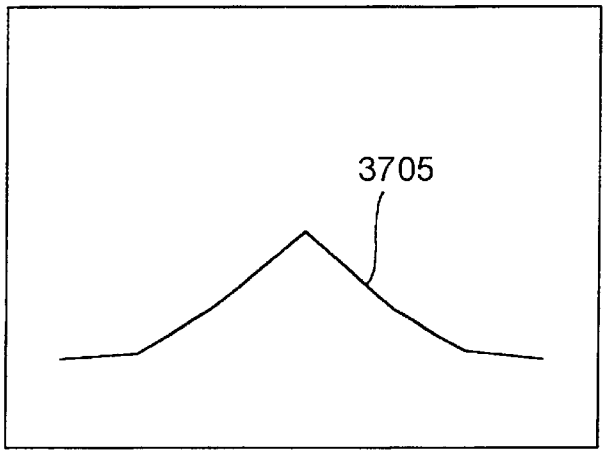

FIGS. 32A to 32C are model diagrams of waves imaged by observing them at different camera angles of elevation.

Numeral 3701 designates a wave, numeral 3702 a camera A, numeral 3703 a camera B, numeral 3704 a wave observed by the camera A 3702, and numeral 3705 a wave observed by the camera B 3703. As shown in FIGS. 32A to 32C, the apparent height of the wave 3704 imaged by the camera A 3702 having a larger angle of elevation tends to be higher than the apparent height of the wave 3705 imaged by the camera B 3703 smaller in angle of elevation. The apparent width of the wave, on the other hand, is observed as a substantially constant length regardless of the camera angle of elevation. Specifically, the width of the wave observed is constant regardless of the camera angle of elevation, and the apparent height of the wave observed is lower the smaller the camera angle of elevation. The wave thus is observed as a transversely long object.

As described above, the feature that the wave is observed as a transversely long object is limited to the case where the point of observation is far as compared with the height of camera installation. In the normal environment of ocean observation, this condition is considered to be generally met.

In the embodiment described below, the above-mentioned characteristics of the wave are used to remove the wave detected area from the object to be tracked based on the geometric information of the area detected as an object.

According to this embodiment, the invention is applied to an object tracking and monitoring apparatus for detecting a human being (called simply as person hereinlater) intruding into a facility built on the ocean. This apparatus comprises a television (TV) camera installed at a position where the facility and the sea surface around the facility can be monitored. The image signal obtained by the TV camera is processed and the detected wave is removed while tracking the object (intruder) to be tracked.

Figure 20:
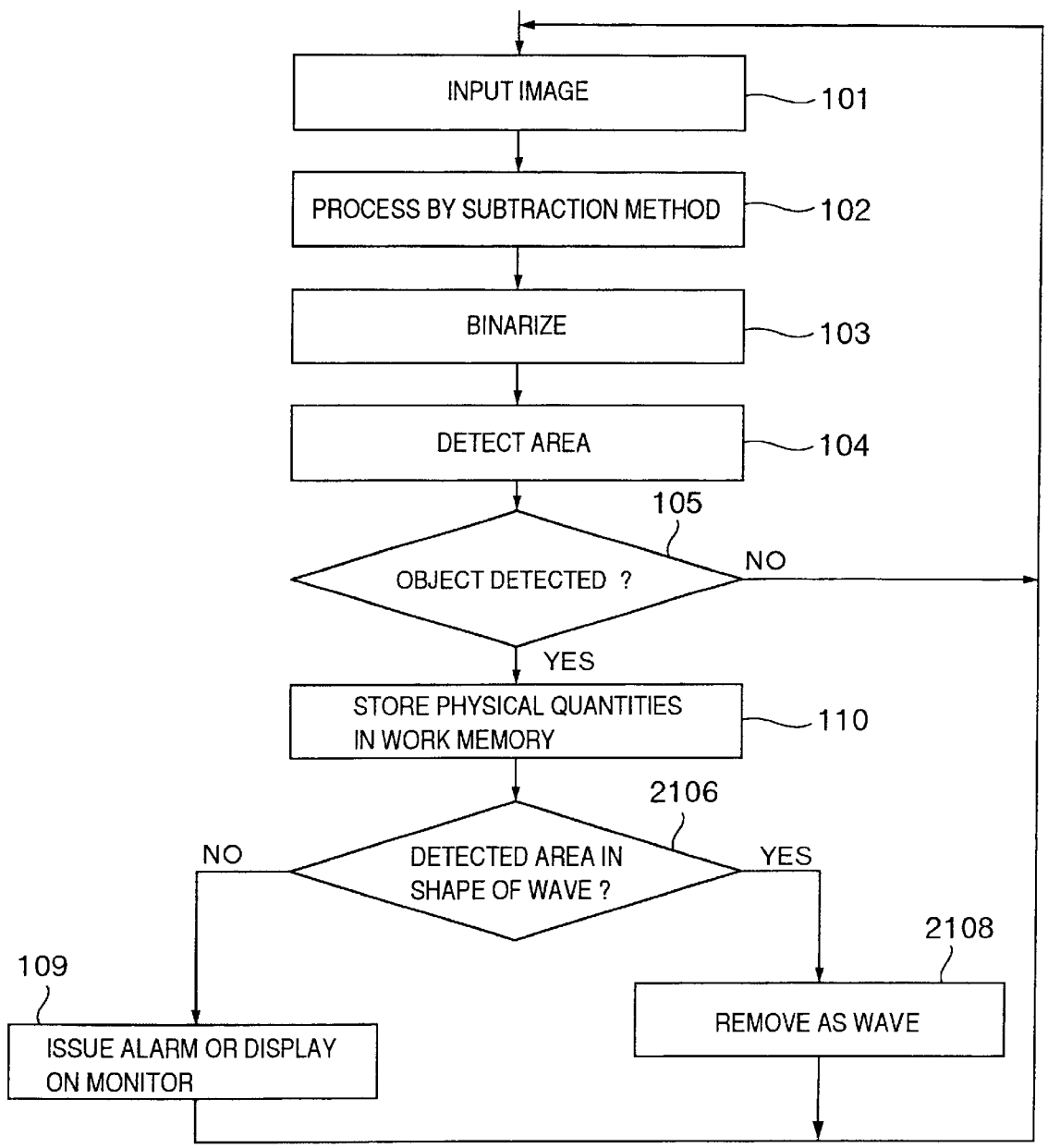
FIG. 20 is a flowchart showing a sixth embodiment of the invention.

A sixth embodiment of the invention will be explained with reference to FIG. 20. In FIG. 20, steps 101 to 105, 109, 110 are already explained. FIG. 20 is a flowchart showing the process of executing an object tracking method according to the sixth embodiment of the invention. In the image input step 101, an input image corresponding to the number of pixels (image size) 320×240 pixels, for example, is obtained from a TV camera 601 used for monitoring, and the process proceeds up to step 105. In step 105, in the case where an object is detected in an area detection step 104, the process proceeds to a wave determination step 2106 through a physical quantity storage step 110. In the absence of a detected object, on the other hand, the process returns to the image input step 101 for restarting the process on the input image of the next frame at a predetermined timing. In the next wave determination step 2106, the shape of the detected object and other information are analyzed to determine whether the detected object contains a wave (a wave is determined based on the circumscribed rectangle information about the detected area, for example), and in the case where the determination is that the detected object is a wave, the process proceeds to step 2108, while in the case where the detected object is not a wave, the process proceeds to step 109. In an elimination step 2108, the detected area of the detected object is removed as an object not to be tracked and then the process returns to the image input step 101 for restarting the process on the input image of the next frame at a predetermined timing. Also, in the alarm/monitor display step 109, an alarm lamp 610 is turned on, for example, or the detection information such as the detection result is displayed on a monitor 611, followed by returning to the image input step 101 for restarting the process on the input image of the next frame at a predetermined timing. According to this embodiment, the wave detected within the view field is removed and thus an object to be tracked can be tracked with a high accuracy.

Figure 33:
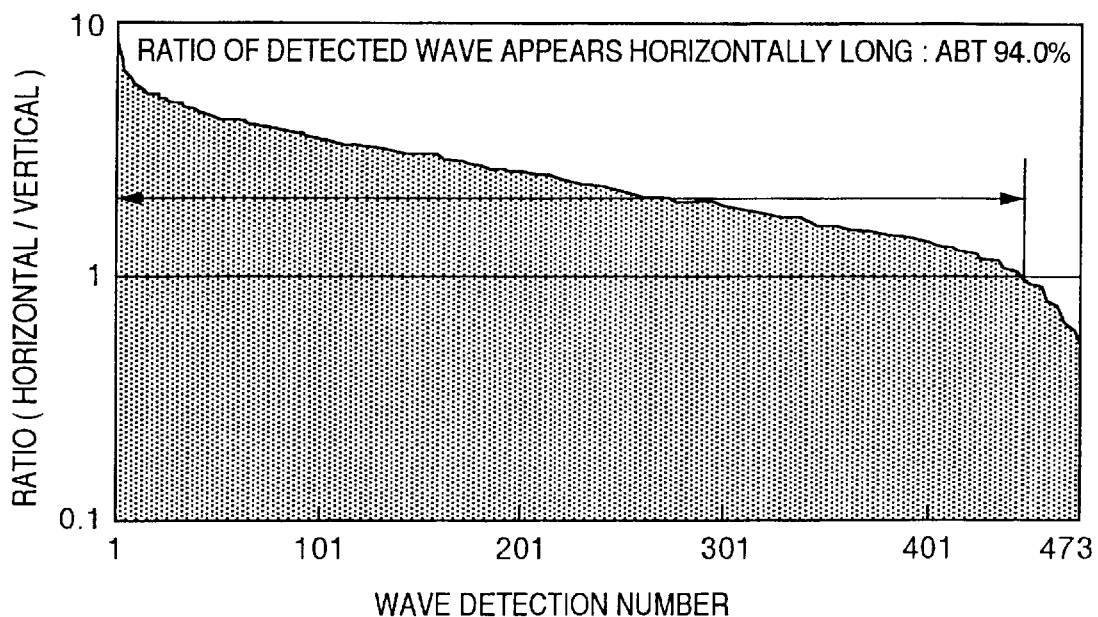
FIG. 33 is a diagram for evaluating the aspect ratio of the area of a wave extracted by the binarization process.

FIG. 33 is a diagram for evaluating the aspect ratio of the wave area extracted by the process of the flowchart of FIG. 8 according to the subtraction method. The horizontal axis represents the wave detection number (arranged in the descending order of the aspect ratio in FIG. 33), and the vertical axis represents the aspect ratio of the wave, the hatched portion indicating the wave detected. Both the horizontal axis and the vertical axis are plotted in a logarithmic scale. For the aspect ratio of unity, the vertical length is the same as the horizontal length. For the aspect ratio larger than 1, on the other hand, the detected area is horizontally long, while for the aspect ratio smaller than 1, the detected area is vertically long. FIG. 33 shows a distribution of the areas detected for 170 processed frames in the descending order of the aspect ratio. According to FIG. 33, about 94.0% of 473 wave detected areas appear horizontally long.

Figure 34:
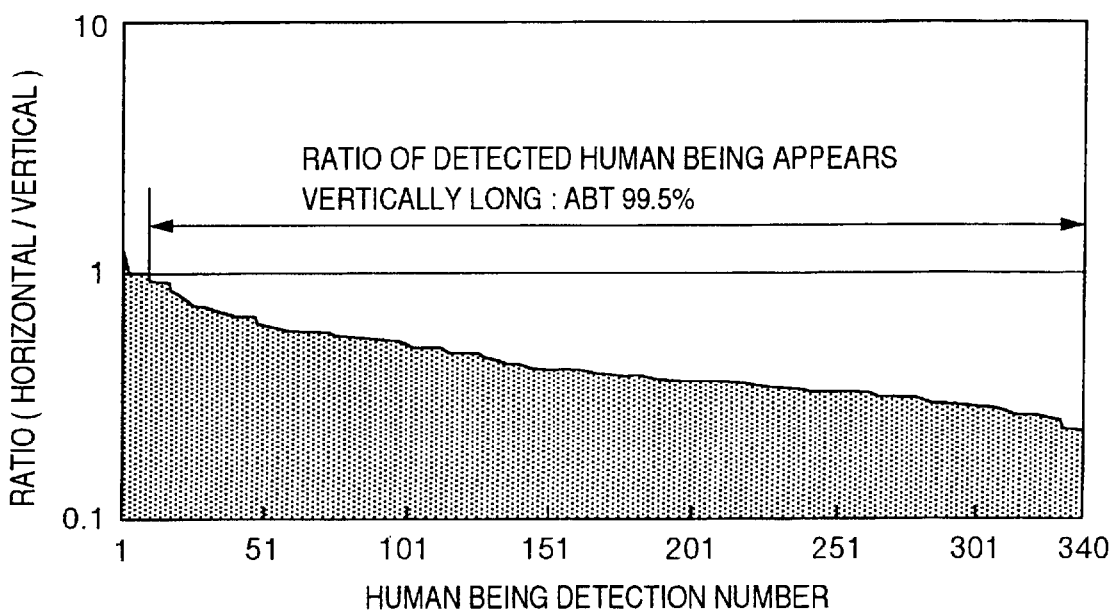
FIG. 34 is a diagram for evaluating the aspect ratio of the area of a human being extracted by the binarization process.

Also, FIG. 34 is a similar diagram evaluating the aspect ratio for the human being or human-being like object extracted in a manner similar to FIG. 33. The horizontal axis represents the detection number of the human beings (arranged in the descending order of the aspect ratio in FIG. 34), and the vertical axis the aspect ratio of the human being. The hatched portion represents the human being detected. Both the horizontal axis and the vertical axis are plotted in logarithmic scale. FIG. 34 shows the distribution of detected areas for 260 processed frames in the descending order of the aspect ratio. FIG. 34 indicates that about 99.5% of 340 human being detected areas appear horizontally long. The reason why about 99.5% of the human being detected areas are vertically long in shape is that a human being constituting an object to be tracked walks in upright position on an ocean facility, so that if the angle of elevation of the camera imaging him is small, the height is observed larger than the width.

Figure 21:
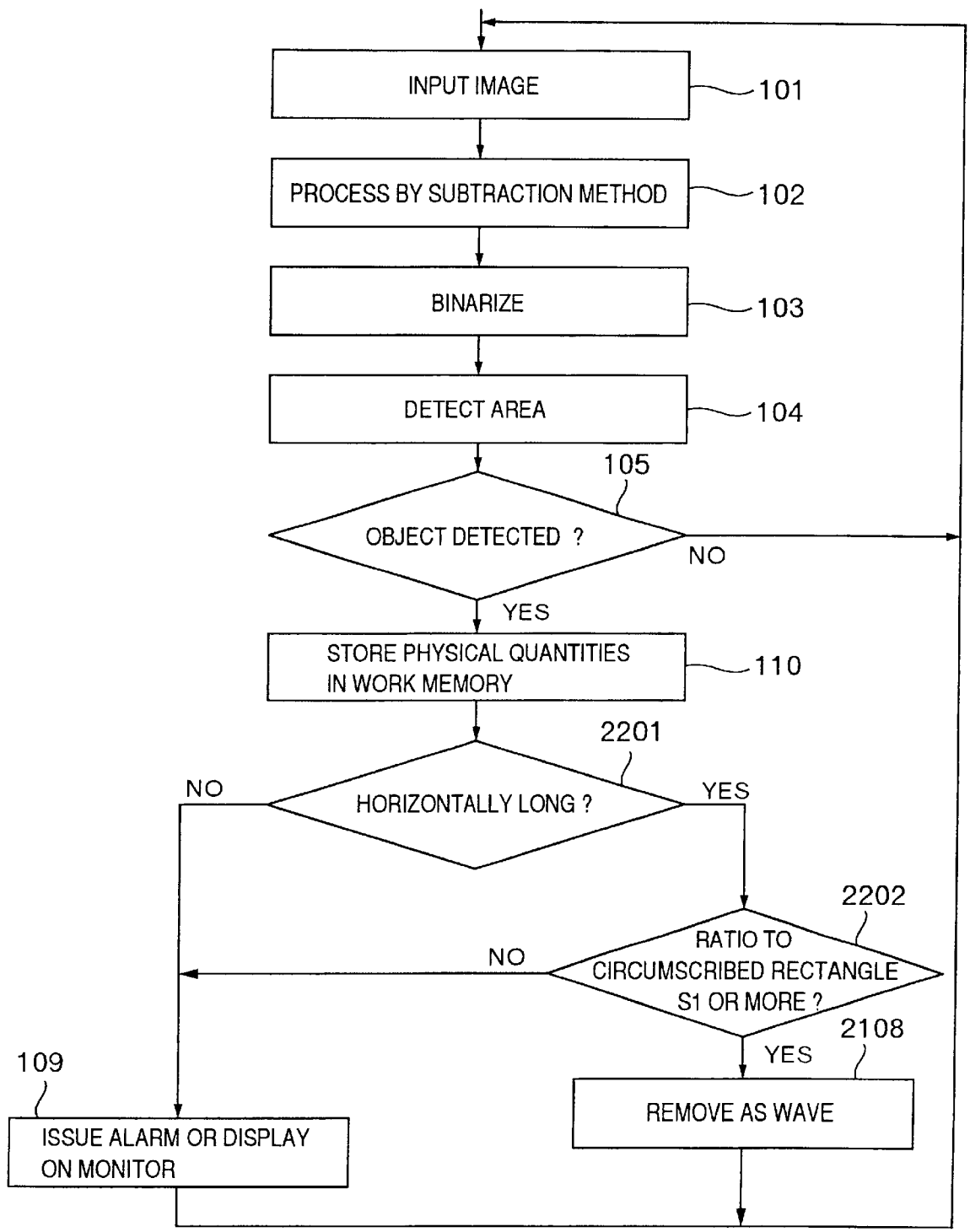
FIG. 21 is a flowchart showing a seventh embodiment of the invention.

With reference to the flowchart of FIGS. 30A, 30B, 21, an explanation will be given of a seventh embodiment in which it is determined whether an object is the one to be tracked or not by classifying the shape of the circumscribed rectangle as a vertically or horizontally long.

Figure 30A:
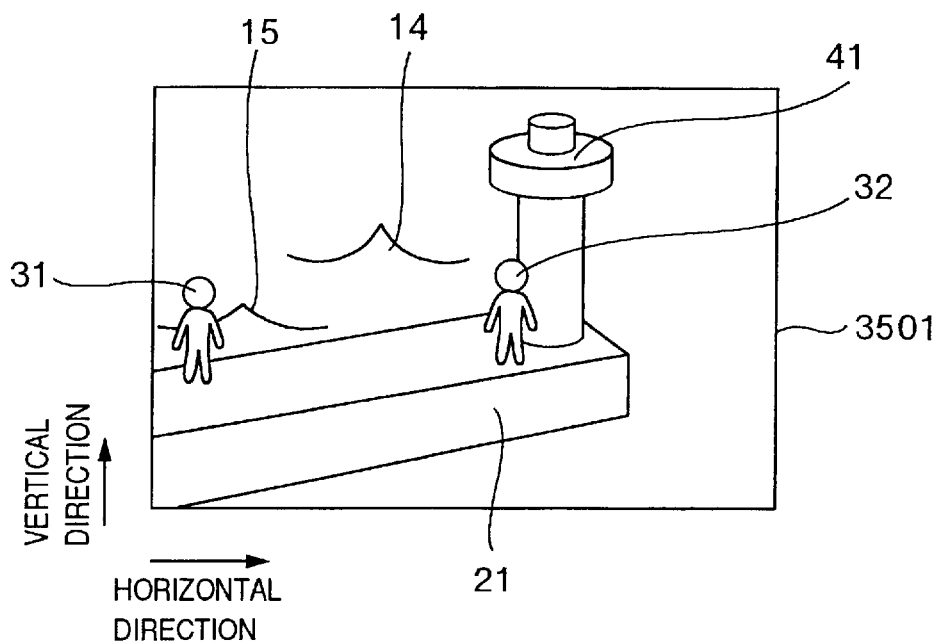
FIGS. 30A, 30B are diagrams useful for explaining the ocean surface monitoring by the subtraction method according to the seventh embodiment.
Figure 30B:
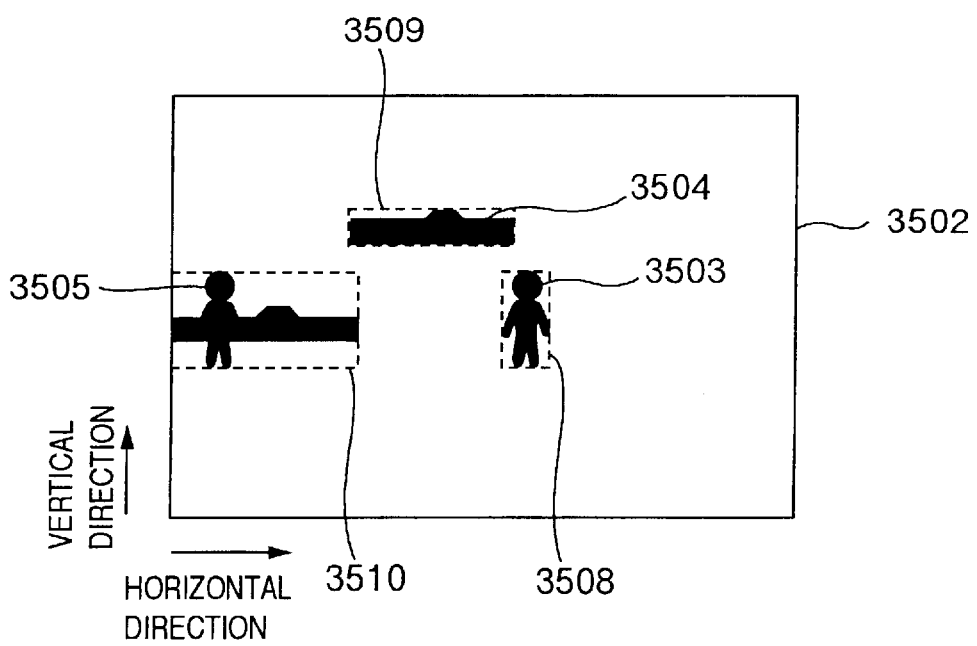

FIGS. 30A, 30B are diagrams for explaining the case in which the state of the ocean is monitored. FIG. 21 is a flowchart of the object tracking process according to an embodiment, in which a circumscribed rectangle area is classified into a vertically long one and a horizontally long one based on the circumscribed rectangle information about the detected area, and it is determined whether the detected area is a wave or not based on the ratio that the pixels of the objects existing in the detected area determined as horizontally long represent of the circumscribed rectangle area, and the detected area determined as a wave is removed from the category of objects to be tracked. In the flowchart of FIG. 21, the wave determination step 2106 of the flowchart of FIG. 20 is replaced by a horizontal length determination step 2201 and a circumscribed rectangle determination step 2202. In FIGS. 30A, 30B, numerals 14, 15 designate waves, numeral 21 a wharf, numerals 31, 32 human beings, numeral 41 a lighthouse, numeral 3501 an input image, numeral 3502 an image after subtraction method, numeral 3503 a detected area where only an intruding human being 32 is detected, numeral 3504 a detection area where only the wave 14 is detected, numeral 3505 a detected area where the wave 15 and the human being 31 are detected in overlapped relation, numeral 3508 a circumscribed rectangle about the detected area 3503, numeral 3509 a circumscribed rectangle about the detected area 1504, and numeral 3510 a circumscribed rectangle about the detected area 3505. The process of the flowchart shown in FIG. 21 will be explained with reference to the example of monitoring the human beings 31, 32 intruding into the wharf 21 shown in FIGS. 30A, 30B.

The process of steps 101 to 105 is described with reference to FIG. 20 and will not be explained. In the horizontal length determination step 2201, the vertical length and the horizontal length of the circumscribed rectangle about the detected area recognized as a detected object in the area detection step 104 are calculated, the ratio between them is determined, and it is determined whether the shape of the detected area is vertically long or horizontally long for branching the decision. Specifically, the detected area determined as horizontally long (the circumscribed rectangles 3509, 3510 of the detected areas 3504 and 3505, for example, have a width larger than the vertical length) is determined as a candidate wave, followed by proceeding to step 2108. Also, it is determined that the detected area determined as vertically long (for example, the circumscribed rectangle 3508 about the detected area 3503 longer vertically than horizontally) is not a wave, followed by proceeding to step 109. Then, in the circumscribed rectangle determination step 2002, it is determined whether the detected areas 3504, 3505 determined horizontally long in step 2001 are a wave or not based on the relation between each of the detected areas and the circumscribed rectangle thereof. For example, the ratio between the size of the circumscribed rectangle about a object detected area and the size of the detected area is calculated and the ratio of which the detected area represents of the circumscribed rectangle is determined. This ratio is compared with a predetermined value (S1). The ratio which the detected area represents of the size of the circumscribed rectangle is large for the detected area 3505 where only a wave is detected and small for the detected area 3504 where a wave and a human being are detected in overlapped relation. The predetermined value (S1) is empirically set to a value (say, 0.6) at which these two detected areas 3504, 3505 can be distinguished from each other.

In the case where it is determined that a wave and an object to be tracked are overlapped with each other and that the ratio which the detected area represents of the size of the circumscribed rectangle is less than S1 such as in the detected area 3504, the process proceeds to step 109. In the case where it is determined that the ratio of which the detected area represents of the size of the circumscribed rectangle is not less than S1 like the detected area 3505, on the other hand, the particular area is considered a wave and the process proceeds to the wave removing step 2108. Steps 108, 109 are already explained with reference to FIG. 20. According to the present embodiment, a wave detected as horizontally long in the monitor view field is removed as an object not to be monitored thereby making it possible to track an object to be monitored with high accuracy.

Figure 31A:
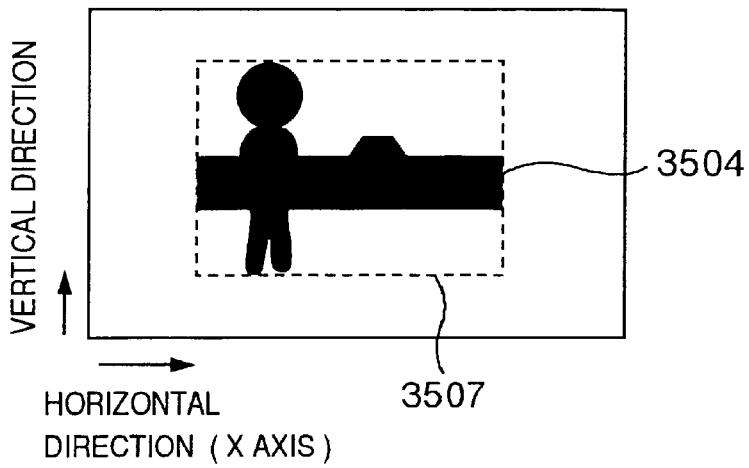
FIGS. 31A to 31C are diagrams useful for explaining the eighth and ninth embodiments of the invention.

An eighth embodiment of the invention will be explained with reference to FIGS. 31A and 22. FIG. 31A is a diagram for explaining a method of determining whether the detected area 3504 detected with a wave and a human being in overlapped relation, like in FIGS. 30A, 30B, is an object to be monitored or not.

Figure 22:
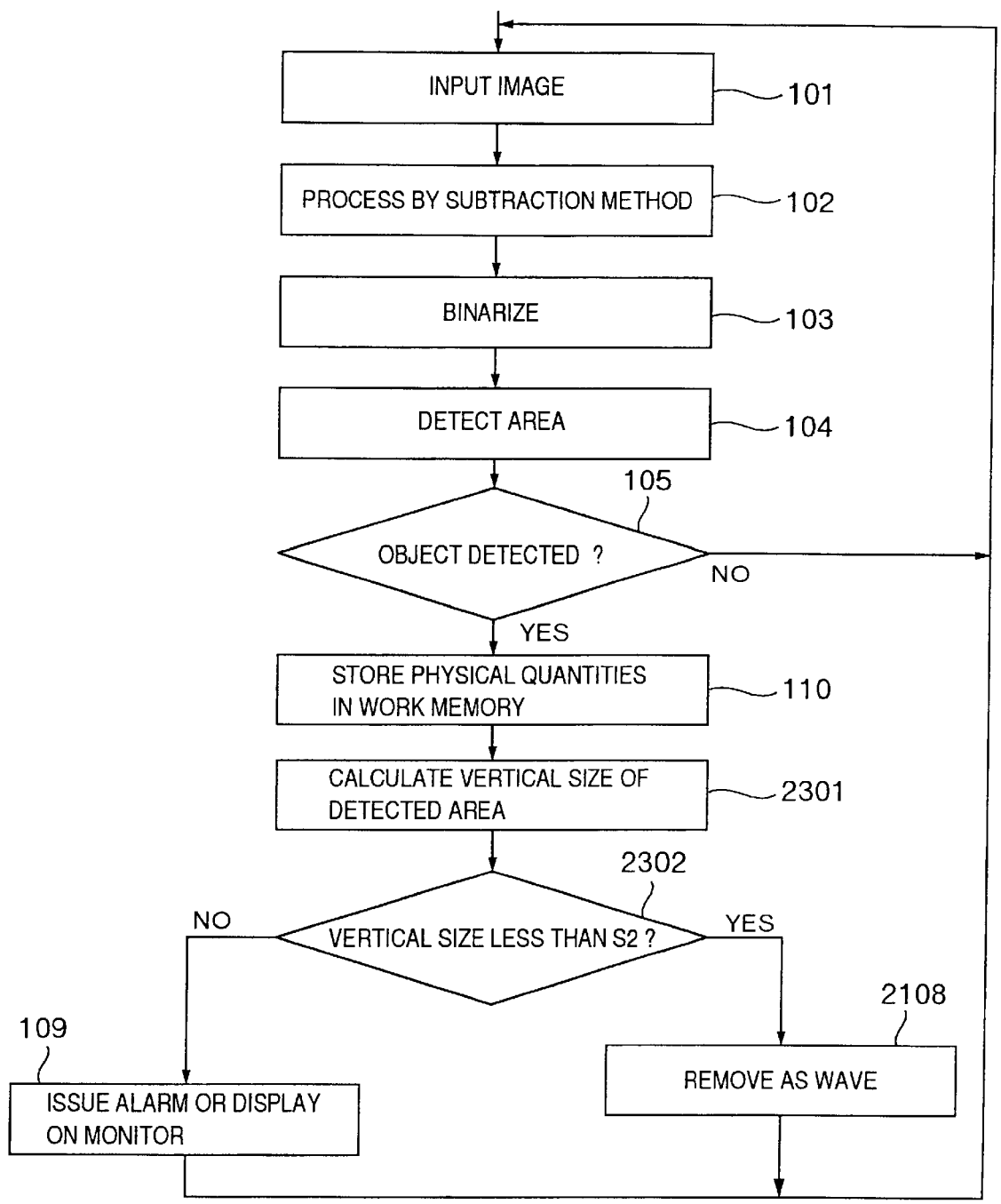
FIG. 22 is a flowchart showing an eighth embodiment of the invention.

FIG. 22 is a flowchart for tracking an object by calculating the vertical size of a detected area and determining whether the detected area is a wave or not based on the calculated vertical size according to the eighth embodiment. The flowchart of FIG. 22 includes a vertical size calculation step 2301 and a vertical size determination step 2302 in place of the wave determination step 106 according to the embodiment of FIG. 20.

The process of steps 101 to 105 is described above with reference to FIG. 20 and will not be explained. In the vertical size calculation step 2301, the vertical size of the detected area is calculated. For example, the vertical size of the circumscribed rectangle is calculated as the vertical size of the detected area from the information of the circumscribed rectangle 3507 about the detected area, and the process proceeds to step 2302. In the vertical size determination step 2302, it is determined whether the detected area is a wave or not based on the vertical size of the detected area. Specifically, the vertical size of the detected area is compared with the maximum size (S2) to be determined as a wave, and in the case where the vertical size of the detected area is less than the maximum size (S2) to be determined as a wave, the particular detected object is determined as a wave. The maximum size (S2) to be determined as a wave is a value set utilizing the fact that the vertical size is small in the case where the detected area is a wave. The larger the maximum size (S2) to be determined as a wave, the smaller the chance of a wave detection error. Nevertheless, an object to be detected is overlooked more often. Thus, an empirical value is required to be set as this value in order not to determine an object to be tracked as a wave and not to remove it from the category of objects to be monitored.

In an example method, the maximum size (S2) to be determined as a wave is set to about 80% of the minimum value of the apparent vertical size of an object to be tracked in a preset monitor view field, as descried below.

The apparent vertical size (B) of an object to be monitored is given as $$B = \frac{f \times H \times H}{T \times L} \quad (3)$$

where T is the vertical size in mm of the CCD, f the focal length in mm of the lens, L the distance in m up to the object to be tracked, H the minimum height in m of the object to be tracked, and X the vertical size in m of an image, and X the vertical image size in terms of the number of pixels in vertical direction.

Also, the maximum size (S2) to be determined as a wave is given as $$S2 = B \times 0.8 \quad (4)$$

According to this embodiment, an object to be tracked located (0.5 m by 0.5 m in size) 200 m away is monitored with the an image of 256×192 pixels using a ½-type CCD (6.5 mm by 4.8 mm in size) and a lens having a focal length of 112 mm. The apparent vertical size (B) of the object to be tracked is $$B = \frac{112 \times 192 \times 0.5}{4.8 \times 100} = 11.2 \quad (5)$$

thus $$S2 = 11.2 \text{ pix} \times 0.8 = 9.0 \text{ pix} \quad (6)$$

As a result, the maximum size (S2) to be determined as a wave is set to 9 pixels.

As described above, the vertical size determination step 2302 determines a detected object as a wave in the case where it has a vertical size of less than S2. In the case where a detected object is determined as a wave in the vertical size determination step 2302, the process proceeds to the wave elimination step 2108, while in the case where the determination is that a detected object is not a wave, the process proceeds to step 109. The process of steps 2108, 109 are already explained with reference to FIG. 20.

According to this embodiment, a wave detected with the height thereof in the view field less than a preset maximum size (S2) to be determined as a wave is eliminated from the category of objects to be monitored, thereby making it possible to track objects with high accuracy.

Figure 31B:
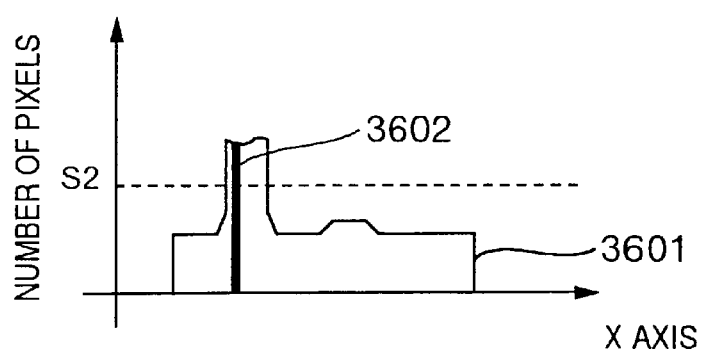

A modification of the eighth embodiment shown in FIG. 22 will be explained with reference to FIGS. 31A, 31B. FIG. 31B is a histogram of the number of pixels in vertical direction of the detected area 3504. Numeral 3601 designates a histogram curve, and numeral 3602 a maximum number of pixels. In the flowchart of FIG. 22 described above, the vertical size calculation step 2301 determines the number of pixels in vertical direction of the detected area 3504 shown in FIG. 31A, the histogram 3601 is produced as shown in FIG. 31B, and the maximum number of pixels 3602 is defined as the vertical size (height or thickness) of the detected area.

Figure 23:
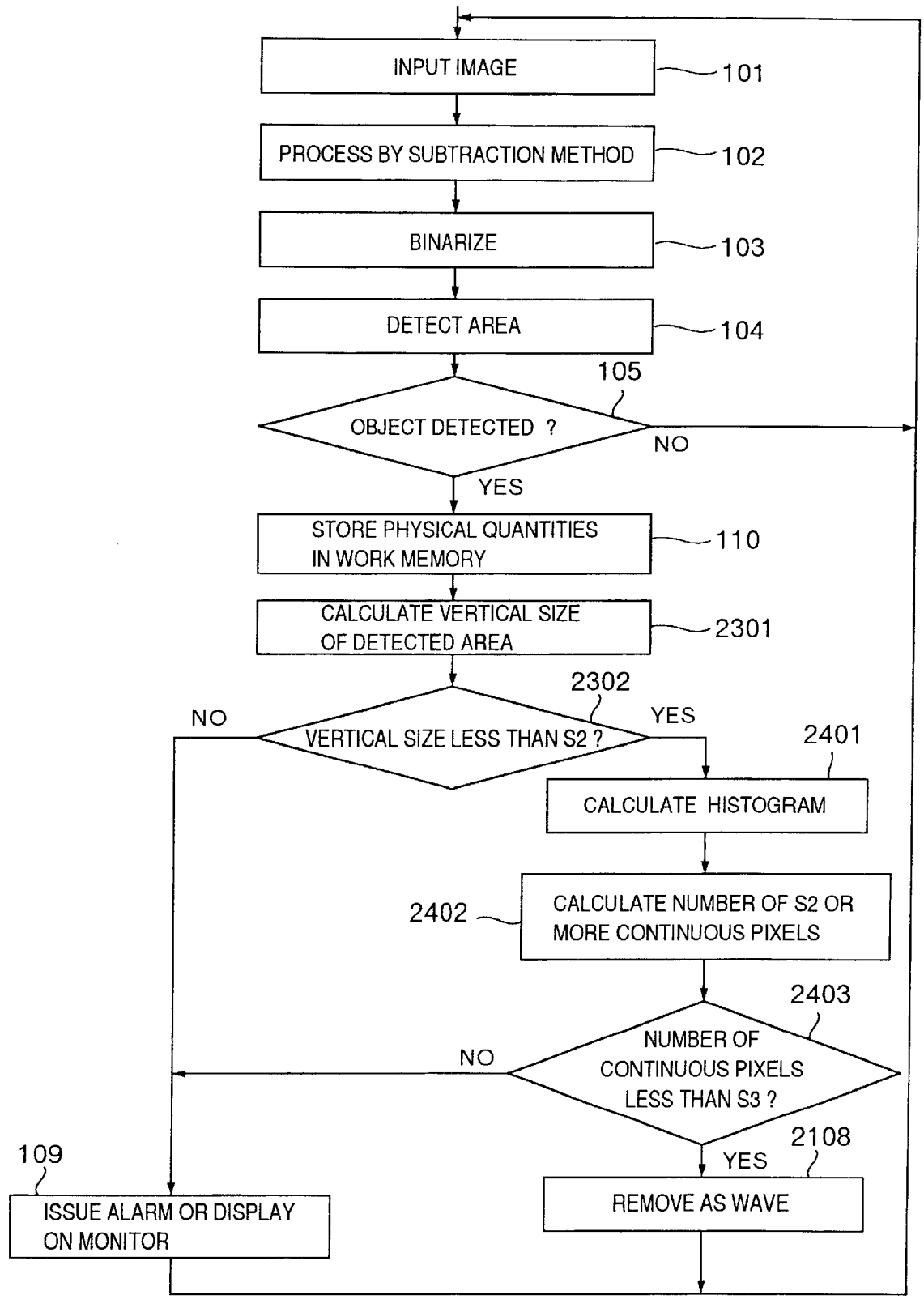
FIG. 23 is a flowchart showing a ninth embodiment of the invention.
Figure 31C:
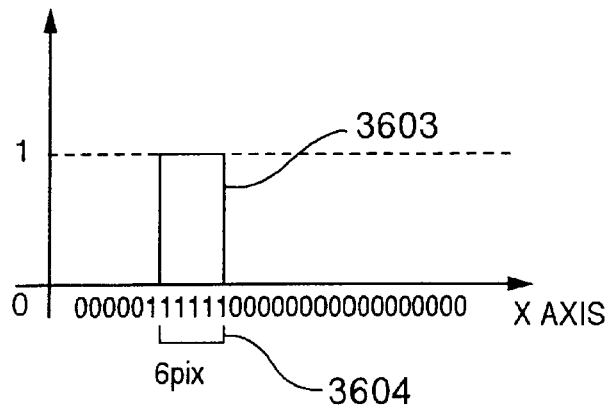

A ninth embodiment of the invention will be explained with reference to FIGS. 23, 31A, 31B, 31C. FIG. 31C shows a histogram of FIG. 31B as processed with a threshold. Numeral 3603 designates a histogram subjected to the threshold processing, and numeral 3604 a width by which values "1" continue. For example, the maximum size (S2) to be determined as a wave is defined for the histogram of FIG. 31B, and in the case where the number of pixels is not less than the maximum size (S2) to be determined as a wave, the value is set to "1", while in the case where the number of pixels is less than the maximum size (S2) to be determined as a wave, the value is set to "0". As a result, the threshold-processed histogram 3603 configured of "0s" and "1s" is produced. FIG. 23 is a flowchart showing an embodiment for tracking an object, in which it is determined whether a detected area is a wave or not based on the histogram information of the detected area and the detected area determined as a wave is removed as an object not to be tracked. In the flowchart of FIG. 23, steps 2401, 2402, 2403 are inserted between the vertical size determination step 2302 and the wave elimination step 2108 in the flowchart of FIG. 22.

Figure 38A:
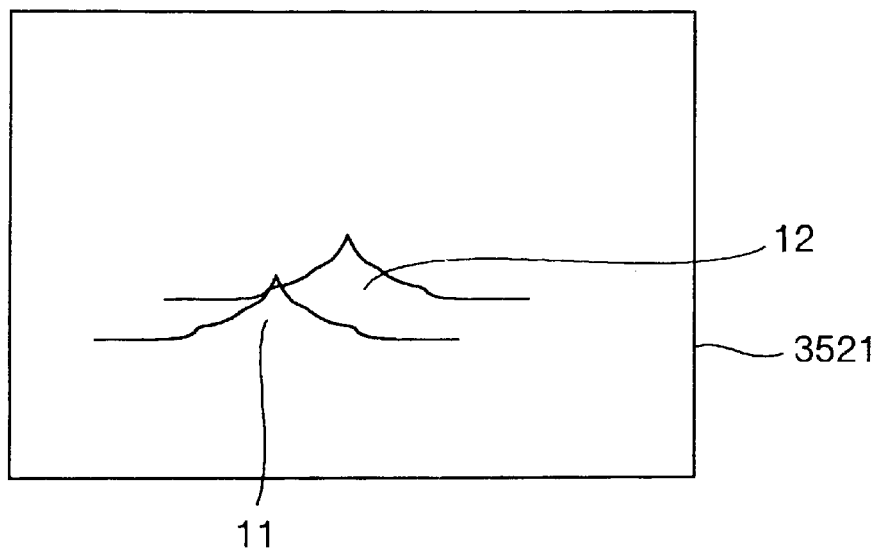
FIGS. 38A, 38B are diagrams for explaining an example of an input image with two vertically overlapped waves and an example of an image processed by the subtraction method.
Figure 38B:
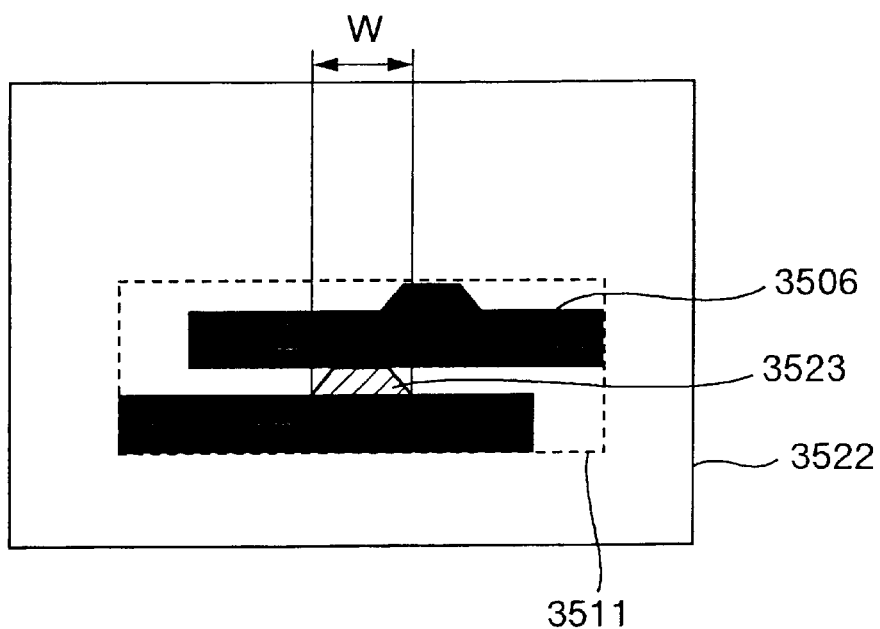

The process of steps 101 to 2302 are similar to the corresponding steps in FIG. 22 and will not be described. In the projection histogram calculation step 2401, the number of pixels in vertical direction of the detected area is calculated thereby to determine a histogram, and the process proceeds to the next step 2402. In the histogram calculation step 2401, for example, the histogram 3601 is produced from the number of pixels in vertical direction of a detected area such as 3504. Then, in the continuous pixel number calculation step 2402, the number of pixels existing continuously in X direction larger than the maximum size (S2) to be determined as a predetermined wave is calculated from the histogram 3601, followed by proceeding to the next step 2403. In the continuous pixel number calculation step 2402, for example, the signal is binarized with respect to the maximum size (S2) to be determined as a wave, and as shown in the threshold-processed histogram 3603, the values not less than a predetermined level are set to "1" and those less than the predetermined level to "0", thereby determining the maximum number of continuous "1s" 1604. In the case of the threshold-processed histogram 3603, for example, there is one portion where six "1s" continue, and therefore the maximum number of continuous "1s" is 6. In the continuous pixel number determination step 2403, the number of continuous pixels is compared with the maximum continuous number (S3) to be determined as a wave thereby to determine whether the detected area is a wave or not. In the continuous pixel number determination step 2403, for example, the number of continuous "1s" along X direction determined in the pixel number calculation step 2402 is compared with the maximum continuous number (S3) to be determined as a wave thereby to determine whether the detected area is a wave or not. FIGS. 38A, 38B are diagrams for explaining an example of an input image with two waves vertically overlapped and an image processed by the subtraction method. Numerals 11, 12 designate waves, numeral 1521 an input image, numeral 3522 an image processed by the subtraction method, numeral 3506 a detected area for the two overlapped waves, numeral 3511 a circumscribed rectangle about the detected area, and numeral 3523 a part of the detected area 3506 where the waves are connected. The maximum continuous number (S3) to be determined as a wave is a value set using the fact that the horizontal width (W) of the area 3523 (hatched) connecting the waves 11, 12 is detected as a small value in the case where the detected area 3523 includes a plurality of waves 11, 12 connected vertically. As to this maximum continuous number (S3) to be determined as a wave, like the maximum size (S2) to be determined as a wave, the larger it is, the less the detection error is likely to occur. The larger the maximum continuous number (S3), however, the higher the chance of overlooking objects to be tracked. This value, therefore, is set empirically at such an appropriate value that objects to be tracked may not be eliminated as a wave. This value S3, like S2, is set to, for example, 80% (say, 9 pixels) of the standard apparent minimum horizontal size of an object to be tracked. Thus, the actual continuous number of "1s" is compared with the maximum continuous number (S3) and if it is less than the maximum number (S3) to be determined as a wave, the object is determined as a wave, in which case the process proceeds to the wave elimination step 2108. In the case where the actual continuous number of "1s" is not less than the maximum continuous number (S3) to be determined as a wave, on the other hand, the process is passed to step 109. The process of steps 2108, 109 is already described.

According to the embodiment of FIG. 22, an object is determined as a wave based on the vertical size thereof, and in the case where a plurality of waves are connected vertically, it has often failed to be determined as a wave. In the embodiment shown in FIG. 23, however, a detected wave including a plurality of vertically connected waves is also eliminated, and therefore the tracking with high accuracy is possible.

Figure 24:
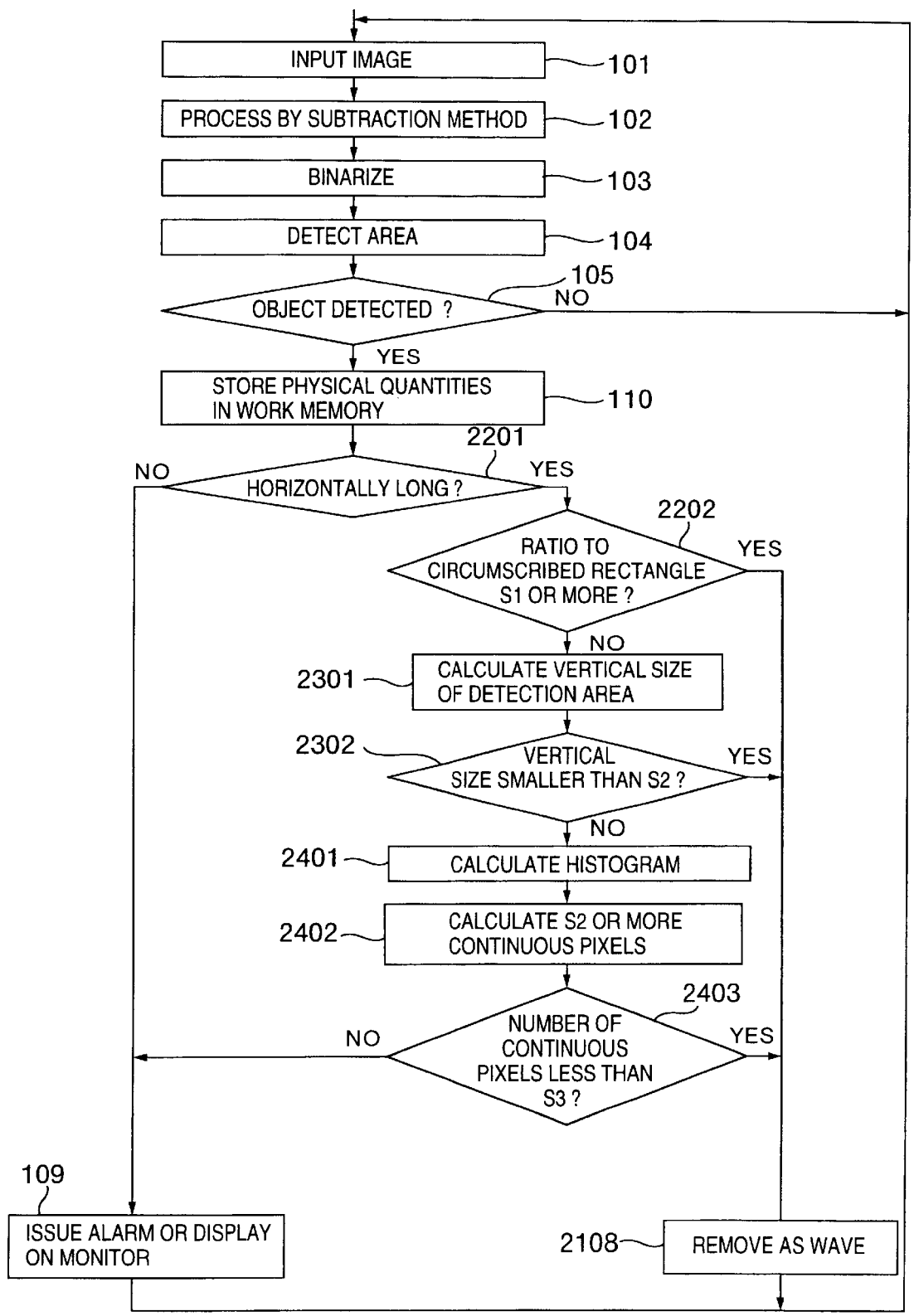
FIG. 24 is a flowchart showing a tenth embodiment of the invention.

A tenth embodiment of the invention will be explained with reference to FIG. 24. FIG. 24 is a flowchart showing an embodiment in which a detected area is determined to be a wave or not by a combination of the embodiments of FIGS. 21, 22, 23 and the detected area determined as a wave is excluded as an object not to be tracked. The process of steps 101 to 105 is similar to the corresponding steps in FIG. 20 and will not be described. First, in the horizontally length determination step 2201, as in FIG. 21, the area detection step 104 classifies the circumscribed rectangle of which objects are recognized to be monitored into the category of either horizontally or vertically long ones based on the circumscribed rectangle information of the detected area. In the case where the detected area is determined as horizontally long, it is determined that the particular detected area is likely to be a wave, and the process proceeds to step 2202. In the case where the detected area is determined vertically long, on the other hand, the process proceeds to step 109. In the circumscribed rectangle determination step 2202, the ratio of which the detected area determined as a horizontally long one represents of the circumscribed rectangle is calculated, and if this value is not less than a predetermined value (S1), it is determined as a wave, followed by proceeding to step 2108. In the case where the determination in the circumscribed rectangle determination step 2202 is not a wave, on the other hand, the process proceeds to step 2301. In the vertical size calculation step 2301, the vertical size of the detected area is calculated followed by proceeding to step 2302. In the vertical size determination step 2302, the vertical size of the detected area is compared with the maximum size (S2) to be determined as a wave thereby to determine whether the object is a wave or not. An object having a small vertical size is determined as a wave, followed by proceeding to step 2108. In the case where the vertical size of the detected area is not less than the maximum size (S2) to be determined as a wave, on the other hand, the process proceeds to step 2401. In the histogram calculation step 2401, a histogram of the particular detected area is prepared, and the process proceeds to step 2402. Further, in the continuous pixel number calculation step 3402, the number of continuous pixels larger than the maximum size (S2) to be determined as a wave is calculated from the histogram, followed by proceeding to step 2403. In the continuous pixel number determination step 2403, the number of continuous pixels in horizontal direction is compared with the maximum continuous number (S3) to be determined as a wave, and in the case where the actual number of continuous pixels is less than S3, the detected area is determined as a wave, followed by proceeding to step 2108. In the case where the actual number of continuous pixels is not less than S3, on the other hand, the process proceeds to step 109. Steps 108, 109 are already explained.

In the embodiment of FIG. 24, it is possible to determine whether a wave is involved or not by a combination of the conditions S1, S2, S3, and therefore the conditions S1, S2, S3 can be set in a wider range.

Specifically, the ratio which the detected area represents of the circumscribed rectangle, for example, is large for the detected area 3504 or the like where only a wave is detected, and small for the detected area 3505 or the like where a wave and a human being are detected in overlapped relation. For this reason, the value S1 has conventionally been set small empirically in a manner not to eliminate the area where a wave and a human being are detected in overlapped relation as a wave. In view of the fact that whether an object is a wave or not can be determined also in other steps, however, the value S1 can be set to a larger level for reducing the chance of overlooking objects to be tracked.

For a similar reason, the vertical size of the detected area and the maximum size (S2) to be determined as a wave can be reduced. Further, the maximum continuous number (S3) to be determined as a wave can be reduced. Thus, the conditions for determining an object as a wave can be set in a wider range than when each condition is set independently. According to this embodiment, therefore, the chance of overlooking an object to be tracked and the wave detection error is reduced thereby making possible a higher accuracy of tracking.

In the embodiments described above, the algorithms described below are employed.

Specifically, models of the shapes of a detected wave and a detected human being are produced, and each model is studied as to which index is used to distinguish and extract a wave and a human being (cases 1 to 5).

Case 1: Vertically long model

Case 2: Horizontally long model (thickness: less than 0.5 m)

Case 3: A model with a human being and a wave coupled with each other (thickness: less than 0.5 m)

Case 4: A model with waves coupled with each other (thickness: less than 0.5 m)

Case 5: Other than cases 3 and 4 (thickness: less than 0.5 m)

Figure 37A:
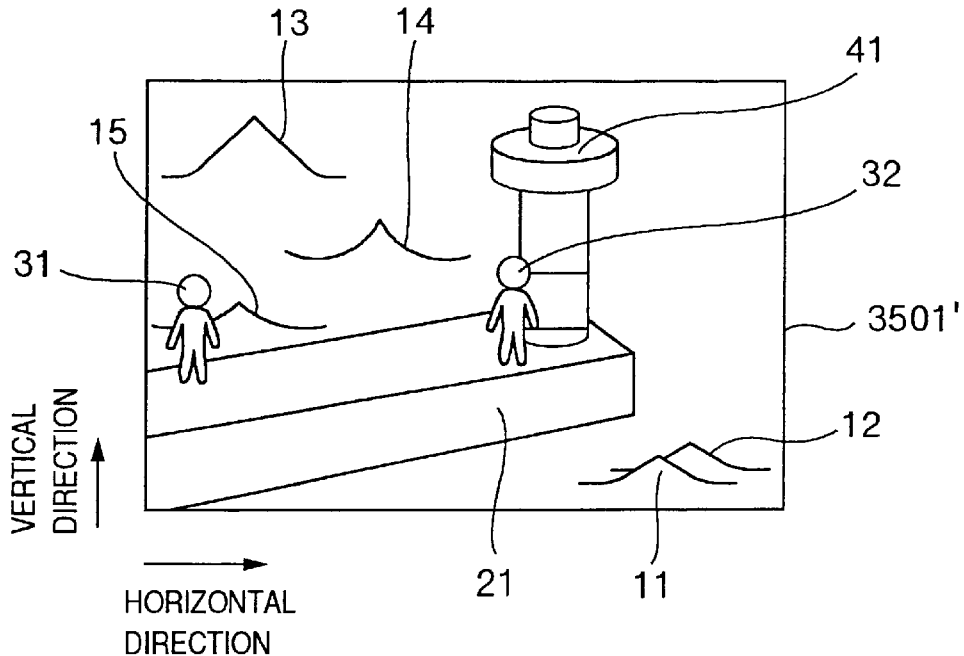
FIGS. 37A, 37B are diagrams for explaining detected cases.
Figure 37B:
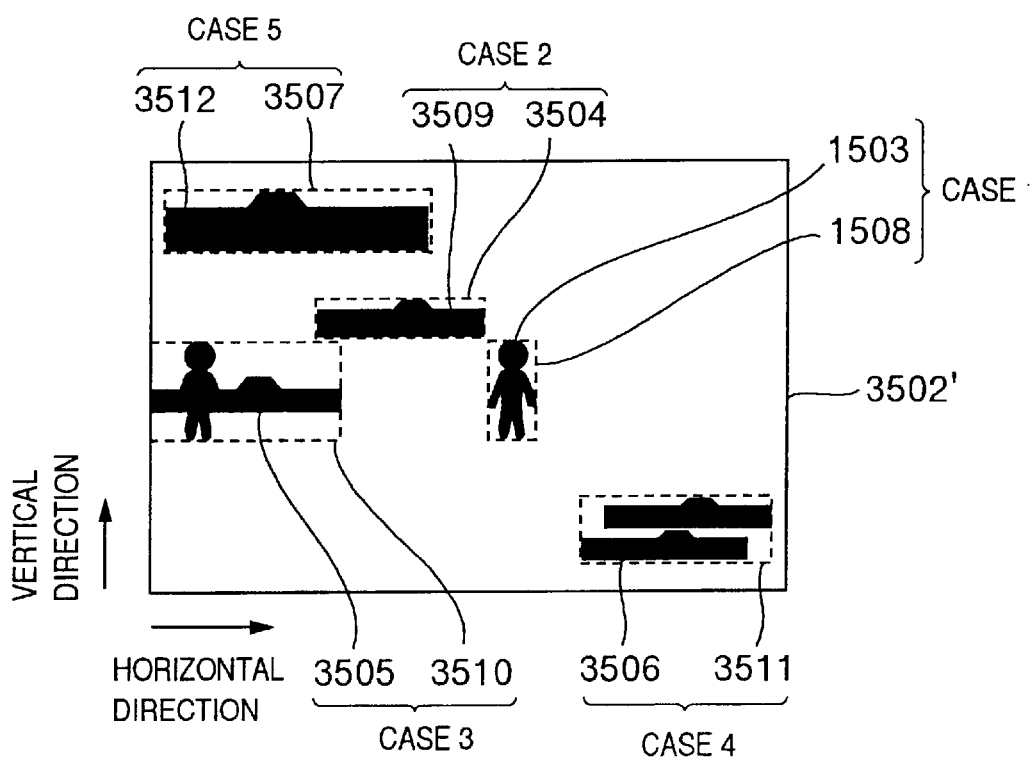

In these cases, the thickness is represented by the number of pixels in vertical direction of the detected area, and the size recognized as an object to be tracked is not less than 0.5 m in thickness. Also, the minimum horizontal width of an object to be tracked is 0.5 m, and the maximum horizontal width 2.0 m. FIGS. 37A, 37B show an example combination of binarized image areas corresponding to the case involved. In FIGS. 37A, 37B, an input image 3501' is obtained by adding another example to the input image 3501 of FIG. 30A, and the image 3502 processed by the subtraction method is also changed in accordance with the input image 3501', thereby producing an image 3502' processed by the subtraction method. FIGS. 37A, 37B are diagrams showing cases 1 to 5. Reference numerals in FIG. 37A designate the same component parts as the corresponding reference numerals in FIGS. 30A, 30B. In addition, numeral 3506 designates a detected area (similar to FIGS. 38A, 38B) detected with the waves 11 and 12 in overlapped relation, numeral 3507 a detected area where a large wave is detected, numeral 3511 the circumscribed rectangle about the detected area 3506, and numeral 3512 the circumscribed rectangle about the detected area 3507. Case 1 represents a combination of areas 3503 and 3508, case 2 a combination of areas 3504 and 3509, case 3 a combination of areas 3505 and 3510, case 4 a combination of areas 3506 and 3511, and case 5 a combination of areas 3507 and 3512.

Among these cases, at least cases 1 and 3 must not be determined as a wave. In view of this, an algorithm for classifying a detected area which can be apparently determined as a wave was studied using five indexes described below.

Index 1: Detected object is vertically long

Index 2: The ratio which the detected object represents of the size of the circumscribed rectangle of the detected object is not less than a predetermined value Index 3: Horizontal length of circumscribed rectangle is not more than 2.0 m Index 4: vertical thickness of detected object is not less than 0.5 m Index 5: Area of detected object includes the size considered an object to be tracked FIG. 35 shows the resulting classification of the cases using these indexes. FIG. 35 is a diagram indicating the relation between the detection cases and the indexes. In FIG. 35, the sign shows the case where the conditions of the particular index are satisfied, the sign X indicates the case where those conditions are not satisfied, and triangles represent the case in which the conditions of the particular index may be satisfied according to the shape of the detected area.

As shown in FIG. 35, there is no index for detecting and classifying only the cases 1 and 3 including a human being. By combining these indexes, however, cases 1 and 3 are classified in a manner not to be overlooked as an object or a human being to be tracked.

Figure 36:
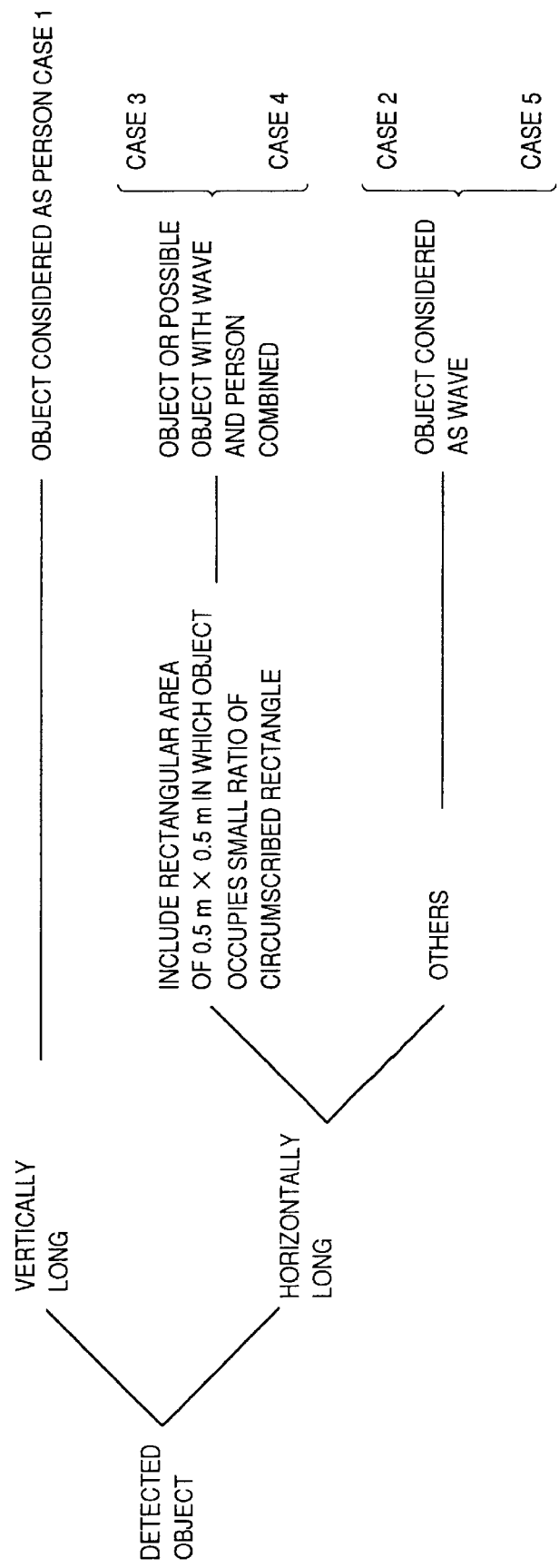
FIG. 36 is an algorithm for suppressing the wave error detection.

FIG. 36 shows a detection error suppression algorithm for a wave to satisfy the conditions described above. First, case 1 where a vertically long area is classified as a human being by index 1. Subsequently, cases 3 and 4 are classified by combining indexes 2 and 5. Case 5 represents a detected area observed as a horizontally long object having a thickness of not less than 0.5 m, but is difficult to determine whether a human being and a wave are overlapped or not or whether a large wave is detected. In FIGS. 35 and 36, the unit "m" indicating the size of detected areas is processed similarly to the relation between the apparent size (B) and the pixels in the embodiment explained with reference to FIG. 22.

The number of detected errors of the wave occurred in the case where the prior art and the aforementioned algorithmic processing, i.e. the embodiment of FIG. 24 is used, is actually measured as the number of detected waves that could not be removed in the 120 frames processed. As a result, 987 waves are detected from the processing by a threshold based on the area in the prior art. According to this invention, the number can be reduced to 359, so that 61% of the erroneously detected areas is clearly determined as a wave and can be removed.

Figure 25:
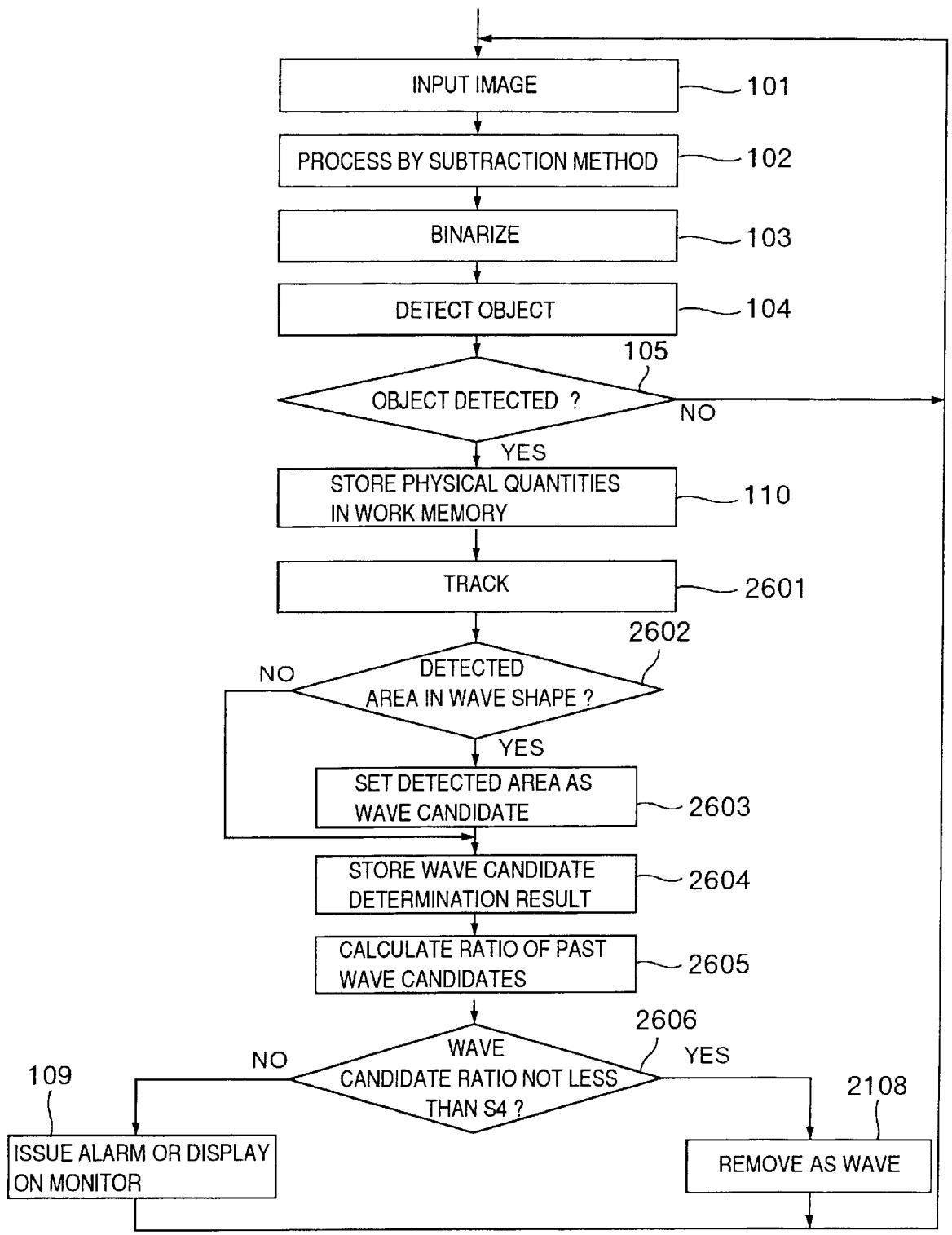
FIG. 25 is a flowchart showing an 11th embodiment of the invention.

An 11th embodiment of the invention will be explained with reference to FIG. 25. In the embodiment shown in FIG. 25, an object is not determined as a wave only by the shape of an area detected in one frame but whether a detected area is a wave or not is determined based on the shapes of the area detected in the past, and the detected area determined as a wave is removed from objects to be tracked. The flowchart of FIG. 25 includes steps 2601 to 2606 in place of step 106 of FIG. 20. Numeral 2601 designates a tracking process step, numeral 2602 a first wave candidate determination step, numeral 2603 a wave candidate setting step, numeral 2604 a wave candidate storage step, numeral 2605 a wave candidate ratio calculation step, and numeral 2606 a second wave candidate determination step. In FIG. 25, the process of steps 101 to 105 and step 110 are described above with reference to FIG. 20 and will not be explained. In the tracking process step 2601, the object detected in step 105 with the physical quantities thereof stored in the memory 604 in step 206 is tracked and the process proceeds to step 2602. In step 2602, the shape of a detected object is evaluated and in the case where it is determined as a wave, the process proceeds to step 2603. Otherwise, the process proceeds to step 2604. In the wave candidate setting step 2603, a detected object is determined as a wave candidate and the process proceeds to step 2604. In the wave candidate storage step 2604, the series of the result of wave candidate determination is stored for each object detected and tracked, followed by proceeding to step 2605. In the wave candidate ratio calculation step 2605, the number of detected objects determined as wave candidates is determined in the result of the past wave candidate determination stored for each object detected and tracked, and the ratio of the number of detected objects determined as wave candidates to the number of detected and tracked objects is determined, followed by proceeding to step 2606. In the wave candidate determination step 2606, it is determined whether a detected object is a wave or not based on the ratio of the number of detected objects determined as wave candidates. In the case where a detected object is determined as a wave, the process proceeds to step 2108, while in the case where the determination is not a wave, on the other hand, the process proceeds to step 109. The tracking steps 109 and 2108 are explained already.

In the tracking processing step 2601, a detected object is tracked using the object tracking method explained with reference to FIGS. 9A to 9C, for example, followed by proceeding to step 2602. In the wave candidate determination step 2602, the process branches depending on whether a detected object can be determined as a wave based on the shape thereof. First, in the case where the detected object is determined as a wave from the shape thereof, the process proceeds to step 2603, whereas in the case where the detected object cannot be determined as a wave, on the other hand, the process proceeds to step 2604. In the wave candidate setting step 2603, a detected object determined as a wave is considered as a wave candidate and the process proceeds to step 2604. In the wave candidate storage step 2604, the series of the result of wave candidate determination of a detected object is stored, followed by proceeding to step 2605. In the wave candidate ratio calculation step 2605, that number of detected objects determined as wave candidates in the past which are included in the result of the past wave candidate determination is determined based on the series of the result of wave candidate determination, and the ratio of the number of detected objects determined as wave candidates to the number of objects detected and tracked is determined, followed by proceeding to step 2606. In the wave candidate determination step 2606, the ratio of the number of detected objects determined as wave candidates is compared with a predetermined value (S4). In the case where the ratio of detected objects determined as wave candidates is not less than S4, the process proceeds to step 108, while in the case where the ratio is less than S4, on the other hand, the process proceeds to step 109, where S4 is determined empirically by the threshold of determining a detected object as a wave according to the ratio of detected objects tracked and determined as wave candidates (0.5, for example). Specifically, in the case where the ratio of the number determined as wave candidates to the number of detected objects in the result of past wave candidate determination is not less than S4, the particular detected objects are determined as waves. In the case where the ratio of the number determined as wave candidates to the number of detected objects in the result of past wave candidate determination is less than S4, on the other hand, the particular detected objects are not determined as waves. Steps 2108, 109 are explained already.

According to this embodiment, an object to be tracked can be recognized with higher accuracy while reducing the recognition error based on the shape change of the past detected objects.

Figure 26:
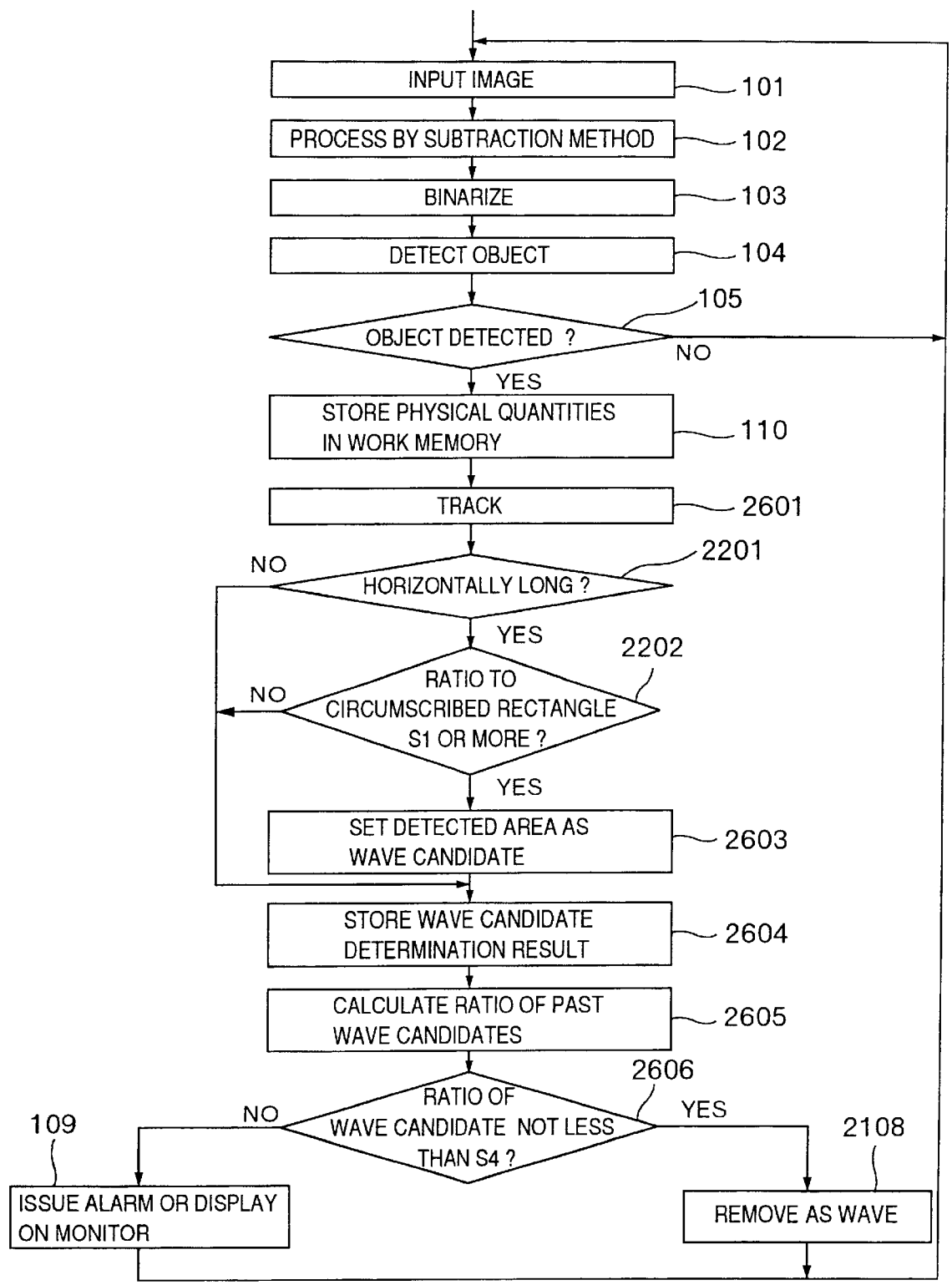
FIG. 26 is a flowchart showing a 12th embodiment of the invention.

A 12th embodiment of the invention will be explained with reference to FIG. 26. In this embodiment, a wave is determined based on the shape of the area detected in a frame, and the circumscribed rectangle areas detected in the past are classified into vertically long or horizontally long ones. Whether the detected objects determined horizontally long are wave candidates or not are determined based on the ratio which the pixels existing in the detected areas represents of the circumscribed rectangle area, and whether a detected object is a wave or not is determined using the result of wave candidate determination. The detected object thus determined as a wave is removed from the category of objects to be tracked. A flowchart for this embodiment is shown in FIG. 26. The flowchart of FIG. 26 includes a horizontal length determination step 2201 for determining whether the shape of a detected object is horizontally long or vertically long and a circumscribed rectangle determination step 2202 for determining whether a detected object is a wave or not based on the ratio which the pixels in the detected area of a detected object determined horizontally long represents of the circumscribed rectangle area, in place of the wave candidate determination step 2602 according to the embodiment of FIG. 25. In the horizontal length determination step 2201, whether a detected object is vertically long or horizontally long is determined. For example, the vertical length and the horizontal length of the circumscribed rectangle about the detected area are calculated, the ratio between the vertical length and the horizontal length is determined, and in the case where the detected object is determined as vertically long, the process proceeds to step 2604. In the case where the detected object is determined as horizontally long, on the other hand, the process proceeds to step 2202. In the circumscribed rectangle determination step 2202, whether a detected object is a wave or not is determined based on the ratio which the detected object represents of the circumscribed rectangle. For example, the ratio between the area of the circumscribed rectangle about the detected object and the area of the detected object is calculated and determined, and the resulting value is compared with a predetermined value (S1). In the case where it is determined that the ratio which the detected area represents of the circumscribed rectangle is less than S1, the process proceeds to step 603, while in the case where it is determined that the ratio which the detected area represents of the circumscribed rectangle is not less than S1, on the other hand, the process proceeds to step 604. Step 603 and subsequent steps are similar to the corresponding steps of the embodiment shown in FIG. 25 and will not be described.

In the embodiment of FIG. 20, a detected object is determined whether it is a wave or not based only on the result of detection in one frame using a predetermined value (S1). According to the present embodiment, in contrast, the past determination result is used so that the predetermined value (S1) can be set in such a manner as to further reduce the chance of overlooking objects to be tracked. In this embodiment, therefore, an object to be tracked can be tracked with higher accuracy while reducing the recognition error of a wave detected horizontally long in the view field based on the shape change of the objects detected in the past.

Figure 27:
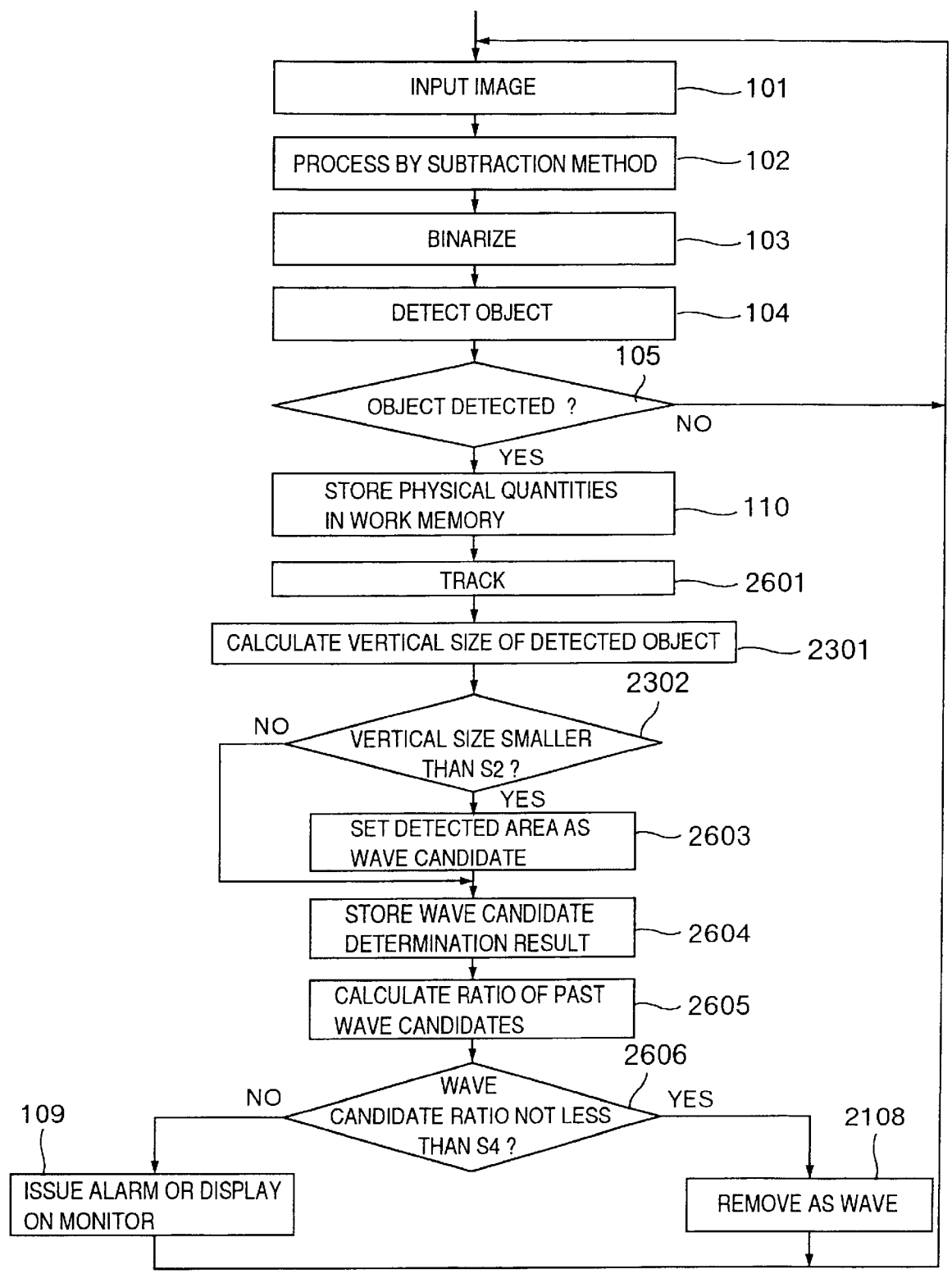
FIG. 27 is a flowchart showing a 13th embodiment of the invention.

A 13th embodiment of the invention will be explained with reference to FIG. 27. In this embodiment, an object is not determined as a wave solely from the shape of the area detected in one frame. Instead, the vertical size of the areas detected in the past are calculated, and based on the vertical size, a detected object is determined whether it is a wave candidate or not. Using the result of this wave candidate determination, it is determined whether the detected object is a wave or not. Any detected object that has been determined as a wave is removed from the category of objects to be tracked. A flowchart for this embodiment is shown in FIG. 27. The flowchart of FIG. 27 includes a vertical size calculation step 2301 for calculating the vertical size of a detected object and a vertical size determination step 2302 for determining whether a detected object is a wave candidate or not based on the vertical size of the detected object, in place of the wave candidate determination step 2602 in the embodiment of FIG. 26. In step 2301, the vertical size of the circumscribed rectangle is calculated from the circumscribed rectangle information of a detected object, for example, and determined as the vertical size of the detected object. The maximum number of pixels 3602 in the pixel number histogram of a detected object is determined as the vertical size of the detected area, followed by proceeding to step 2302. In the vertical size determination step 2302, the vertical size of the detected object is compared with the maximum size (S2) to be determined as a wave. In the case where the vertical size of the detected object is determined not less than S2, the process proceeds to step 2603, while in the case where the vertical size of the detected object is determined less than S2, the process is passed to step 2604. Step 603 and subsequent steps are similar to the corresponding steps in the embodiment of FIG. 25 and will not be described. The preceding embodiment is so configured that a detected object is determined as a wave only from the result of detection in one frame using the maximum size (S2) to be determined as a wave. In the present embodiment, in contrast, the maximum size (S2) to be determined as a wave is set to a still smaller value using the result of past determination for further reducing the chance of overlooking objects to be tracked. According to this embodiment, therefore, an object can be tracked with higher accuracy while reducing the recognition error of a wave in which the height of the wave projected in the view field is detected as a value not more than the maximum size to be determined as a wave.

Figure 28:
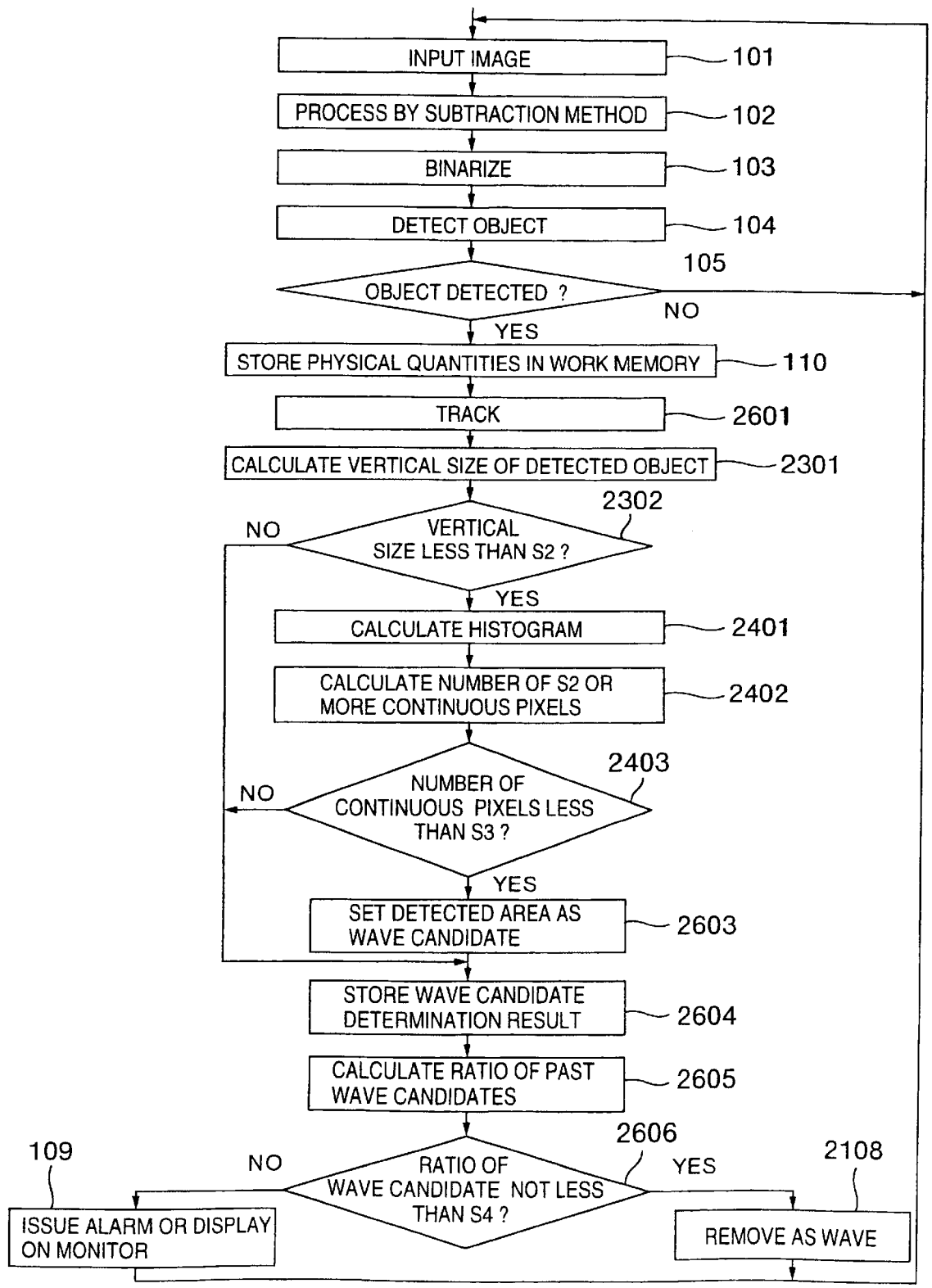
FIG. 28 is a flowchart showing a 14th embodiment of the invention.

A 14th embodiment of the invention will be explained with reference to FIG. 28. In this embodiment, a wave is not determined merely by the shape of the area detected in one frame, but it is determined whether a detected object is a wave candidate or not based on the histogram information of the areas detected in the past, and using the result of the wave candidate determination, it is determined whether a detected object is a wave or not. The detected objects determined as a wave in this way are removed from the category of objects to be tracked. This embodiment is shown in the flowchart of FIG. 28. The flowchart of FIG. 28 includes a histogram calculation step 2401 of determining a histogram by calculating the number of pixels in vertical direction of a detected object, a continuous pixel number calculation step 2402 for calculating the number of continuous pixels in horizontal direction larger than the maximum size to be determined as a wave from the histogram, and a continuous pixel number determination step 2403 for comparing the number of continuous pixels with the maximum size to determined as a wave and determining whether the detected area is a wave These steps 2401, 2402, 2403 are inserted between the vertical size determination step 2302 and the wave candidate setting step 2603 in the embodiment of FIG. 27. In FIG. 28, steps 101 to 2302 and steps 2603 and subsequent steps are similar to the corresponding steps in FIG. 27 and therefore will not be described below. In step 2401, the number of pixels in vertical direction of a detected area such as the detected area 3504 is determined and a histogram 3601 is prepared, followed by proceeding to step 2402. Further, in step 2402, the signal is binarized using the maximum size (S2) to be determined as a wave so that a binarized histogram 3603 is produced in which the number of pixels not less than a predetermined value is determined as "1", and those less than the predetermined value as "0". In this way, the maximum number of continuous "1s" is determined followed by proceeding to step 2403. The figure is "6" in the case of the binarized histogram 3603 in FIG. 31C. Further, in the continuous pixel number determination step 2403, the number of continuous "1s" is compared with the maximum continuous number (S3) to be determined as a wave thereby to determine a detected area as a wave or not. In the case where the number is determined as less than S3, the process proceeds to step 2603 for setting a detected object as a wave candidate. In the case where the vertical size of the detected object is determined as not less than S3, on the other hand, the process proceeds to step 2604. In the preceding embodiment, a detected object is determined whether it is a wave or not only by the result of detection in one frame using the maximum continuous pixel number (S3) to be determined as a wave. In the present embodiment, in contrast, the maximum continuous number (S3) to be determined as a wave can be set to a further smaller value using the result of past determination in order to further reduce the chance of overlooking objects to be tracked. According to this embodiment, therefore, an object to be tracked can be tracked with higher accuracy while reducing the recognition error of a detected wave configured of a plurality of continuous waves from the shape change of the objects detected in the past.

Figure 29:
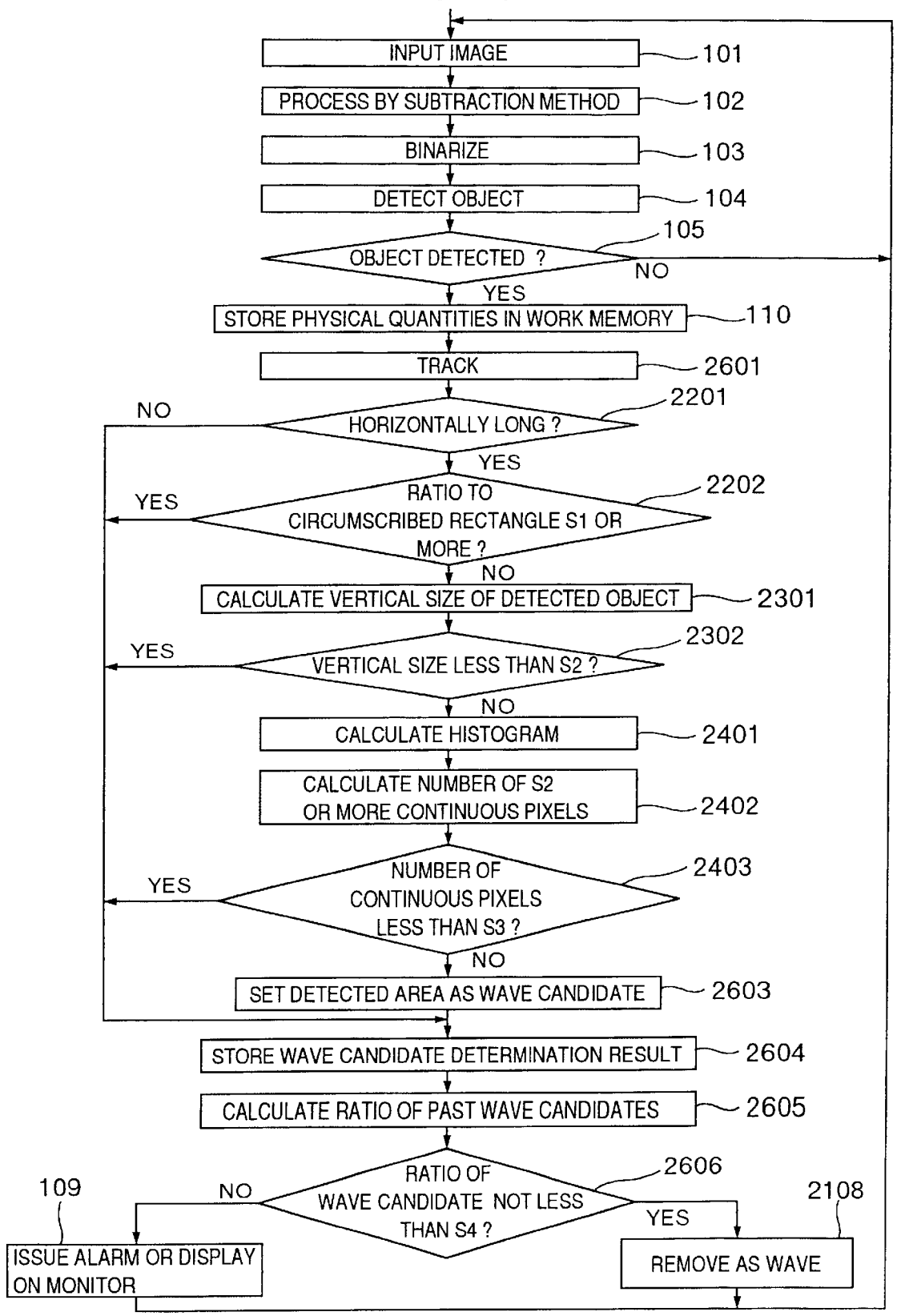
FIG. 29 is a flowchart showing a 15th embodiment of the invention.

A 15th embodiment of the invention will be explained with reference to FIG. 29. The flowchart of FIG. 29 shows an embodiment in which the embodiments shown in FIGS. 26, 27, 28 are combined and a detected object is determined whether it is a wave candidate or not from the shape change of the objects detected in the past, and using the result thereof, it is determined whether a detected object is a wave or not, and the detected object determined as a wave is removed from the category of objects to be tracked. The process of steps 101 to 2601 and step 2603 and subsequent steps are similar to the corresponding steps in FIGS. 26, 27, 28, and therefore will not be described below. First, in the horizontal length determination step 2201, the circumscribed rectangle area is classified into a horizontally long or vertically long area from the circumscribed rectangle information of a detected object, and it is determined whether the detected object determined horizontally long is likely to be a wave or not, followed by proceeding to step 2602. In the case where a detected object is determined as vertically long, on the other hand, the process proceeds to step 2604. In the circumscribed rectangle determination step 2202, the ratio which the detected area determined as horizontally long represents of the circumscribed rectangle thereof is calculated. In the case where this value is not less than a predetermined value (S1), it is determined as a wave candidate and the process proceeds to step 2604. In the case where the value is less than the predetermined value (S1), on the other hand, the process proceeds to step 2301. Then, in the circumscribed rectangle determination step 2301, the vertical size of the detected object of which the shape is not determined as a wave is calculated. In the vertical size determination step 2302, the vertical size of the detected object is compared with the maximum size (S2) to be determined as a wave thereby to determine whether it is a wave candidate or not. The detected object having a small vertical size is determined as a wave candidate. In the case where the vertical size of a detected object is not less than the maximum size (S2) to be determined as a wave, the process proceeds to step 2604. In the histogram calculation step 2401, the histogram of the number of pixels in vertical direction of the detected object is prepared, followed by proceeding to step 2402. Further, in step 2402, the number of pixels larger than the vertical size of the detected object is calculated from the histogram, followed by proceeding to step 2403. Then, in the continuous pixel number determination step 403, the number of continuous pixels larger than the vertical size of the object to be tracked is compared with the maximum continuous number (S3) to be determined as a wave thereby to determine whether the detected object is a wave candidate or not. In the case where a detected object is determined as a wave candidate, for example, the process proceeds to step 2603 for determining a detected object as a wave candidate. In the case where the detected object is not determined as a wave candidate, on the other hand, the process proceeds to step 2604. In the embodiment of FIG. 24, it is determined whether a detected object is a wave or not solely from the result of detection in one frame. According to the present embodiment, however, the value S1 can be set larger, S2 smaller and S3 smaller, by use of the past determination result in order to further reduce the chance of overlooking objects to be tracked. As a result, according to the embodiment of FIG. 29, it is possible to track an object with higher accuracy while reducing the chance of wave recognition error and overlooking objects to be tracked based on the shaped change of the objects detected in the past.

It will thus be understood from the foregoing description that according to the embodiments described above, objects to be tracked and objects not to be tracked (such as waves) can be accurately distinguished, and objects to be tracked can be tracked with both accuracy and rapidity without overlooking objects to be tracked. Further, in accordance with the motion change of an object (a wave, for example) and the environmental change, a constantly applicable criterion can be set, thereby making it possible to track objects with accuracy and rapidity in high response.

The method of distinguishing objects such as waves described with reference to FIG. 20 and subsequent drawings is of course usable in combination with the method of recognizing, tracking and monitoring a moving object according to the embodiments explained above with reference to FIGS. 1 to 5. Specifically, the process for distinguishing objects such as waves is inserted in a stage before or after a given classification step in FIG. 13. It can be inserted, for example, in a stage before detection of an object 1201, a stage after continuity determination 1202 of an object, a stage after the determination of the smoothness of object position change 1204, a stage after object size determination 1206, or a stage after object area determination 1208.

The various processes described above can of course be realized as a computer program in an optical disk or other recording media capable of being read by the computer.

What is claimed is:

1. A moving object recognition method for recognizing a specified moving object in sequentially input image signal in distinction from other objects, comprising the steps of:

sequentially detecting at least one moving object in the sequentially input image signals by a subtraction method;

sequentially storing, for each input image signal, in a memory at least one characteristic physical quantity which said moving object has;

detecting at least one locus of said moving object based on characteristic physical quantities in said input image signals;

storing in a memory characteristic physical quantities of said detected locus in such a manner that said characteristic physical quantities are associated with each other as a series of characteristic physical quantities of said moving object;

previously setting a test or criterion of determining whether said moving object belongs to said specified moving object or belongs to objects other than said specified moving object; and determining from said series of characteristic physical quantities, whether or not said moving object is said specified moving object, based on said determining criterion.

2. A moving object recognition method according to claim 1, wherein said step of sequentially storing at least one physical quantity includes the step of storing a plurality of characteristic physical quantities of moving objects in said memory, said step of detecting at least one locus includes the step of detecting a plurality of loci of said moving objects based on said plurality of characteristic physical quantities, said step of storing characteristic physical quantities includes the step of storing a plurality of physical quantities of said detected loci in said memory in such a manner that said plurality of physical quantities of said detected loci are associated with each other as series of a plurality of characteristic physical quantities of said moving objects, said step of previously setting a determining test includes the step of setting a determining test for each of said series of a plurality of characteristic physical quantities, and said step of determining includes the step of determining whether or not said moving objects are said specified moving object from at least two of said series of characteristic physical quantities, based on respective associated ones of said determining tests.

3. A moving object recognition method according to claim 2, wherein a plurality of said determining tests include the steps of:

calculating a time during which each of the loci of said moving object exists continuously from a series of detection time and detection positions of said detected moving object included in said series of characteristic physical quantities stored in memory; and determining said moving object having said calculated time longer than a predetermined time as said specified moving object and a moving object having said calculated time not longer than said predetermined time as an object other than said specified moving object.

4. A moving object recognition method according to claim 2, wherein a plurality of said determining tests include the steps of:

calculating the variations in the position change of each of said moving objects from a series of detection time and detection positions of said detected moving object included in said series of characteristic physical quantities stored in said memory; and determining a moving object with the calculated position change variation smaller than a predetermined value as said specified moving object and a moving object with the calculated position change variation not smaller than said predetermined value as an object other than said specified moving object.

5. A moving object recognition method according to claim 2, wherein a plurality of said determining tests include the steps of:

calculating a maximum size of said moving object from an area of said detected moving object included in said series of characteristic physical quantities stored in memory; and determining said moving object with the calculated maximum size larger than a predetermined value as said specified moving object and said moving object with the calculated maximum size not larger than said predetermined value as an object other than said specified moving object.

6. A moving object recognition method according to claim 2, wherein a plurality of said determining tests include the steps of:

calculating a minimum area of said moving object from an area of said detected moving object included in said series of characteristic physical quantities stored in memory; and classifying a moving object with the calculated minimum area smaller than a predetermined value as said specified moving object and said moving object with the calculated maximum area not smaller than said predetermined value as an object other than said specified moving object.

7. A moving object recognition method according to claim 2, wherein a plurality of said determining tests include the steps of:

calculating a maximum area of each of said moving objects from an area of said detected moving objects included in said series of characteristic physical quantities stored in memory; and calculating a minimum area of each of said moving objects from the area of said detected moving object; and determining said moving object with said maximum area larger than a first predetermined value and said minimum area smaller than a second predetermined value as said specified moving object, and classifying each of the remaining moving objects as objects other than said specified moving object.

8. A moving object recognition method according to claim 7, wherein said first predetermined value is an estimated minimum area of said specified moving object and said second predetermined value is an estimated maximum area of said specified moving object.

9. A moving object recognition method for recognizing a specified moving object in serially input image signals in distinction from other objects, comprising the steps of:

sequentially detecting a plurality of moving objects in serially input image signal;

sequentially storing characteristic physical quantities of said detected moving objects;

detecting at least a locus of at least one of said detected moving objects based on said characteristic physical quantities;

storing a group of characteristic physical quantities included in each of said loci in association with each other as series of characteristic physical quantities of moving objects, said characteristic physical quantities including a series of detection time and detection position and area of each of said moving objects; and determining whether each moving object is said specified moving object or not based on said characteristic physical quantities;

said step of determining including at least one of the substeps of:

calculating a time during which the locus of each moving object exists continuously from said detection time and said detection position included in said series of characteristic physical quantities of said moving object, and determining whether said moving object is said specified moving object or not from said continuous locus existence time;

calculating a variation in position change of said moving object from a detection position included series of characteristic physical quantities of each moving object, and determining whether said moving object is said specified moving object or not from said calculated variation;

calculating a maximum area of each moving object from said area included in said series of characteristic physical quantities of said moving object, and determining whether said moving object is said specified moving object or not from said calculated maximum area; and calculating a minimum area of each moving object from said area included in said series of characteristic physical quantities of said moving object, and determining whether said moving object is said specified moving object or not from said calculated minimum area.

10. A moving object recognition method according to claim 9, further comprising the step of generating noticeable information that a moving object determined to be said specified moving object is an intruding object.

11. A moving object recognition method according to claim 9, wherein the locus of said detected moving object is detected using more than two input image signal frames, and said locus continuous existence time is calculated using a continuous image signal frame upon detection of said locus.

12. A moving object recognition method according to claim 9, wherein said area included in the series of characteristic physical quantities of each moving object is calculated from the circumscribed polygon about the area occupied by said moving object.

13. A moving object recognition method according to claim 9, wherein the size of said area included in the series of characteristic physical quantities of each moving object is calculated from the size of the area occupied by said moving object.

14. A moving object tracking and monitoring method for sequentially detecting moving objects intruding into an imaging view field by a subtraction method and sequentially tracking and monitoring said moving objects with an object tracking and monitoring apparatus, comprising the steps of:

sequentially storing a characteristic physical quantity of a moving object detected by said object tracking and monitoring apparatus;

detecting a locus of said detected moving object based on said characteristic physical quantities;

storing characteristic physical quantities included in each locus as a series of characteristic of a moving object;

previously setting a test for determining whether said moving object belongs to an object to be tracked and monitored;

classifying said moving object into objects to be tracked and monitored and objects not to be tracked and monitored from said stored series of characteristic physical quantities, based on said determining test; and tracking and monitoring a moving object classified as objects to be tracked and monitored as an intruding object.

15. A moving object tracking and monitoring method according to claim 14, wherein said step of sequentially storing includes the step of sequentially storing a plurality of characteristic physical quantities of a plurality of moving objects detected by said object tracking and monitoring apparatus;

said step of detecting includes the step of detecting a plurality of loci of said moving objects based on said plurality of characteristic physical quantities;

said step of storing characteristic physical quantities includes the step of storing a plurality of characteristic physical quantities included in each of said detected loci as a series of a plurality of characteristic physical quantities in association with each other, said step of previously setting a test includes setting a determining test for each of said series of characteristic physical quantities, said step of classifying includes the step of classifying said moving objects into objects to be tracked and monitored and objects not to be monitored and tracked from at least two series of characteristic physical quantities, based on respective ones of associated determining tests.

16. A moving object recognition method according to claim 3, wherein the locus of said detected moving object is detected using more than two input image signal frames, and said locus continuous existence time is calculated using the number of the continuous image signal frames upon detection of said locus.

17. A moving object tracking and monitoring apparatus comprising:

an image input device;

an image memory for storing an image sequentially picked up by said image input device;

a program memory for storing a program for operating said object tracking and monitoring apparatus;

a central processing unit for activating said object tracking and monitoring apparatus in accordance with said program;

a work memory for analyzing said image stored in said image memory;

an alarm unit activated by said central processing unit in dependence on the result of analysis stored in said work memory; and a monitor unit for displaying a monitor image from said central processing unit generated in accordance with the analysis in said work memory;

said program including:
code means for sequentially detecting the moving objects stored in said image memory;
code means for sequentially storing characteristic physical quantities of said detected moving objects in said work memory;
code means for determining one or more loci of a moving object based on said characteristic physical quantities of said detected moving object;
code means for storing a group of characteristic physical quantities belonging to each of said loci in association with each other as a series of characteristic physical quantities of one moving object in said work memory;
code means for classifying said one moving object into an object to be tracked and monitored and an object not to be tracked and monitored based on said stored series of characteristic physical quantities; and
code means for activating said object tracking and monitoring apparatus in such a manner that said one moving object classified as an object to be tracked and monitored is tracked as an intruding object.

18. A moving object tracking and monitoring apparatus according to claim 17, wherein said classifying code means includes:

code means for determining the continuity of said one moving object;

code means for determining the variation of the position change of said one moving object; and code means for determining the size of said one moving object.

19. A computer readable medium having computer readable program code means embodied therein for recognizing a specified moving object in an input image signal in distinction from other objects, comprising:

code means for sequentially detecting at least one moving object in sequentially input image signals;

code means for sequentially storing characteristic physical quantities of said detected moving object;

code means for determining at least one locus of said detected moving object based on said characteristic physical quantities;

code means for storing a group of characteristic physical quantities of each locus in association with each other in a memory as a series of characteristic physical quantities the moving object; and code means for sequentially applying a plurality of determining tests to each moving object for determining whether said moving object belongs to said specified moving object or to objects other than said specified object and thus determining whether said detected moving object is said specified moving object or not based on said stored series of characteristic physical quantities.

20. A computer readable medium according to claim 19, wherein said code means for applying a plurality of said determining tests includes:

code means for calculating a time during which each of the loci of said moving object continuously exists from said stored series of characteristic physical quantities; and code means for determining said moving object with said calculated time longer than a predetermined time to be said specified moving object and said moving object with said calculated time not longer than said predetermined time to be an object other than said specified moving object.

21. A computer readable medium according to claim 19, wherein said code means for applying a plurality of said classifying methods includes:

code means for calculating the variation of position change of each of said moving objects from said stored correlated information series; and code means for classifying a moving object with said calculated position change variation smaller than a predetermined value as an object to be recognized and a moving object with said calculated position change variation not smaller than said predetermined value as an object not to be recognized.

22. A computer readable medium according to claim 19, wherein said code means for applying a plurality of said determining tests includes:

code means for calculating a maximum size of said moving object from said stored series of characteristic physical quantities;

code means for determining a moving object with said calculated maximum size larger than a predetermined value to be said specified moving object and a moving object with said calculated maximum size not larger than said predetermined value to be an object other than said specified moving object.

23. A computer readable medium according to claim 19, wherein said code means for applying a plurality of said determining tests includes:

code means for calculating a minimum area of each of said moving objects from said stored series of characteristic physical quantities;

code means for determining a moving object with said calculated minimum area smaller than a predetermined value to be said specified moving object and a moving object with said calculated minimum area not smaller than said predetermined value to be an object other than said specified moving object.

24. A computer readable medium according to claim 19, wherein said code means for applying a plurality of said determining tests includes:

code means for calculating a maximum area of each of said moving objects from said stored series of characteristic physical quantities;

code means for calculating a minimum area of each of said moving objects from said stored series of characteristic physical quantities; and code means for determining a moving object with said maximum area larger than a first predetermined value and said minimum area smaller than a second predetermined value to be said specified moving object and other moving objects to be moving objects other than said specified moving objects.

25. A computer readable medium according to claim 24, wherein said first predetermined first value is an estimated minimum area of said specified moving object and said second predetermined value is an estimated maximum area of said specified moving object.

26. A computer readable medium having computer readable program code means embodied therein for recognizing a specified moving object in an input image signal in distinction from other objects, comprising:

code means for sequentially detecting a plurality of moving objects in sequentially input image signals;

code means for sequentially storing characteristic physical quantities of said detected moving objects;

code means for determining at least one locus of said detected moving objects based on said characteristic physical quantities;

code means for storing a group of characteristic physical quantities included in each of said loci in association with each other as a series of characteristic physical quantities of one moving object, said physical quantities including detection time, position and area at each moment of each of said moving objects;

code means for determining each of said moving objects to be said specified moving object or an object other than said specified moving object, based on said characteristic physical quantities;

said determining code means including:

code means for calculating a time during which the locus of each of said moving objects continuously exists based on the detection time and the detection position included in said series of characteristic physical quantities of said moving object;

code means for determining said moving object to be said specified moving object or an object other than said specified moving object, based on said continuous locus existence time;

code means for calculating the variation of the position change of each of said moving objects based on the detection position included in said series of characteristic physical quantities of each moving object;

code means for determining said moving object to be said specified moving object or an object other than said specified moving object, based on said calculated variation;

code means for calculating a maximum area of each of said moving objects based on the area included in the series of characteristic physical quantities of said moving object;

code means for determining said moving object to be said specified moving object or an object other than said specified moving object, based on said calculated maximum area;

code means for calculating a minimum area of each of said moving objects based on the area included in the series of characteristic physical quantities of said moving object; and code means for determining said moving object to be said specified moving object or an object other than said specified moving object, based on said calculated minimum area.

27. A computer readable medium according to claim 26, further comprising code means for tracking as an intruding object a moving object determined to be said specified moving object.

28. A computer readable medium having computer readable program code means embodied therein for sequentially tracking and monitoring a moving object intruding into an imaging view field, comprising:

code means for sequentially storing characteristic physical quantities of at least one moving object detected by said object tracking and monitoring apparatus;

code means for determining the locus of said detected moving object based on said characteristic physical quantities;

code means for storing a group of characteristic physical quantities included in each of said loci in association with each other as a series of characteristic physical quantities of one moving object;

code means for determining said moving object to be said specified moving object and an object other than said specified moving object, based on said stored series of characteristic physical quantities; and code means for tracking as an intruding object said moving object classified as an object determined to be said specified moving object.

29. A moving object recognition method according to claim 16, wherein the locus of said detected moving object is determined using more than two input image signal frames, said step of determining said moving object to be said specified moving object or to be an object other than said specified moving object includes the substep of determining said moving object according to whether a time during which the locus of said moving object exists continuously is longer than a predetermined time, and said locus continuous existence time is calculated using the number of continuous image signal frames upon detection of said locus.

30. A moving object recognition method according to claim 5, wherein the maximum size of said moving object is the areal size of the circumscribed polygon about the area of said detected moving object.

31. A moving object recognition method according to claim 5, wherein the maximum size of said moving object is the areal size of the area of said detected moving object.

32. A moving object tracking method comprising the steps of:
  detecting as an object each area where the difference between an input image and a reference background image is not less than a predetermined threshold;
  classifying each of said detected objects into one of a plurality of types based on at least one of the shape and the size of the area of said detected object;
  selecting one or more objects to be tracked from said classified detected objects, and tracking said selected object as an object to be tracked.

33. A moving object tracking method according to claim 32, wherein said step of classifying an object based on the shape of said detected area includes the substep of classifying said detected object by the ratio between the horizontal length and the vertical length of the circumscribed rectangle about said detected area.

34. A moving object tracking method according to claim 32, wherein said step of classifying an object based on the shape of said detected area includes the substep of classifying said detected object by the vertical length of said detected area.

35. A moving object tracking method according to claim 34, further comprising the substep for calculating the histogram of the number of pixels in vertical direction of said detected area, and the maximum value of said histogram is regarded as the vertical length of said detected area.

36. A moving object tracking method according to claim 35, further comprising the step of subdividing the type of said detected area by the number of continuous horizontal pixels of a histogram value not less than a predetermined first threshold.

37. A moving object tracking method according to claim 32, wherein said step of classifying an object based on the areal size of said detected area includes the substep of classifying said detected object according to the ratio between the areal size of the circumscribed rectangle about each detected area and the areal size of said detected area.

38. A moving object tracking method according to claim 32, wherein one of said types is a specified type, said method further comprising the step of removing the detected object classified as said specified type from said objects to be tracked.

39. A moving object tracking method according to claim 38, wherein said specified type is a wave.

40. A moving object tracking method according to claim 38, further comprising the steps of:
  storing the information of said detected object classified into a plurality of detected objects over a plurality of frames for each detected object; and
  reclassifying the type of each of said detected objects based on said information of said frames.

41. An object tracking apparatus comprising:
  an imaging device;
  an interface unit for converting the input signal from said imaging device into an image signal;
  a detector for detecting as an object each area in which the intensity difference for each pixel between said image signal and the reference background image is larger than a predetermined value;
  a central processing unit;
  a memory; and
  means for classifying said detected area into one of a plurality of types based on at least selected one of the shape and the areal size detected by said detector in order to select an object to be tracked from said objects;
  wherein said object selected as an object to be tracked is tracked.

42. An object tracking apparatus according to claim 41, wherein the detected area classified as a specified one of a plurality of said types is removed from the category of objects to be tracked.

43. An object tracking apparatus according to claim 41, wherein said specified one type is a wave.

44. An object tracking and monitoring apparatus comprising:
  an image input device;
  an image memory for storing an image picked up by said image input device;
  a program memory for storing the program for the operation of said object tracking and monitoring apparatus;
  a central processing unit for activating said object tracking and monitoring apparatus in accordance with said program;
  an image memory for analyzing said image stored in said image memory;
  an alarm unit activated by said central processing unit in dependence on the result of analysis by said work memory; and
  a monitor unit for displaying a monitor image from said central processing unit generated in accordance with the analysis in said work memory; and
  said program includes:
    code means for calculating the difference of the intensity value for each pixel between the image from said image input device and the reference background image;
    code means for detecting a pixel area where an object exists as a plurality of pixels with said intensity difference not less than a predetermined threshold value regarded as pixels where an object exists;
    first classification code means for classifying said detected object based on the ratio which the areal size of the area of said detected object represents of the areal size of said circumscribed rectangle area on the assumption that the shape of the circumscribed rectangle about said pixel area where said detected object exists is horizontally long;
    second classification code means for classifying said object based on the vertical size of said pixel area where said detected object exists;
    code means for calculating the histogram of the number of pixels in vertical direction of said pixel area where said detected object exists;
    code means for determining the number of continuous pixels in horizontal direction having a histogram value not less than a predetermined threshold; and
    third classification code means for classifying said detected object based on the number of continuous pixels in horizontal direction;
    wherein detected objects other the objects to be tracked are removed by said first, second and third classification code means.

45. An object tracking and monitoring apparatus according to claim 44, wherein said first, second and third classification code means classify said detected object as a wave or other objects.

46. A computer readable medium having computer readable program code means embodied therein for tracking an moving object, comprising:
 code means for detecting as an object each area having the difference between an input image and a reference background image not less than a predetermined threshold;
 code means for classifying each of said detected objects into one of a plurality of types based on at least selected one of the shape and the size of the area of said detected object;
 code means for selecting one or more objects to be tracked from said classified detected objects; and
 code means for tracking said selected object as an object to be tracked.

47. A computer readable medium according to claim 46, wherein said classification based on the shape of said detected area includes the classification of said detected object based on the ratio between the horizontal length and the vertical length of the circumscribed rectangle about said detected area.

48. A computer readable medium according to claim 46, wherein said classification of said detected area based on the shape is the classification of said detected object based on the vertical length of said detected area.

49. A computer readable medium according to claim 48, further comprising code means for calculating the histogram of the number of pixels in vertical direction of said detected area, and the maximum value of said histogram is the vertical length of said detected area.

50. A computer readable medium according to claim 49, further comprising code means for classifying the type of said detected area according to the number of horizontally continuous pixels with the histogram value thereof not smaller than said first threshold.

51. A computer readable medium according to claim 46, further comprising code means in which said classification based on the size of said detected area is the classification of said detected object based on the ratio of the size between the circumscribed area about each detected area and said detected area.

52. A computer readable medium according to claim 46, wherein one of said types is a specified type, and said moving object tracking program further includes code means for removing the detected object classified as said specified type from said category of objects to be tracked.

53. A computer readable medium according to claim 52, wherein said specified type is a wave.

54. A computer readable medium according to claim 52, further comprising;
 code means for storing the information of said detected object classified into a plurality of said detected objects over a plurality of frames for each detected object; and
 code means for reclassifying the type of said detected object based on the information of said plurality of said frames.

55. A moving object recognition method according to claim 1, wherein said determining criterion or test includes the steps of:
 classifying each of said detected moving objects into one of a plurality of types based on at least one of the shape and the size of the area of said detected moving object;
 selecting at least one of objects to be tracked from said classified detected objects; and
 tracking said selected object as an object to be tracked.

56. A moving object recognition method according to claim 55, wherein said step of classifying based on the shape includes the substep of classifying said detected moving objects according to the ratio between the horizontal length and the vertical length of the circumscribed rectangle about each detected area.

57. A moving object recognition method according to claim 55, wherein said step of classifying based on the shape includes the substep of classifying said detected object by the vertical length of each detected area.

58. A moving object recognition method according to claim 57, further comprising the step of calculating the histogram of the number of pixels in vertical direction of said detected area, said histogram having a maximum value equal to the vertical length of said detected area.

59. A moving object recognition method according to claim 58, further comprising the step of classifying the type of said detected area by the number of horizontally continuous pixels with the histogram having a value not smaller than a predetermined first threshold.

60. A moving object recognition method according to claim 55, wherein said step of classifying said detected moving object based on the areal size of said detected area includes the substep of classifying said detected moving object by the ratio between the area of the circumscribed rectangle about said detected area and the areal size of said detected area.

61. A moving object recognition method according to claim 55, wherein one of a plurality of said types is a specified type, said moving object tracking method further comprising the step of removing the detected object classified as said specified type from the objects to be tracked.

62. A moving object recognition method according to claim 61, wherein said specified type is a wave.

* * * * *